(12) United States Patent
Fukuhara et al.

(10) Patent No.: US 8,320,693 B2
(45) Date of Patent: Nov. 27, 2012

(54) ENCODING DEVICE AND METHOD, DECODING DEVICE AND METHOD, AND TRANSMISSION SYSTEM

(75) Inventors: Takahiro Fukuhara, Kanagawa (JP); Kazuhisa Hosaka, Tokyo (JP); Katsutoshi Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 1231 days.

(21) Appl. No.: 11/814,257

(22) PCT Filed: Nov. 17, 2006

(86) PCT No.: PCT/JP2006/322949
§ 371 (c)(1),
(2), (4) Date: Aug. 27, 2007

(87) PCT Pub. No.: WO2007/058294
PCT Pub. Date: May 24, 2007

(65) Prior Publication Data
US 2009/0274378 A1    Nov. 5, 2009

(30) Foreign Application Priority Data

Nov. 18, 2005 (JP) .................... 2005-334243
Jan. 16, 2006 (JP) .................... 2006-007256

(51) Int. Cl.
*G06K 9/36* (2006.01)
*G06K 9/46* (2006.01)
(52) U.S. Cl. ......... 382/240; 382/232; 382/233; 382/234
(58) Field of Classification Search ............... 382/232, 382/233, 234, 240
See application file for complete search history.

(56) References Cited

U.S. PATENT DOCUMENTS

| | | | |
|---|---|---|---|
| 5,880,856 A | 3/1999 | Ferriere | |
| 6,259,735 B1 | 7/2001 | Aono et al. | |
| 6,560,369 B1 * | 5/2003 | Sato | 382/239 |
| 6,707,948 B1 | 3/2004 | Cosman et al. | |

(Continued)

FOREIGN PATENT DOCUMENTS

JP    9 130800    5/1997

(Continued)

OTHER PUBLICATIONS

U.S. Appl. No. 12/109,705, filed Apr. 25, 2008, Fukuhara, et al.

(Continued)

*Primary Examiner* — Bernard Krasnic
(74) *Attorney, Agent, or Firm* — Oblon, Spivak, McClelland, Maier & Neustadt, L.L.P.

(57) ABSTRACT

An encoding device includes a filter unit that performs a filtering processing as to image data, for a line block including image data of a number of lines for generating coefficient data of one line of a sub-band of at least a lowest band component. The filter unit generates a plurality of sub-bands made up of coefficient data broken down by frequency band. The encoding device also includes a storage unit that stores coefficient data generated by the filter unit, for the line block. The encoding device further includes a coefficient rearranging unit that rearranges the coefficient data, for each line block, in an order in which a synthesizing processing, for generating image data by synthesizing the coefficient data of a plurality of sub-bands which have been divided into frequency bands, is to be executed. An encoding unit encodes the coefficient data rearranged by the coefficient rearranging unit.

27 Claims, 38 Drawing Sheets

U.S. PATENT DOCUMENTS

| | | | |
|---|---|---|---|
| 6,813,314 B2 | 11/2004 | Aono et al. | |
| 6,847,468 B2 | 1/2005 | Ferriere | |
| 7,031,386 B2 | 4/2006 | Yamamoto et al. | |
| 7,076,107 B1 * | 7/2006 | Terao | 382/240 |
| 2001/0036231 A1 * | 11/2001 | Easwar et al. | 375/240.19 |
| 2005/0249425 A1 * | 11/2005 | Paniconi et al. | 382/240 |

FOREIGN PATENT DOCUMENTS

| | | |
|---|---|---|
| JP | 2000 59781 | 2/2000 |
| JP | 2001 25018 | 1/2001 |
| JP | 2001-077697 | 3/2001 |
| JP | 2001 77697 | 3/2001 |
| JP | 2001-197500 | 7/2001 |
| JP | 2003-204439 | 7/2003 |
| JP | 2004 166254 | 6/2004 |
| JP | 2005 109776 | 4/2005 |
| JP | 2005-109776 | 4/2005 |
| JP | 2005 117156 | 4/2005 |

OTHER PUBLICATIONS

U.S. Appl. No. 12/109,845, filed Apr. 25, 2008, Fukuhara, et al.
U.S. Appl. No. 12/109,887, filed Apr. 25, 2008, Fukuhara, et al.
U.S. Appl. No. 12/109,918, filed Apr. 25, 2008, Ando, et al.
U.S. Appl. No. 12/109,857, filed Apr. 25, 2008, Ando, et al.
U.S. Appl. No. 12/111,450, filed Apr. 29, 2008, Fukuhara, et al.
U.S. Appl. No. 12/111,421, filed Apr. 29, 2008, Ando, et al.
U.S. Appl. No. 12/112,397, filed Apr. 30, 2008, Fukuhara, et al.
U.S. Appl. No. 12/114,299, filed May 2, 2008, Ando, et al.
Sweldens, W.,"The Lifting Scheme: A Custom-design Construction of Biorthogonal Wavelets", Applied and Computational Harmonic Analysis, vol. 3, No. 2, pp. 186-200, 1996.
Chrysafis, C. et al.,"Line-Based, Reduced Memory, Wavelet Image Compression", IEEE Transactions on Image Processing. vol. 9, No. 3, pp. 378-389, 2000.
Extended Supplementary European Search Report issued on Feb. 28, 2011 in corresponding European Application No. 06 83 2828.
Patrice Onno, "Report on Core Experiments CodEff7: Low Memory Line-Based Wavelet Transform Using Lifting Scheme", Canon Research Centre France, Aug. 4, 1998, XP 017205163, 16 Pages.
International Search Report, Mar. 13, 2007, PCT/JP2006/322949.
European Office Action dated Aug. 7, 2012, in European Patent Application No. 06 832 828.5.

\* cited by examiner

DIVISION LEVEL = 3
(H: HIGHBAND, L: LOWBAND)

FIG. 3
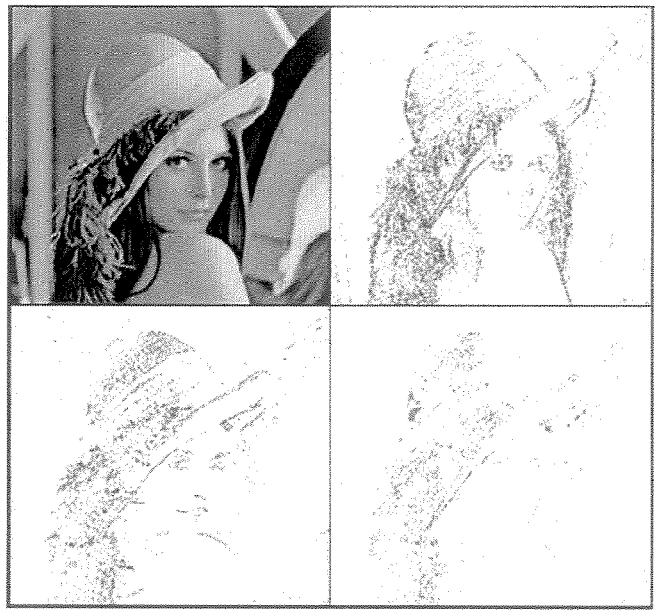
DIVISION LEVEL = 1
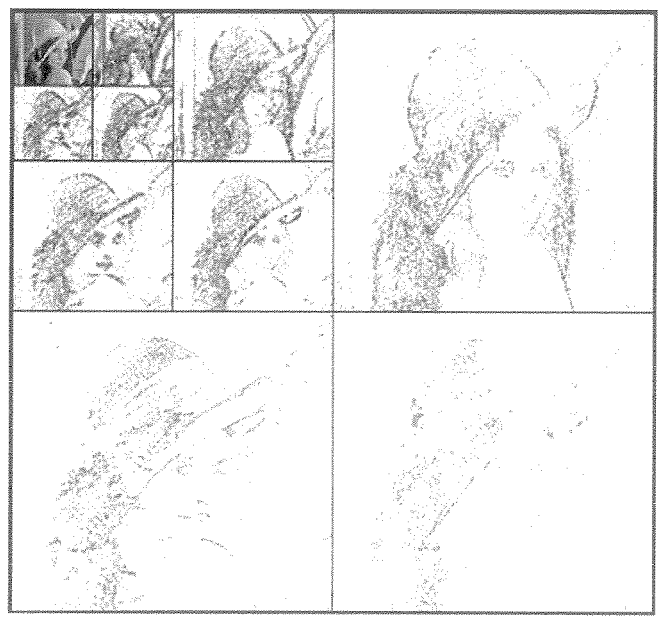
DIVISION LEVEL = 3

FIG. 21

| | - + | + + | + - | - + |
|---|---|---|---|---|
| | 0 0 0 0 | 0 0 0 0 | 0 0 0 1 | 1 0 0 1 |
| | 1 0 1 0 | 0 1 0 0 | 1 0 0 0 | 1 1 1 0 |
| | 0 1 1 1 | 1 1 0 1 | 1 0 1 0 | 0 0 1 1 |
| | 1 1 0 0 | 1 0 0 1 | 1 0 0 1 | 1 0 1 0 |

QUANTIZED COEFFICIENTS IN BIT PLANE EXPRESSION

VALUE OF MAXIMUM SIGNIFICANT DIGITS B (INITIAL VALUE OF B IS 0): 3, 3, 3, 4

1 (QUANTIZED COEFFICIENTS OF THESE LINES TO BE ENCODED ARE NOT ALL 0)

1 (CHANGE TO B)
0 (INCREASE B)
001 (B IS INCREMENTED BY 3)
101 011 110 010 (ABSOLUTE VALUE OF W QUANTIZED COEFFICIENTS)
1010 (SIGN OF W QUANTIZED COEFFICIENTS NOT 0)

0 (NO CHANGE TO B)
011 110 000 011 (ABSOLUTE VALUE OF W QUANTIZED COEFFICIENTS)
001 (SIGN OF W QUANTIZED COEFFICIENTS NOT 0)

1 (CHANGE TO B)
0 (INCREASE B)
1 (B IS INCREMENTED BY 1)
1101 0100 0111 1010 (ABSOLUTE VALUE OF W QUANTIZED COEFFICIENTS)
0101 (SIGN OF W QUANTIZED COEFFICIENTS NOT 0)

ENCODING DEVICE AND METHOD, DECODING DEVICE AND METHOD, AND TRANSMISSION SYSTEM

CROSS-REFERENCE TO RELATED APPLICATIONS

This application is a National Stage of PCT/JP2006/322949, filed Nov. 17, 2006, and claims the benefit of priority under 35 U.S.C. §119 from Japanese patent application nos. 2005-334243, filed Nov. 18, 2005, and 2006-007256, filed Jan. 16, 2006.

TECHNICAL FIELD

The present invention relates to an encoding device and method, a decoding device and method, and a transmission system and particularly relates to an encoding device and method a decoding device and method, and a transmission system wherein image data which is subjected to compression encoding and sent out can be output as decoded images at the receiving side in a short time.

BACKGROUND ART

An image data compression encoding method that has been conventionally widely used is the JPEG (Joint Photographic Experts Group) method that has been standardized by the ISO (International Standards Organization). With this JPEG method, image data is divided into blocks, and each of the divided regions is subjected to DCT (Discrete Cosine Transform) to obtain DCT coefficients, and the obtained DCT coefficients are subjected to quantization and further entropy encoding, thereby realizing high quality and high compression ratio.

Also, in recent years, there has been much research performed on an encoding method wherein images are divided into multiple bands with filters called filter banks, wherein high-pass filters and low-pass filters are combined, and encoding is performed for each of the divided bands. Of such encoding methods, an encoding method called wavelet transformation coding particularly is viewed as a new technology which is a likely candidate to re-lace DCT for image compress on encoding, since it does not have the problem that the above-described DCT has, which is block distortion at high compression rates.

For example, with JPEG 2000, of which international standardization was completed January 2001, a compression encoding method is employed which combines wavelet transformation with high-efficiency entropy coding using bit-plane based bit modeling and arithmetic encoding. This JPEG 2000 method realizes great improvement over conventional JPEG with regard to encoding efficiency. Patent Document 1 describes a wavelet transformation method wherein encoding efficiency has been improved even further.

[Patent Document 1] Japanese Unexamined Patent Application Publication No 9-130800

Such an international standard only stipulates the decoder side, and the encoder side can be freely designed.

DISCLOSURE OF INVENTION

Problems to be Solved by the Invention

Now, with the above-described JPEG 2000 method for example, conventionally, necessary header information could not be described until after encoding of all pixels within the screen has been completed, due to the algorithm. That is to say, this header information describes information indispensable for decoding, such as compressed data size obtained as a result of encoding, and has the need to add a marker at the end of the encoded data, but such information cannot be finalized until after all encoding for one screen worth has been completed.

This is not isolated to JPEG 2000, and holds true with JPEG, and also MPEG (Moving Pictures Experts Group) which is a moving image data compression method, as well.

Accordingly, there has been the problem with conventional image compression techniques in that output of an encoded code stream, which is the result of compression encoding, has to be performed following encryption of the image of an entire frame, or a field in the case of an interlaced image.

Accordingly, there has been the problem that occurrence of delay time of one frame, or one field in the case of an interlaced image, between the transmitting side and receiving side of the image data, could not be avoided.

Accordingly it is an object of the present invention to provide an encoding device and method, a decoding device and method, and a transmission system, wherein compression encoding and decoding of image data, and output of the decoded image data, can be performed with less delay.

Means for Solving the Problems

An encoding device according to a first aspect of the present invention is an encoding device for encoding image data, including: filter means for performing filtering processing hierarchically as to the image data, and generating a plurality of sub-bands made up of coefficient data broken down by frequency band; storage means for accumulatively storing coefficient data generated by the filter means; and coefficient rearranging means for rearranging the coefficient data stored by the storage means, so as to be output in a predetermined order.

The filter means may perform the filtering processing in increments of lines, from the top side of a screen of the image data toward the bottom sides.

The filter means may perform the filtering processing on the image data, in increments of line blocks which is image data of a number of lines necessary to generate one line worth of coefficient data for at least a lowest band component sub-band.

The filter means may perform the filtering processing in both the vertical direction and horizontal direction corresponding to the image data.

At least one of the number of taps and number of resolution levels of the filtering processing performed by the filter means may be determined in accordance with a target delay time.

The filter means may performs wavelet filtering processing, with coefficient data of the lowband component sub-band obtained by the filtering processing being further subjected to the filtering processing.

The filter means may perform the wavelet filtering processing using a lifting technique.

At the time of the filter means performing filtering processing of a resolution level=X+1 using the lifting technique, this may be performed as to coefficient data calculated as a lowband component sub-band with filtering processing of a resolution level=X.

The storage means may further include: a first buffer means for holding coefficient data of a lowband component sub-band generated in the process of the wavelet filtering processing performed by the filter means; and a second buffer means for holding coefficient data of a highband component sub-band generated in the process of the wavelet filtering processing performed by the filter means.

The second buffer means may hold coefficient data of sub-bands of band components other than the lowest band, until coefficient data for the lowest band component sub-band is generated by the filter means.

The coefficient rearranging means may rearrange the coefficient data such that the sub-bands are output in the order from lowband components to highband components.

The coefficient rearranging means may perform the rearranging on the image data, in increments of line blocks which is image data of a number of lines necessary to generate one line worth of coefficient data for at least a lowest band component sub-band.

The encoding device may further include entropy encoding means for performing entropy encoding of the coefficient data.

The entropy encoding means may sequentially perform entropy encoding of coefficient data rearranged by the coefficient rearranging means.

The coefficient rearranging means may rearrange the coefficient data such that the sub-bands are output in the order from lowband components to highband components; with the entropy encoding means sequentially performing entropy encoding of rearranged coefficient data in the order from lowband components to highband components, as soon as the coefficient data is rearranged by the coefficient rearranging means.

The entropy encoding means may perform entropy encoding of the coefficient data generated by the filtering means; with the storage means storing the coefficient data subjected to entropy encoding by the entropy encoding means.

The storage means may store coefficient data generated as sub-bands of band components other than the lowest band, and subjected to entropy encoding by the entropy encoding means, until coefficient data for the lowest band component sub-band is subjected to entropy encoding by the entropy encoding means.

The coefficient rearranging means may rearrange the coefficient data stored by the storage means and subjected to entropy encoding by the entropy encoding means, such that the sub-bands are output in the order from lowband components to highband components, and output the rearranged coefficient data in the order from lowband components to highband components, as soon as the coefficient data is rearranged.

The entropy encoding means may perform batch en-ropy encoding on a plurality of lines of coefficient data within the same sub-band.

The entropy encoding means may perform encoding on lines of all sub-bands making up a line block which is a coefficient data group corresponding to image data of a number of lines necessary for generating one line of coefficient data of at least the lowest band component sub-band, with regard to a coefficient data stream arrayed in a one-dimensional direction, in the order from lowband to highband.

The entropy encoding means may include: quantization means for quantizing the coefficient data generated by the filer means; and source coding means for performing source coding on quantization result coefficients obtained by the coefficient data being quantized by the quantization means.

The encoding device may further include: packetizing means for adding a predetermined header to encoding result data obtained by the entropy encoding means performing entropy encoding, in the order from lowband components to highband components, on coefficient data for each line block, which is a collection of the coefficient data corresponding to image data of a number of lines necessary for generating one line of coefficient data of at least the lowest band component sub-band, and packetizing the header and data body; and sending means for sending out the packet generated by the packetizing means: with the entropy encoding means, the packetizing means, and the sending means performing the respective processing simultaneously and in parallel; the entropy encoding means performing the entropy encoding of the coefficient data in increments of the line blocks; the packetizing means packetizing encoding result data for each of the line blocks as soon as the encoding result data for each line block is generated by entropy encoding performed by the entropy encoding means; and the sending means sending out the obtained packet as soon as the encoding result data for each line block is packetized by the packetizing means.

The header may have recorded identification information for identifying the line block in the screen, data length of the data body, and encoding information.

The entropy encoding means may include: quantization means for quantizing the coefficient data generated by the filer means; and source coding means for performing source coding on quantization result coefficients obtained by the coefficient data being quantized by the quantization means; with the encoding information including a quantization step size of the quantization performed by the quantization means.

The information of quantization step size may include information of quantization step size for each sub-band.

An encoding method according to a first aspect of the present invention is an encoding method for an encoding device for encoding image data, the method including: a filtering step for performing filtering processing hierarchically as to the image data, and generating a plurality of sub-bands made up of coefficient data broken down by frequency band; a storage control step for accumulatively storing the coefficient data generated by the processing in the filtering step, in a storage unit; and a coefficient rearranging step for rearranging the coefficient data, stored in the storage unit by being controlled by the processing in the storage control step, so as to be output in a predetermined order.

A decoding device according to a second aspect of the present invention is a decoding device for decoding encoded image data wherein image data has been encoded, including: storage means for storing coefficient data of a plurality of sub-bands made up of coefficient data broken down by frequency band obtained by the image data having been hierarchically subjected to first filtering processing, supplied in increments of lines; coefficient rearranging means for rearranging the coefficient data stored by the storage means, so as to be output in a predetermined order; and filter means for performing second filtering processing as to the coefficient data rearranged by the rearranging means and output from the storage means, and synthesizing the coefficient data of a plurality of sub-bands broken down by frequency band so as to generate the image data.

The coefficient rearranging means may rearrange the coefficient data such that the sub-bands are output in the order from lowband components to highband components.

The coefficient rearranging means may perform the rearranging on the coefficient data stored in the storage means, in increments of line blocks which is a collection of the coefficient data corresponding to image data of a number of lines necessary to generate one line worth of coefficient data for at least a lowest band component sub-band.

The filter means may perform the second filtering processing in increments of lines, from the top side of a screen toward the bottom side thereby generating the image data.

The filter means perform the second filtering processing on the coefficient data, in increments of line blocks which is a collection of coefficient data corresponding to image data of a number of lines necessary to generate one line worth of coefficient data for at least a lowest band component sub-band.

The filter means may perform the second filtering processing using a lifting technique.

The decoding device may further include entropy decoding means for performing entropy decoding of the encoded data in increments of lines, for each sub-band; with the storage means storing coefficient data obtained by the entropy decoding performed by the entropy decoding means.

The entropy decoding means may perform decoding of encoded data, wherein lines of all sub-bands making up a line block which is a coefficient data group corresponding to image data of a number of lines necessary for generating one line of coefficient data of at least the lowest band component sub-band, have been encoded, and arrayed one-dimensionally.

The entropy decoding means may include: source decoding means for performing source decoding on the encoded data; and inverse quantization means for performing inverse quantization of coefficient data obtained as the result of source decoding by the source decoding means.

A decoding method according to a second aspect of the present invention is a decoding method for a decoding device for decoding encoded image data wherein image data has been encoded, the method including: a storage control step for storing, in a storage unit, coefficient data of a plurality of sub-bands broken down by frequency band, obtained by the image data having been hierarchically subjected to first filtering processing, supplied in increments of lines; a coefficient rearranging step for rearranging the coefficient data, stored in the storage unit by being controlled by the processing in the storage control step, so as to be output in a predetermined order; and a filtering step for performing second filtering processing as to coefficient data rearranged by the processing in the rearranging step and output from the storage unit, and synthesizing the coefficient data of a plurality of sub-bands broken down by frequency brand so as to generate the image data.

A transmission system according to a third aspect of the present invention is a transmission system including: an encoding device for encoding image data; and a decoding device for decoding encoded data wherein image data has been encoded; the transmission system being for transmitting the encoded data between the encoding device and the decoding device; wherein the encoding device includes first filter means for performing first filtering processing hierarchically as to the image data, and generating a plurality of sub-bands made up of coefficient data broken down by frequency band, storage means for accumulatively storing the coefficient data generated by the first filter means, and coefficient rearranging means for rearranging the coefficient data stored by the storage means, so as to be output in a predetermined order; and wherein the decoding device includes second filter means for performing second filtering processing as to the coefficient data rearranged by the coefficient rearranging means and output from the storage means, that has been transmitted from the encoding device via a transmission path, and synthesizing the coefficient data of a plurality of sub-bands broken down by frequency band so as to generate the image data.

According to a first aspect of the present invention, filtering processing is performed hierarchically as to image data, a plurality of sub-bands made up of coefficient data broken down by frequency band are generated, the generated coefficient data is accumulatively stored and the stored coefficient data is rearranged so as to be output in a predetermined order.

According to a second aspect of the present invention, coefficient data of a plurality of sub-bands broken down by frequency band, obtained by the image data having been hierarchically subjected to first filtering processing, supplied in increments of lines is stored, the stored coefficient data is rearranged so as to be output in a predetermined order, second filtering processing is performed as to the rearranged and output coefficient data, and the coefficient data of a plurality of sub-bands broken down by frequency band is synthesized so as to generate the image data.

According to a third aspect of the present invention at an encoding device, first filtering processing is hierarchically performed as to image data, a plurality of sub-bands made up of coefficient data broken down by frequency band are generated the generated coefficient data accumulatively stored, and the stored coefficient data is rearranged so as to be output in a predetermined order; and at a decoding device, second filtering processing is performed as to the coefficient data rearranged in a predetermined order and transmitted from the encoding device via a transmission path and the coefficient data of a plurality of sub-bands broken down by frequency band is synthesized so as to generate the image data.

ADVANTAGES

According to the present invention, filtering processing is performed hierarchically as to image data, a plurality of sub-bands made up of coefficient data broken down by frequency band are generated, the generated coefficient data is accumulatively stored, and the stored coefficient data is rearranged so as to be output in a predetermined order, so that at the time of decoding, the coefficient data can be processed in the order in which it is supplied, and the delay time from encoding the image data to decoding of the encoded data and outputting image data can be reduced, as an advantage.

BRIEF DESCRIPTION OF THE DRAWINGS

FIG. 3 is an outlined line drawing for schematically describing wavelet transformation.

FIG. 21 is a diagram illustrating an example of quantized coefficients to be encoded.

REFERENCE NUMERALS

| | |
|---|---|
| 1 | image encoding device |
| 10 | wavelet conversion unit |
| 11 | midway calculation buffer unit |
| 12 | coefficient rearranging buffer unit |
| 13 | coefficient rearranging unit |
| 14 | rate control unit |
| 15 | entropy encoding unit |
| 20 | image decoding device |
| 21 | entropy decoding unit |
| 22 | coefficient buffer unit |
| 23 | wavelet inverse transformation unit |
| 30 | image encoding device |
| 31 | encoding rearranging buffer unit |
| 32 | encoding rearranging unit |
| 41 | image encoding device |
| 42 | image decoding device |
| 43 | coefficient rearranging buffer unit |
| 111 | image encoding device |
| 121 | wavelet transformation unit |
| 122 | quantization unit |
| 123 | entropy encoding unit |
| 161 | line determination unit |
| 162 | VLC encoding unit |
| 163 | maximum significant digit calculating unit |
| 164 | VLC encoding unit |
| 165 | significant digit extracting unit |
| 166 | VLC encoding unit |
| 167 | sign extracting unit |
| 168 | VLC encoding unit |
| 169 | code linking unit |
| 211 | image decoding device |
| 221 | entropy decoding unit |
| 222 | inverse quantization unit |
| 223 | wavelet inverse transformation unit |
| 251 | code dividing unit |
| 252 | line determining unit |
| 253 | generating unit |
| 254 | VLC decoding unit |
| 255 | VLC decoding unit |
| 256 | VLC decoding unit |
| 257 | quantized coefficient synthesizing unit |
| 258 | switching unit |
| 271 | control unit |
| 272 | memory |
| 291 | control unit |
| 401 | buffer |
| 500 | transmission unit |
| 501 | triaxial cable |
| 502 | camera control unit |
| 510 | video signal encoding unit |
| 511 | video signal decoding unit |
| 526 | video signal decoding unit |
| 527 | video signal encoding unit |
| 600 | transmission unit |
| 601 | reception device |
| 602 | video signal encoding unit |
| 612 | wireless module unit |
| 621 | wireless module unit |
| 624 | video signal decoding unit |
| 700 | video camera device |
| 701 | home gaming console |

BEST MODE FOR CARRYING OUT THE INVENTION

Figure 1:
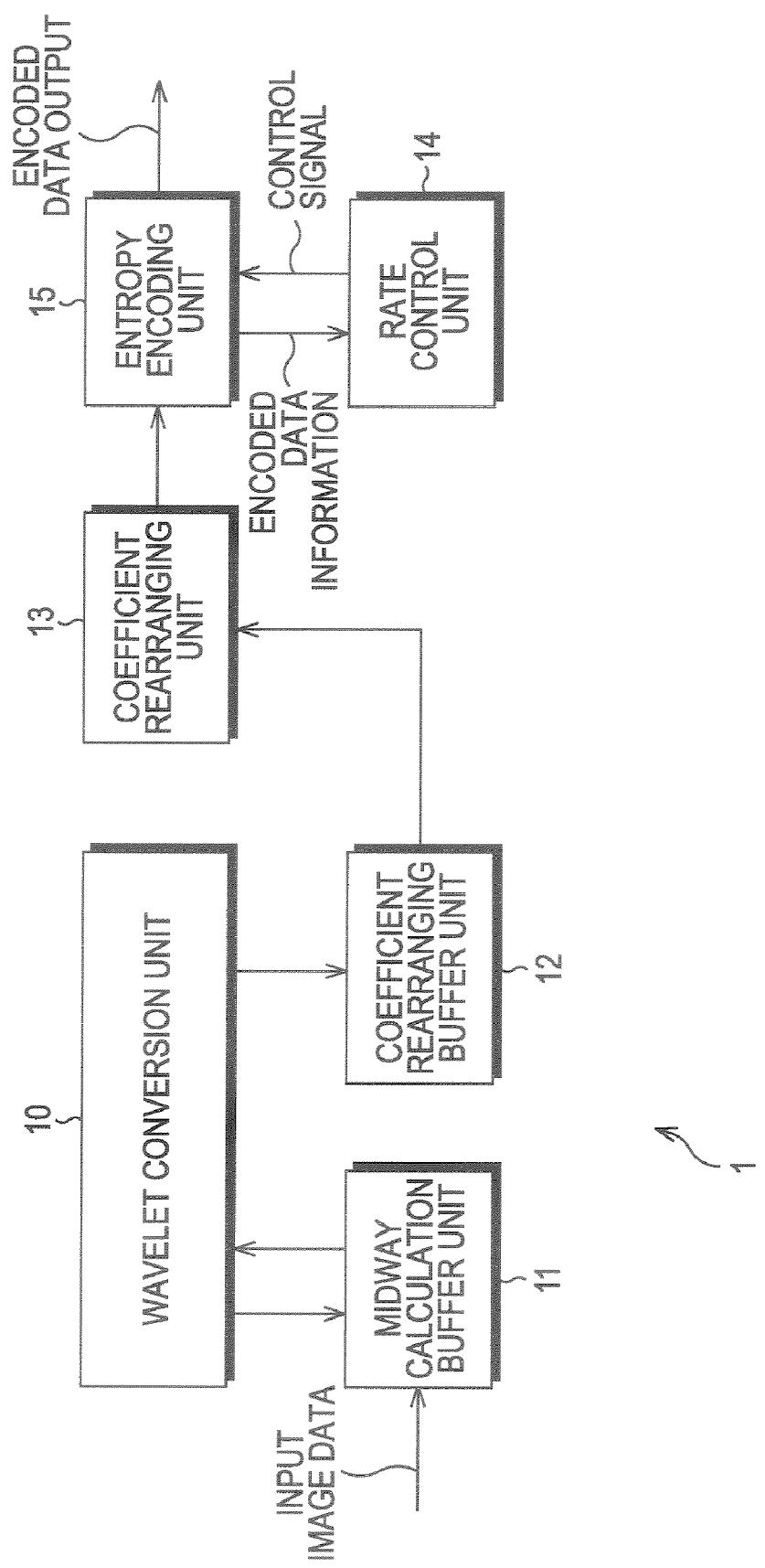
FIG. 1 is a block diagram illustrating the configuration of an example of an image encoding device to which the present invention has been applied.

A first embodiment according to the present invention will be described with reference to the drawings. FIG. 1 shows one configuration example of an image encoding device applicable to the first embodiment of the present invention. An image encoding device 1 comprises a wavelet transformation unit 10, midway calculation buffer unit 11, coefficient rearranging buffer unit 12, coefficient rearranging unit 13, rate control unit 14, and entropy encoding unit 15.

Image data which has been input is temporarily accumulated in the midway calculation buffer unit 11. The wavelet transformation unit 10 performs wavelet transformation on the image data which is accumulated in the midway calculation buffer unit 11. That is to say, the wavelet transformation unit 10 reads the image data from the midway calculation buffer unit 11 and performs filtering processing with an analysis filter to generate coefficient data with lowband components and highband components, and stores the generated coefficient data in the midway calculation buffer unit 11. The wavelet transformation unit 10 has a horizontal analysis filer and vertical analysis filter, and performs analysis filtering processing as to the image data group in both the screen horizontal direction and the screen vertical direction. The wavelet transformation unit 10 reads the lowband component coefficient data again which is stored in the midway calculation buffer unit 11, performs filtering processing as to the read coefficient data with an analysis filter, and further generated coefficient data with highband components and lowband components. The generated coefficient data is stored in the midway calculation buffer unit 11.

The wavelet transformation unit 10 reads coefficient data from the midway calculation buffer unit 11 when this processing has been repeated and the division level has reached a predetermined level, and writes the read coefficient data into the coefficient rearranging buffer unit 12.

The coefficient rearranging unit 13 reads the coefficient data written into the coefficient rearranging buffer unit 12 in a predetermined order, and supplies to the entropy encoding unit 15. The entropy encoding unit 15 encodes the supplied coefficient data with an entropy encoding method such as Huffman coding or arithmetic encoding, for example.

The entropy coding unit 15 is controlled so as to operate in conjunction with the rate control unit 14 wherein the bit rate of the output compression encoding data is a generally constant value. That is to say, the rate control unit 14 supplies a control signal to the entropy coding unit 15 wherein the bit rate of the data subjected to compression encoding by the entropy coding unit 15 ends the coding processing by the entropy coding unit 15 at the point of reaching the target value thereof or immediately prior to reaching the target value thereof, based on the coding data information from the entropy coding unit 15. The entropy coding unit 15 outputs coding data at the point wherein the coding processing ends according to the control signal supplied from the rate control unit 14.

The processing performed at the wavelet transformation unit 10 will be described in further detail. First an overall description of the wavelet transformation will be given. With the wavelet transformation of the image data, as is roughly shown in FIG. 2, the process for dividing the image data into spatial frequencies of highband and lowband is repeated recursively on the data with lowband spatial frequency obtained as a result of the dividing. Thus, by forcing the data with lowband spatial frequency into a smaller region, compression encoding can be made more efficiently.

Figure 2:
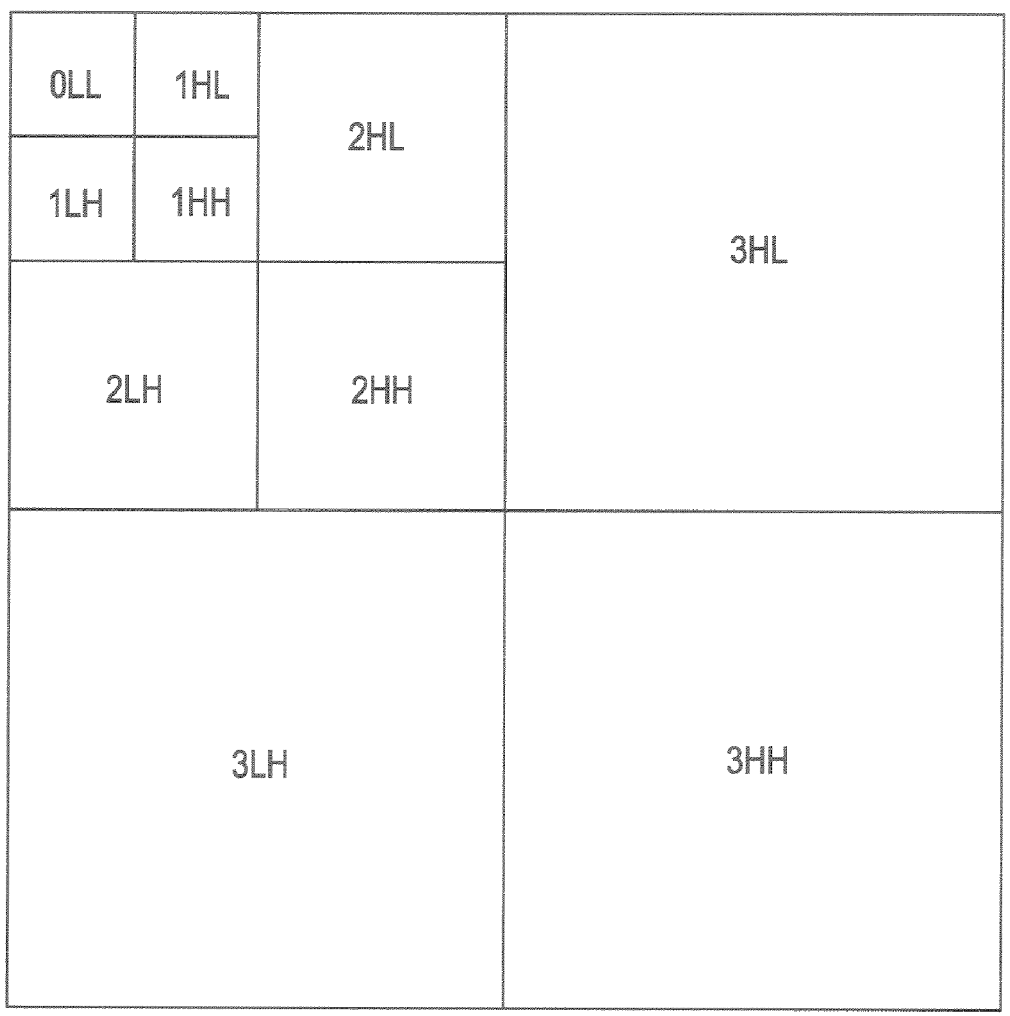
FIG. 2 is an outlined line drawing for schematically describing wavelet transformation.

Note the FIG. 2 is an example in the case wherein the dividing processing of the lowest band component region of the image data is repeated three times into a lowband component region L or highband component region H, whereby the division level=3. In FIG. 2, "L" and "H" denote lowband components and highband components respectively, and the order of "L" and "H" show the band as a result of the front side being dividing horizontally, and the band as a result of the back side being divided vertically. Also, the numbers preceding "L" and "H" denote the division level of the region thereof.

Also, as can be seen from the example in FIG. 2, processing is performed in step fashion from the region at the bottom right of the screen towards the region at the top left, where the lowband components are forced. That is to say, with the example in FIG. 2, the region divided into four parts, wherein the region 3HH at the bottom right of the screen which has the least lowband components (includes the most highband components), has the region at the top left of the screen divided into four divided further into four, and of these the region at the top left is further divided into four. The region in the farthest upper left corner is region 0LL which has the most lowband components.

The transformation and division of the lowband components are repeatedly performed because the energy of the image is concentrated in the lowband components. This can be understood also from the sub-band being formed as shown in FIG. 3B, according to the division level advancing from the state of division level=1 as one example shows in FIG. 3A to the state of division level=3 as one example shows in FIG. 3B. For example the division level of the wavelet transformation in FIG. 2 is 3, and consequently, 10 sub-bands are formed.

The wavelet transformation unit 10 normally performs processing as described above, employing a filter bank configured with a lowband filter and a highband filter. Note that a digital filter normally has an impulse response i.e. a filter coefficient of multiple tap lengths, and therefore needs to perform buffering beforehand of the coefficient data or input image data only for the amount of filter processing to be performed. Also, similar to the case of performing wavelet transformation over multiple steps, the wavelet transformation coefficient generated at the previous step needs to be subjected to buffering only the number of times that filter processing can be performed.

Next, as a specific example of a wavelet transformation applicable to the first embodiment of the present invention, a method employing a 5×3 filter will be described. The method employing a 5×3 filter is an excellent method in that wavelet transformation can be performed with fewer filter taps and is also used with the JPEG 2000 standard as described with reference to conventional technique.

The impulse response (Z-transformation expression of the 5×3 filter is configured with a lowband filter $H_0(z)$ and a highband filter $H_1(z)$ as shown in the following expressions (1) and (2). From the expressions (1) and (2), the lowband filter $H_0(z)$ can be found to have 5 taps and the highband filter $H_1(z)$ can be found to have 3 taps.

$$H_0(z)=(-1+2z^{-1}+6z^{-2}+2z^{-3}-z^{-4})/8 \qquad (1)$$

$$H_1(z)=(-1+2z^{-1}-z^{-2})/2 \qquad (2)$$

According to these Expressions (1) and (2), the coefficients of the lowband components and highband components can be directly computed. Now, by using Lifting technique, the calculations for the filter processing can be lessened. An overview of the processing of the analysis filter side using wavelet transformation in the case of applying lifting technique to a 5×3 filter will be given with reference to FIG. 4.

Figure 4:
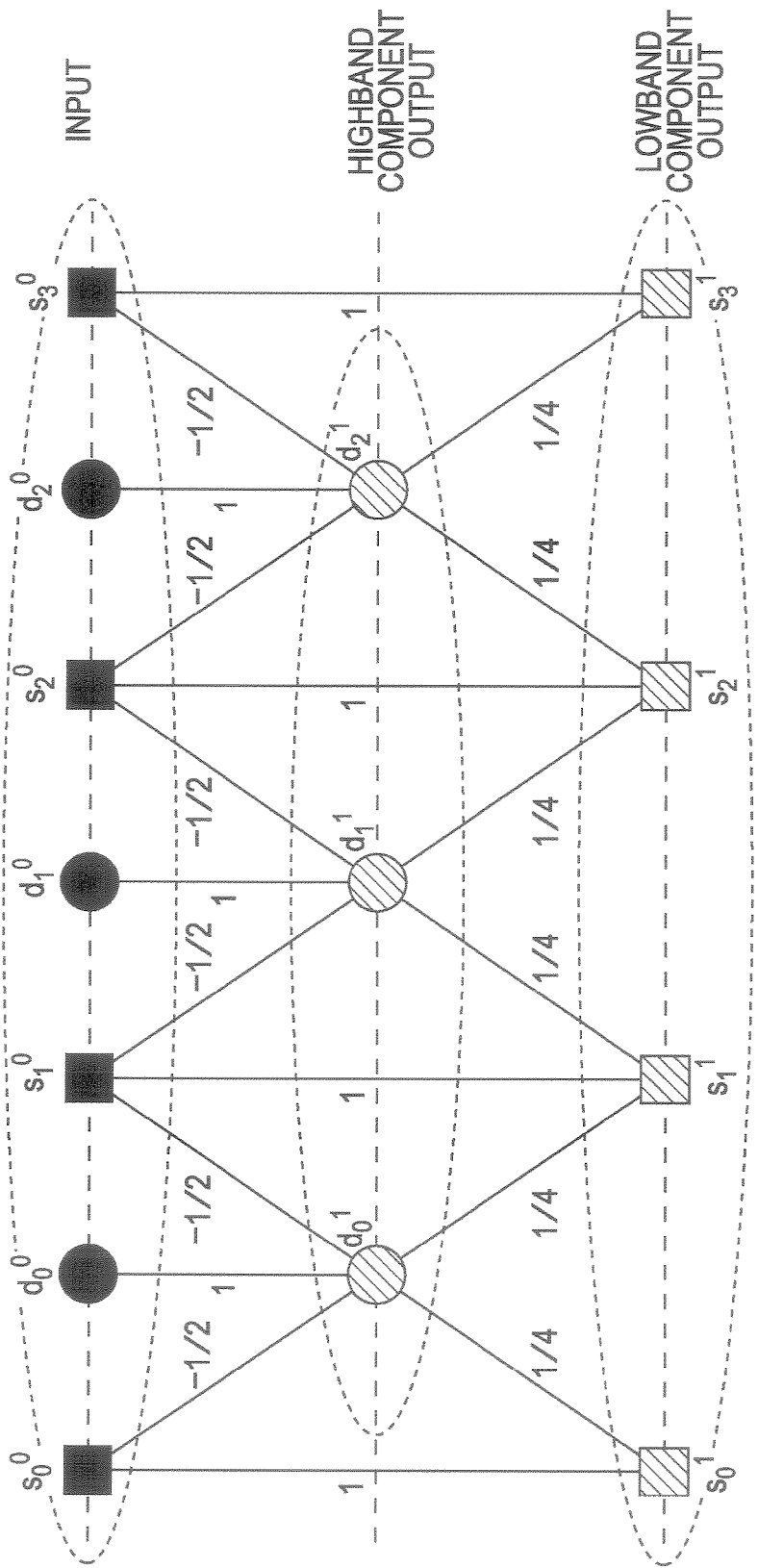
FIG. 4 is an outlined line drawing for schematically describing wavelet transformation in a case of applying lifting technique to a 5×3 filter.

In FIG. 4, the uppermost step portion, the midway step portion, and the bottommost step portion each show pixel columns of the input image, highband component output, and lowband component output. With the uppermost step, this does not need to be limited to the pixel columns of the input image, but can also be a coefficient obtained with the previous filter processing. Here, the uppermost step portion is a pixel column of the input image, wherein a square mark denotes a pixel or line of an even number (starting with 0), and a round mark denotes a pixel or line of an odd number.

First, as the first step, a highband component coefficient $d_i^1$ is generated from the input pixel column in the following expression (3)

$$d_i^1 = d_i^0 - \tfrac{1}{2}(s_i^0 + s_{i+1}^0) \tag{3}$$

Next, as the second step, a lowband component coefficient $s_i^1$ is generated from the following expression (4), employing an odd-numbered pixel of the input image.

$$s_i^1 = s_i^0 + \tfrac{1}{4}(d_{i-1}^1 + d_i^1) \tag{4}$$

With the analysis filter side, the image data of the input image is thus divided into lowband components and highband components by filtering processing.

Figure 5:
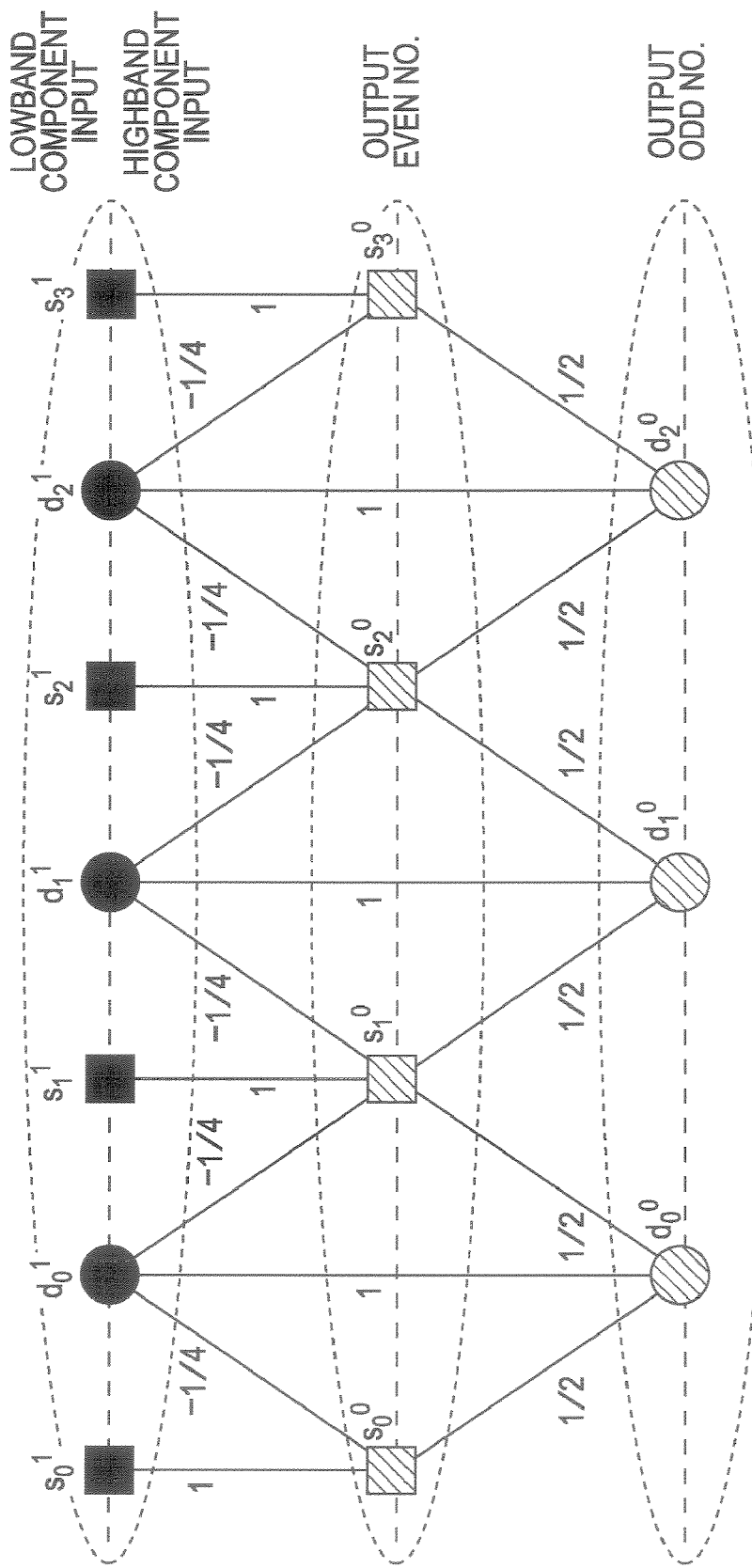
FIG. 5 is an outlined line drawing for schematically describing wavelet transformation in a case of applying lifting technique to a 5×3 filter.

An overview of the processing on the synthesizing filter side, for performing wavelet inverse transformation which restores the coefficient generated by wavelet transformation, will be given with reference to FIG. 5. FIG. 5 corresponds to FIG. 4 described above, employs a 5×3 filter, and shows an example of applying the lifting technique. In FIG. 5, the uppermost step portion shows an input coefficient generated by the wavelet transformation, wherein a round mark denotes a highband coefficient and a square mark denotes a lowband coefficient.

First, as the first step, according to the following expression (5), an even-numbered coefficient $s_i^1$ (starting with 0) is generated from the input lowband component and highband component coefficients $$s_i^0 = s_i^1 - \tfrac{1}{4}(d_{i-1}^1 + d_i^1) \tag{5}$$

Next as a second step, according to the following expression (6), an odd-numbered coefficient $d_i^0$ is generated from the even-numbered coefficient $s_i^0$ generated in the above-described first step and the coefficient $d_i^1$ of the input highband components.

$$d_i^0 = d_i^1 + \tfrac{1}{2}(s_i^0 + s_{i+1}^0) \tag{6}$$

With the synthesizing filter side, the coefficient of the lowband components and highband components are thus synthesized by the filtering processing, and wavelet inverse transformation is performed.

Figure 6:
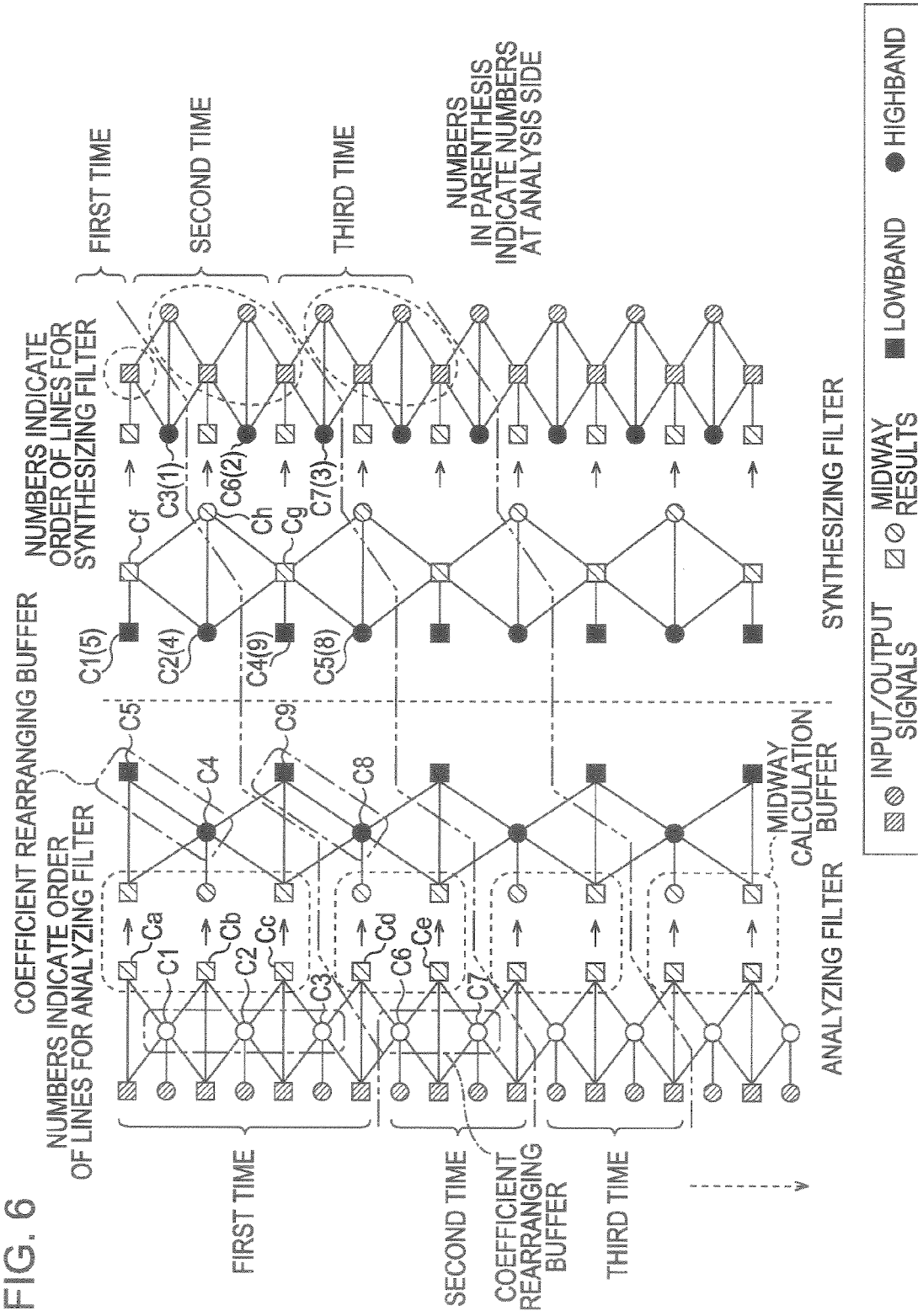
FIG. 6 is an outlined line drawing for schematically describing an example of performing filtering by lifting with a 5×3 filter, to division level=2.

Next, the wavelet transformation method according to the first embodiment of the present invention will be described. FIG. 6 shows an example of the filter processing by 5×3 filter lifting, which has been executed up to the division level=2, with reference to FIG. 4. With FIG. 6, the portion shown on the left side of the diagram as the analysis filter is a filter on the wavelet transformation unit 10 on the image decoding device 1 side. Also, the portion shown as the synthesizing filter on the right side of the diagram is a filter on the wavelet inverse transformation unit on the later-described image decoding device side.

With the description below, with a pixel at the left upper corner of the screen on a display device or the like as the leading pixel, let us say for example that pixels are scanned from the left end to the right end on the screen to configure one line, and scanning of the lines is performed from the upper end of the screen toward the lower end, whereby one screen is configured.

In FIG. 6, the left end column is shows the image data positioned to correspond to the line of the original image data, as lined up in the vertical direction. That is to say, the filter processing with the wavelet transformation unit is performed by the pixels on the screen being scanned vertically employing a vertical filter. The filter processing for the first column through third column of the division level=1 from the left end, is shown, and the fourth through sixth columns show the filter processing of the division level=2. The second column from the left end shows highband component output based on the image of the original image data on the left side, and the third column from the left end shows lowband component output based on original image data and highband component output. The filter processing wherein the division level=2 is processed as to the filter processing output for the division level=1 as shown in column 4 through column 6 from the left end.

With the filter processing wherein division level=1, highband component coefficient data is computed based on original image data pixels as the first step filter processing, and lowband component coefficient data is computed based on the highband component coefficient data computed at the first step filter processing and on original image data pixels. The filter processing for one example of division level=1 is shown in the first through third column on the left side (analysis filter side) in FIG. 6. The computed highband component coefficient data is stored in the coefficient rearranging buffer unit 12 as described in FIG. 1. Also, the computed lowband component coefficient data is stored in the midway calculation buffer unit 11.

In FIG. 6 the coefficient rearranging buffer unit 12 is shown as the portion surrounded with a dashed-dotted line, and the midway calculation buffer unit 11 is shown as the portion surrounded with a dotted line.

The filter processing wherein division level=2 is performed based on the resulted of the division level=1 filter processing held in the midway calculation buffer unit 11. With the division level=2 filter processing, the coefficient data computed as lowband component coefficients in the division level=1 filter processing is taken as coefficient data including lowband components and highband components, and filter processing similar to that of the division level=1 filter processing is performed. The highband component coefficient data and lowband component coefficient data computed with the division level=2 filter processing is stored in the coefficient rearranging buffer unit 12 described with FIG. 1.

At the wavelet transformation unit 10, the filter processing as described above is performed in each of the horizontal direction and vertical direction of the screen. For example, first, division level=1 filter processing is performed in the horizontal direction, and the generated coefficient data with highband components and lowband components are stored in the midway calculation buffer unit 11. Next, division level=1 filter processing is performed in the vertical direction as to the coefficient data stored in the midway calculation buffer unit 11. With this horizontal and vertical directional processing wherein division level=1, four regions are formed, these being the region HH and region HL each formed by the coefficient data from further dividing the highband component into highband components and lowband components, and the region LH and region LL each formed by the coefficient data from further dividing the lowband component into highband components and lowband components.

With the division level=2, filter processing is performed as to the coefficient data of the lowband components generated with the division level=1, in each of the horizontal direction and the vertical direction. That is to say, with the division level=2, the region LL formed by division at the division level=1 is further divided into four regions, thereby forming a region HH, region HL, region LH, and region LL further within the region LL.

With the first embodiment, the filter processing with wavelet transformation is performed multiple times in step fashion, dividing the processing into increments of several lines in the vertical direction of the screen. With the example in FIG. 6, the first-time processing serving as the processing from the first line on the screen performs filter processing for seven lines, and the processing serving as the second-time processing and thereafter from the eighth line performs filter processing in increments of four lines. The number of lines is based on the necessary number of lines for generating one line worth of the lowest band components after dividing into two, the highband components and lowband components.

Hereafter, the collection of lines necessary for generating the one line worth (coefficient data worth one line of a sub-band of lowest band component) of lowest band components, including other sub-bands, is called a line block (or a precinct). Here a line refers to one row worth of pixel data or coefficient data formed within a picture or field, or within each sub-band, corresponding to image data before wavelet transformation. That is to say, a line block (precinct) refers to a pixel data group worth the number of lines necessary for generating coefficient data worth one line of the lowest band component sub-band after wavelet transformation, of the original image data before wavelet transformation, or the coefficient data group of each sub-bands obtained by wavelet transformation of the pixel data group thereof.

According to FIG. 6, the coefficient C5 obtained by the division level=2 filter processing results is computed based on the coefficient $C_a$ stored in the midway calculation buffer unit 11, and the coefficient C4 is computed based on the coefficient $C_a$, coefficient $C_b$, and coefficient $C_c$ stored in the midway calculation buffer unit 11. Further, the coefficient Cc is computed based on the coefficient C2 and coefficient C3 stored in the coefficient rearranging buffer unit 12 as well as on the pixel data in the fifth line. Also, the coefficient C3 is computed based on the pixel data in the fifth line through seventh line. Thus, in order to obtain a lowband component coefficient C5 with the division level=2, the pixel data in the first line through seventh lines are necessary.

Conversely, with the filter processing of the second time and thereafter, the coefficient data already computed up to the previous filter processing and stored in the coefficient rearranging buffer unit 12 can be used, so the number of necessary lines is smaller.

In Other words, according to FIG. 6, of the lowband component coefficients obtained at the division level=2 filter processing results, the coefficient C9 which is the next coefficient following the coefficient C5 is computed based on the coefficient C4 and coefficient C8, as well as on the coefficient $C_c$ stored in the midway calculation buffer unit 11. The coefficient C4 is already computed by the first-time filter processing described above, and is stored in the coefficient rearranging buffer unit 12. Similarly, the coefficient $C_c$ is already computed by the first-time filter processing described above, and is stored in the midway calculating buffer unit 11. Accordingly, with this second-time filter processing, only the filter processing for computing the coefficient C8 is performed anew. This new filter processing is performed employing the eighth line through the eleventh line as well.

Thus, with the second-time filter processing and thereafter, the data already computed up to the previous-time filter processing and stored in the midway calculation buffer unit 11 and the coefficient rearranging buffer unit 12 can be used, so processing can be performed in increments of only four lines each.

Note that in the case that the number of lines on the screen does not match the encoded number of lines the lines of the original image data are duplicated in a predetermined manner to match the encoded number of lines, thereafter performing filtering processing.

While the details will be described later, with the present invention, a decoded image can be obtained with the least delay in the event of transferring encoded data, by performing filtering processing in stages, obtaining only the coefficient data worth one line of lowest band component, divided into several times as to the lines of the entire screen (in increments of line blocks).

In order to perform wavelet transformation, a first buffer employed for executing the wavelet transformation itself and a second buffer for storing the coefficient generated during executing of the processing up to a predetermined division level is needed. The first buffer corresponds to the midway calculation buffer unit 11, and in FIG. 6 is shown surrounded by a dashed-dotted line. The coefficient stored in the second buffer is employed in the event of decoding, thus is an object of entropy encoding processing at a latter step.

The processing at the coefficient rearranging unit 13 will be described. As described above, the coefficient data computed at the wavelet transformation unit 10 is stored at the coefficient rearranging buffer unit 12, rearranged by the coefficient rearranging unit 13 and read out, and transmitted to the entropy encoding unit 15.

As described above, with wavelet transformation, coefficients are generated from the highband component side to the lowband component side. In the example in FIG. 6, at the first time, the highband component coefficient C1, coefficient C2, and coefficient C3 are sequentially generated at the division level=1 filter processing, from the pixel data of the original image. The division level=2 filter processing is then performed as to the lowband component coefficient data obtained at the division level=1 filter processing, whereby lowband component coefficient C4 and coefficient C5 are sequentially generated. That is to say, the first time, coefficient data is generated in the order of coefficient C1, coefficient C2, coefficient C3, coefficient C4, and coefficient C5. The generating order of the coefficient data is always in this order (the order from highband to lowband) based on the principle of wavelet transformation.

Conversely, on the decoding side, in order to immediately decode with low delay, generating and outputting and image from lowband components is necessary. Therefore, rearranging the coefficient data generated on the encoding side from the lowest band component side to the highband component side and supplying this to the decoding side is desirable.

Further detailed description will be given with reference to FIG. 6. The right side of FIG. 6 shows a synthesizing filter side performing inverse wavelet transformation. The first-time synthesizing processing (inverse wavelet transformation processing) including the first line of output image data on the decoding side is performed employing the lowest band component coefficient C4 and coefficient C5, and coefficient C1, generated at the first-time filter processing on the encoding side.

That is to say, with the first-time synthesizing processing, coefficient data is supplied from the encoding side to the decoding side in the order of coefficient C5, coefficient C4, and coefficient C1, whereby on the decoding side, synthesizing processing as to the coefficient C5 and coefficient C4 are performed to generate the coefficient Cf, by synthesizing level=2 processing which is synthesizing processing corresponding to the division level=2, and stores the coefficient Cf in the buffer. Synthesizing processing as to the coefficient Cf and the coefficient C1 is then performed with the synthesizing level=1 processing which is synthesizing processing corresponding to the division level=1, whereby the first line is output.

Thus, with the first-time synthesizing processing, coefficient data generated on the encoding side in the order of coefficient C1, coefficient C2, coefficient C3, coefficient C4, and coefficient C5 and stored in the coefficient rearranging buffer unit 12 is rearranged to the order of coefficient C5, coefficient C4, coefficient C1, and so forth, and supplied to the decoding side.

Note that with the synthesizing filter side shown on the right side of FIG. 6, the coefficients supplied from the encoding side are referenced with a number of the coefficient on the encoding side in parentheses, and shows the line number of the synthesizing filter outside the parentheses. For example, coefficient C1 (5) shows that on the analysis filter side on the left side of FIG. 6 this is coefficient C5, and on the synthesizing filter size is on the first line.

The synthesizing processing at the decoding side by the coefficient data generated with the second-time filter processing and thereafter on the encoding side can be performed employing coefficient data supplied from the synthesizing in the event of synthesizing processing from the previous time or from the encoding side. In the example in FIG. 6, the second-time synthesizing processing on the decoding side which is performed employing the lowband component coefficient C8 and coefficient C9 generated with the second-time filter processing on the encoding side further requires coefficient C2 and coefficient C3 generated at the first-time filter processing on the encoding side, and the second line through the fifth line are decoded.

That is to say, wish the second-time synthesizing processing, coefficient data is supplied from the encoding side to the decoding side in the order of coefficient C9, coefficient C8, coefficient C2, coefficient C3. On the decoding side, with the synthesizing level=2 processing, a coefficient $C_g$ is generated employing coefficient C8 and coefficient C9, and coefficient C4 supplied from the encoding side at the first-time synthesizing processing. A coefficient $C_h$ is generated employing the coefficient $C_g$ and the above-described coefficient C4, and coefficient $C_f$ generated by the first-time synthesizing process and stored in the buffer, and coefficient $C_h$ is stored in the buffer.

With the synthesizing level=1 processing, synthesizing processing is performed employing the coefficient $C_g$ and coefficient $C_h$ generated at the synthesizing level=2 processing and stored in the buffer, the coefficient C2 supplied from the encoding side (shows as coefficient C6 (2) with the synthesizing filter), and coefficient C3 (shows as coefficient C7 (3) with the synthesizing filter), and the second line through fifth line are decoded.

Thus, with the second-time synthesizing processing the coefficient data generated on the encoding side as coefficient C2, coefficient C3, (coefficient C4, coefficient C5), coefficient C6, coefficient C7, coefficient C8, coefficient C9 are rearranged and supplied to the decoding side in the order of coefficient C9, coefficient C8, coefficient C2, coefficient C3, and so forth.

Thus, with the third synthesizing processing and thereafter as well similarly, the coefficient data stored in the rearranging buffer unit 12 is rearranged in a predetermined manner and supplied to the decoding unit, wherein the lines are decoded in four-line increments.

Note that with the synthesizing processing on the decoding side corresponding to the filter processing including the lines at the bottom end of the screen on the encoding side, the coefficient data generated up to then and stored in the buffer are all to be output, so the number of output lines increase. With the example in FIG. 6, eight lines are output during the last time.

Note that the rearranging processing of coefficient data by the coefficient rearranging unit 13 sets the readout addresses in the event of reading the coefficient data stored in the coefficient rearranging buffer unit 12, for example, into a predetermined order.

Figure 7:
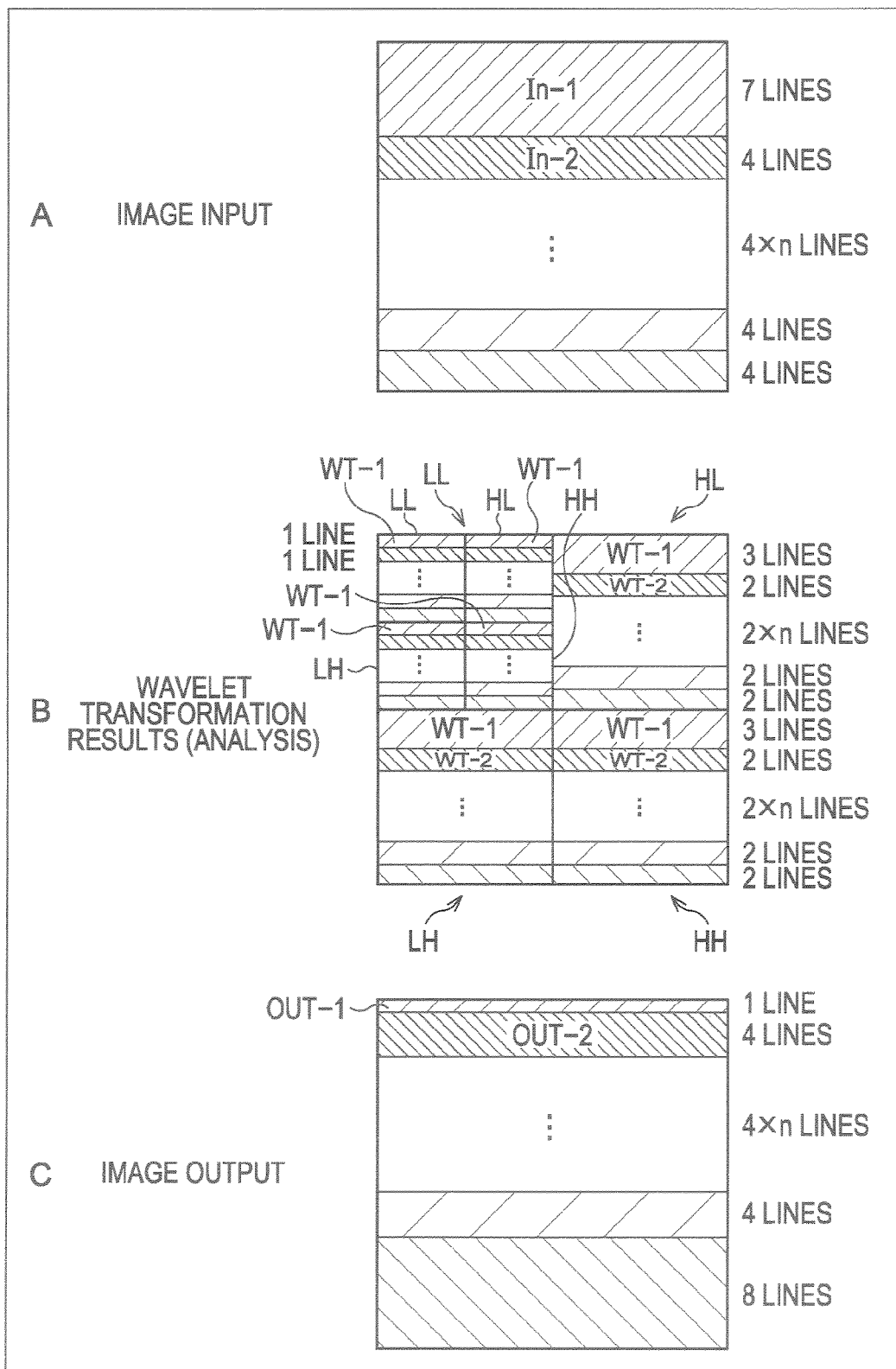
FIG. 7 is an outlined line drawing for schematically describing the flow of wavelet transformation and inverse wavelet transformation according to this invention.

The above processing will be described in further details with reference to FIG. 7. FIG. 7 is an example of performing filter processing by wavelet transformation up to the division level=2 employing a 5×3 filter. With the wavelet transforming unit 10 as one example is shown in A of FIG. 7, the first-time filter processing is performed on the first line through the seventh line of the input image data in each of the horizontal and vertical directions (In-1 of A in FIG. 7).

With the division level=1 processing of the first-time filter processing, the coefficient data for three lines worth of the coefficient C1, coefficient C2, and coefficient C3 is generated, and as one example shows in B of FIG. 7, are each disposed in the region HH, region HL, and region LH formed with the division level=1 (WT-1 of B in FIG. 7).

Also, the region LL formed with the division level=1 is further divided into four with the filter processing in the horizontal and vertical directions by the division level=2. With the coefficient C5 and coefficient C4 generated with the division level=2, one line is disposed in the region LL by coefficient C5 within the region LL by the division level=1, and one line is disposed in each of the region HH, region HL, and region LH, by coefficient C4.

With the second-time filter processing and thereafter by the wavelet transforming unit 10, filter processing is performed in increments of four lines (In-2 . . . of A in FIG. 7), coefficient data is generated in increments of two lines at the division level=1, and coefficient data is generated in increments of one line a the division level=2.

With the example of the second time in FIG. 6 coefficient data worth two lines of the coefficient C6 and coefficient C7 is generated at the division level=1 filter processing, and as one example shows in B of FIG. 7, and is disposed following the coefficient data which is generated at the first-time filter processing of the region HH, region HL, and region LH formed with the division level=1. Within the region LL by the division level=1, the coefficient C9 worth one line generated with the division level=2 filter processing is disposed in the region LL, and the coefficient C8 worth one line is disposed in each of region HH, region HL, and region LH.

In the event of decoding the data subjected to wavelet transformation as in B of FIG. 7, as one example shows in C of FIG. 7, the first line by the first-time synthesizing processing on the decoding side is output (Out-1 in C of FIG. 7) corresponding to the first-time filter processing by the first line through the seventh line on the encoding side. Thereafter, four lines at a time are output on the decoding side (Out-2 . . . in C of FIG. 7) corresponding to the filter processing from the second time until before the last time on the encoding side. Eight lines are output on the decoding side corresponding to the filter processing for the last time on the encoding side.

The coefficient data generated by the wavelet transformation unit 10 from the highband component side to the lowband component side is sequentially stored in the coefficient rearranging buffer unit 12. With the coefficient rearranging unit 13, when coefficient data is accumulated in the coefficient rearranging buffer unit 12 until the above-described coefficient rearranging can be performed, the coefficient data is rearranged in the necessary order and read from the coefficient rearranging buffer unit 12. The read out coefficient data is sequentially supplied to the entropy encoding unit 15.

The entropy encoding unit 15 controls the encoding operation so that the bit rate of the output data becomes the target bit rate based on a control signal supplied from the rate control unit 14, and performs entropy encoding as to the supplied coefficient data. The encoded data subjected to entropy encoding is supplied to the decoding side. As an encoding method, a known technique such as Huffman encoding or arithmetic encoding may be considered. Of course, the method should not be limited to these, and any other encoding method may be employed which is capable of inverse coding processing.

Note that if the entropy encoding unit 15 first performs quantization as to the coefficient data read from the coefficient rearranging unit 1 and performs information source encoding processing such as Huffman encoding or arithmetic encoding as to the obtained quantization coefficient, further improved compression advantages can be expected. For the method of this quantization any method may be used and for example, generally-used means, i.e. means for dividing the coefficient data W by a quantization step size $\Delta$, such as that shown in the following expression (7), may be used.

$$\text{Quantization coefficient} = W/\Delta \tag{7}$$

As described with reference to FIG. 6 and FIG. 7, with the first embodiment according to the present invention, the wavelet transformation unit 10 performs wavelet transformation processing in increments of multiple lines (in increments of line blocks) of image data. The encoded data encoded with the entropy encoding unit 15 is output in increments of these line blocks. That is to say, in the case of performing processing up to division level=2 employing a 5×3 filter, for the output of one screen of data, output is obtained as one line for the first time, four lines each for the second time through the next to last time, and eight lines are output on the last time.

Note that in the case of subjecting the coefficient data after rearranging with the coefficient rearranging unit 13 to entropy encoding, for example in the event of performing entropy encoding on the line of the first coefficient C5 with the first-time filter processing shown in FIG. 6 for example, there is no historical line, i.e. there is no line already generated by the coefficient data. Accordingly in this case, only the one line is subjected to entropy encoding. Conversely, in the event of encoding the line of the coefficient C1, the lines of the coefficient C5 and coefficient C4 become historical lines. These multiple lines nearing one another can be considered to be configured with similar data thus subjecting the multiple lines to entropy encoding together is effective.

Also, as described above, with the wavelet transformation unit 10, an example for performing filter processing with wavelet transformation employing a 5×3 filter is described, but should not be limited to this example. For example with the wavelet transformation unit 10, a filter with a longer tap number such as a 9×7 filter may be used. In this case, if the tap number is longer the number of lines accumulated in the filter also increases, so the delay time from input of the image data until output of the encoded data becomes longer.

Also, with the above description, the division level of the wavelet transformation was described as division level=2 for the sake of description, but should not be limited to this, and division levels can be further increased. The more the division level is increased, the better a high compression rate can be realized. For example, in general, with wavelet transformation, filter processing of up to division level=4 is repeated. Note that as the division level increases, the delay time also increases greatly.

Accordingly, in the event of applying the first embodiment of the present invention to an actual system, determining the filter tap number or the division level is desirable, according to the delay time or picture quality of the decoded image required by the system. The filter tap number or division level does not need to be a fixed value, but can be selectable appropriately as well.

Figure 8:
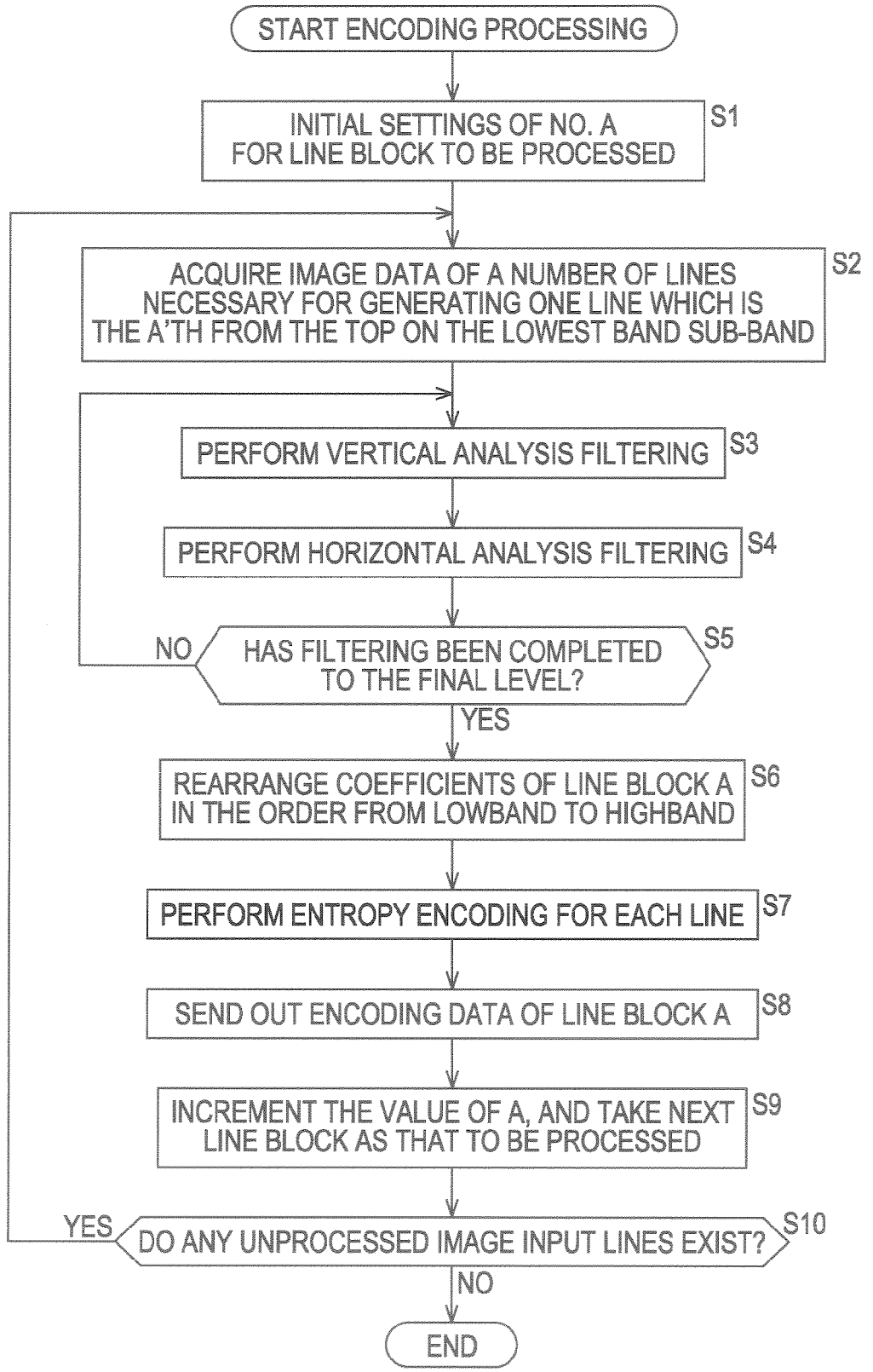
FIG. 8 is a flowchart for describing an example of encoding processing.

Next, a specific flow example of the overall encoding process according to an image encoding device 1 such as that described above with reference to the flowchart in FIG. 8.

Upon the encoding processing starting, in Step S1, the wavelet transformation unit 10 sets No. A of the line block to be processed to initial settings. In normal cases, No. A is set to "1". Upon the setting ending, in step S2 the wavelet transformation unit 10 obtains image data for the line numbers necessary (i.e. one line block) for generating the one line of the A'th line from the top of the lowest band sub-band, in step S3 performs vertical analysis filtering processing for performing analysis filtering as to the image data arrayed in the screen vertical direction as the image data thereof, and in step S4 performs horizontal analysis filtering processing for performing analysis filtering as to the image d arrayed in screen horizontal direction.

In step S5 the wavelet transformation unit 10 determines whether or not the analysis filtering process has been performed to the last level, and in the case of determining the division level has not reached the last level, the process is returned to step S3, wherein the analysis filtering processing in step S3 and step S4 is repeated as to the current division level.

In the event that the analysis filtering processing is determined in step S5 to have been performed to the last level, the wavelet transformation unit 10 advances the processing to step S6.

In step S6, the coefficient rearranging unit 13 rearranges the coefficient of the line block A (the A'th line block form the top of the picture (field, in the case of interlacing method)) in the order from lowband to highband. In step S7 the entropy encoding unit 18 subjects the coefficient to entropy encoding in line increments. Upon the entropy encoding ending, in step S8 the entropy encoding unit 15 transfers the encoded data of the line block A externally.

The wavelet transformation unit 10 increments the value in No. A by "one" in step S9 subjecting the next line block to processing, and in step S10 determines whether or not there are unprocessed image t lines in the picture (field, in the case of interlacing method) to be processed. In the event it is determined there are unprocessed image input lines, the process is returned to step S2, and the processing thereafter is repeated for the new line block to be processed.

As described above the processing in step S2 through step S10 is repeatedly executed to encode each line block. In the event determination is made in step S10 that there are no unprocessed image input lines, the wavelet transformation unit 10 ends the encoding processing for that picture. A new encoding process is started for the next picture.

In the case of a conventional wavelet transformation method, first, horizontal analysis filtering processing is performed on the entire picture (field, in the case of interlacing method), then performs vertical analysis filtering processing on the entire picture. Similar horizontal analysis filtering processing and vertical analysis filtering processing is then performed sequentially on the entire obtained lowband component. As with the above, analysis filtering processing is repeated recursively until the division level reaches the final level. Accordingly, the results of each analysis filtering process needs to be held in the buffer, but in such an event, the buffer needs to hold the filtering results of the entire picture (field, in the case of interlacing method) or the entire lowband component at the division level at that point-in-time, requiring a large memory capacity (the amount of data to be held is great).

Also, in this case, if the wavelet transformation for the entire picture (field, in the case of interlacing method) is not ended, the coefficient rearranging or entropy encoding in latter steps cannot be performed, thus greatly increasing delay time.

Conversely, in the case of the wavelet transformation unit 10 of the image encoding device 1, vertical analysis filtering processing and horizontal analysis filtering processing is continuously performed in increments of line blocks to the last level, as described above, so compared to a conventional method, the amount of data needing to be held buffered) at one time (during the same time period) is small, thus greatly reducing the memory capacity to be prepared in the buffer. Also, by performing the analysis filtering processing to the last level, the later steps for coefficient rearranging or entropy encoding processing can also be performed (i.e. coefficient rearranging or entropy encoding can be performed in increments of line blocks). Accordingly, delay time can be greatly reduced as compared to a conventional method.

Figure 9:
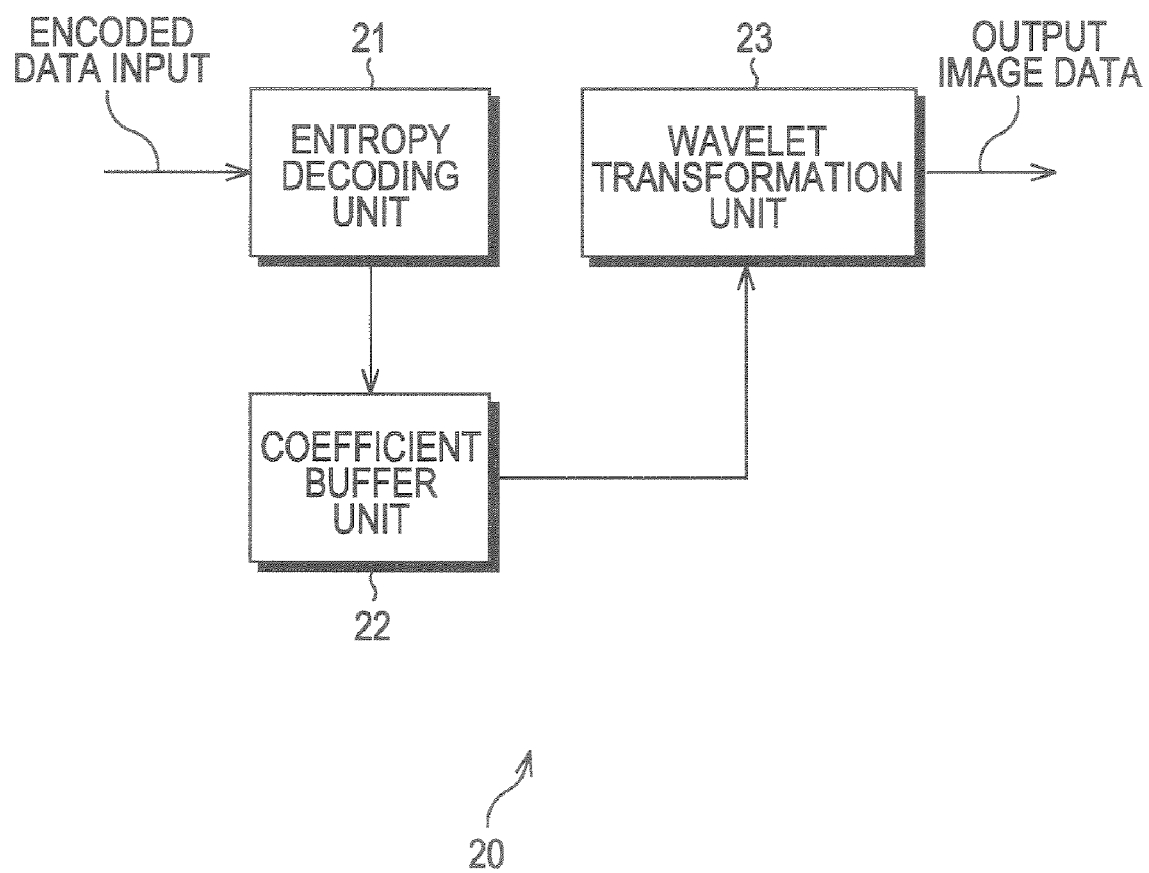
FIG. 9 is a block diagram for illustrating an example of an image decoding device to which the present invention has been applied.

FIG. 9 shows one one example of a configuration of the image decoding device corresponding to the image encoding device 1 in FIG. 1. The encoded data output from the entropy encoding unit 15 (the encoded data output in FIG. 1) of the image encoding device 1 in FIG. 1 is supplied to the entropy decoding unit 21 of the image decoding device 20 in FIG. 9 (the encoded data input in FIG. 9), the entropy encoding is decoded, and becomes coefficient data. The coefficient data is stored in the coefficient buffer unit 22. A wavelet inverse transformation unit 23 employs coefficient data stored in a coefficient buffer unit 22 to perform synthesizing filter processing with the synthesizing filter as described with reference to FIG. 5 and FIG. 6, for example, and stores the results of the synthesizing filter processing again in the coefficient buffer unit 22. The wavelet inverse transformation unit 23 repeats the processing according to the division level to obtain the decoded image data (output image data).

Figure 10:
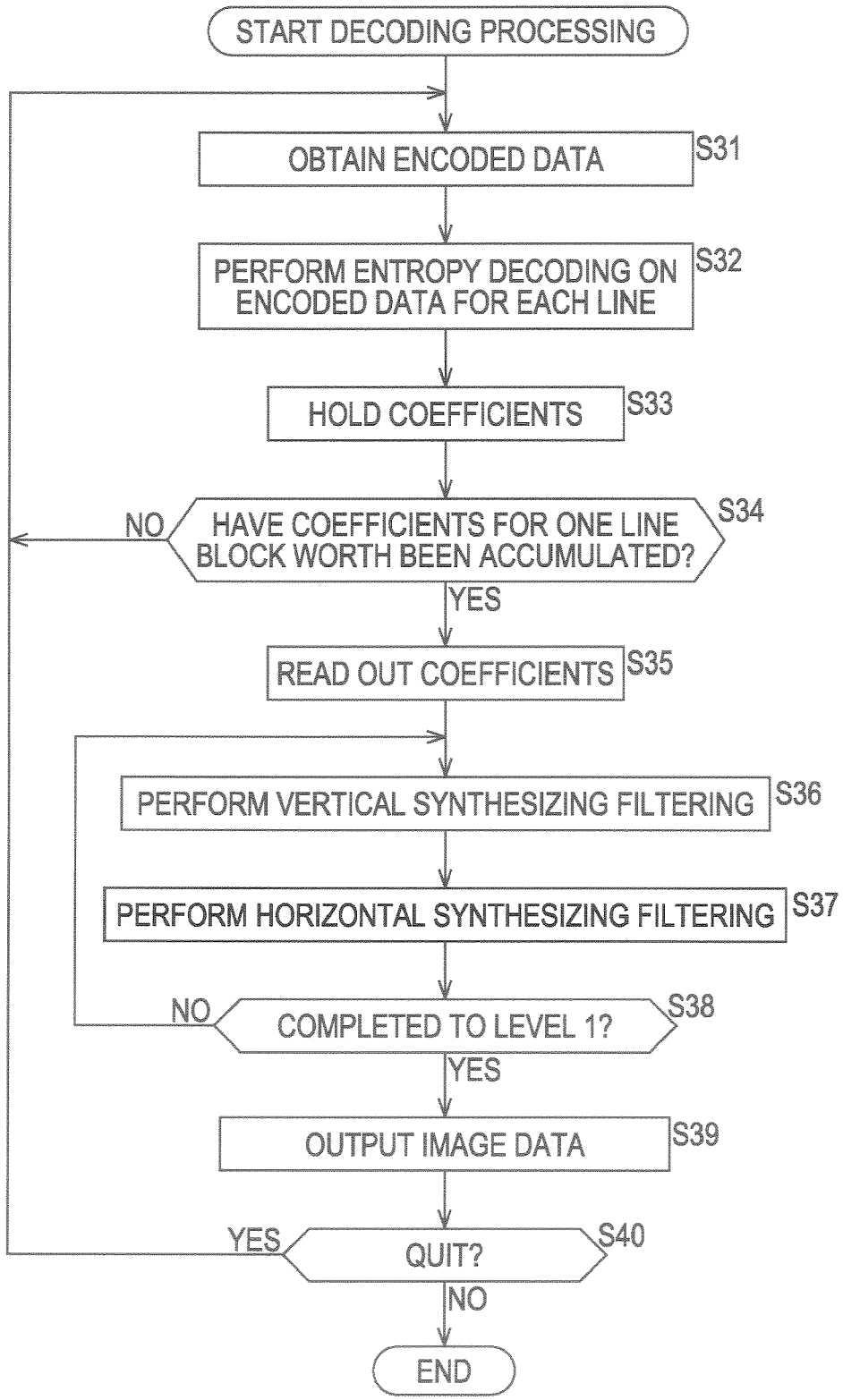
FIG. 10 is a flowchart for describing an example of decoding processing.

Next, a specific flow example of the entire decoding process by the image decoding device 20 such as that above will be described with reference to the flowchart in FIG. 10.

Upon the decoding processing starting, in step S31 the entropy decoding unit 21 obtains the encoded data, and in step S32 subjects the encoded data to entropy decoding in increments of lines. In step S33, the coefficient buffer unit 22 holds the coefficients thus decoded and obtained. In step S34 the wavelet inverse transformation unit 23 determines whether or not a coefficient worth one line block has accumulated in the coefficient buffer unit 22, and if it is determined not to be accumulated, the processing is returned to step S31, the processing thereafter is executed, and the wavelet inverse transformation unit 23 waits until a coefficient worth one line block has accumulated in the coefficient buffer unit 22.

In the event it is determined in step S34 that a coefficient worth one line block has accumulated in the coefficient buffer unit 22, the wavelet inverse transformation unit 23 advances the processing to step S35, and reads out a coefficient worth one line block which is held in the coefficient buffer unit 22.

The wavelet inverse transformation unit 23 subjects the read out coefficient to vertical synthesizing filtering processing which performs synthesizing filtering processing as to the coefficients arrayed in the screen vertical direction, and in step S37, performs horizontal synthesizing filtering processing which performs synthesizing filtering processing as to the coefficients arrayed in the screen horizontal direction, and in step S38 determines whether or not the synthesizing filtering processing has ended through level one (the level wherein the value of the division level is "one"), i.e. determines whether or not inverse transformation has been performed to the state prior to wavelet transformation, and if it is determined not to have reached level one, the processing is returned to step S36 whereby the filtering processing in step S36 and step S37 is repeated.

In step S38, if the inverse transformation processing is determined to have ended through level=1, the wavelet inverse transformation unit 23 advances the processing to step S39, and outputs the image data obtained by inverse transformation processing externally.

In step S40, the entropy decoding unit 21 determines whether or not to end the decoding processing, and in the case of determining that the input of encoded data is intermittent and that the decoding processing will not be ended, the processing returns to step S31, and the processing thereafter is repeated. Also, in step S40, in the case that input of encoded data is ended and so forth so that the decoding processing is ended, the entropy decoding unit 21 ends the decoding processing.

In the case a conventional wavelet inverse transformation method is used, first, horizontal synthesizing filtering is performed on all of the coefficients at the division level to be processed in the screen horizontal direction, and then vertical synthesizing filtering is performed in the screen vertical direction. That is to say for each time the synthesizing filtering processing is performed, the results of the synthesizing filtering processing needs to be held in the buffer, but in such an event the buffer needs to hold the synthesizing filtering results for the division level at that point-in-time, and also all of the coefficients at the next division level, requiring a large memory capacity the amount of data to be held is great).

Also, in this case, the image data output is not performed until all of the wavelet inverse transformation within the picture (field, in the case of interlacing method) so the delay time from input to output greatly increases.

Conversely, in the case of the wavelet inverse transformation unit 23 of the image decoding device 20, as described above, the vertical synthesizing filtering processing and horizontal synthesizing filtering processing is continuously performed in increments of line blocks up to the level=1, therefore compared to a conventional method, the amount of data needing to be buffered at one time during the same time period) is small, thus facilitating reduction in memory capacity to be prepared in the buffer. Also, by performing synthesizing filtering processing wavelet inverse transformation processing) up to level 1, the image data can be output sequentially before all of the image data within a picture is obtained (in increments of line blocks), thus compared to a conventional method the delay time can be greatly reduced.

The operations of various elements of the image encoding device 1 shown in FIG. 1 or the image decoding device 20 shown in FIG. 9 (encoding processing in FIG. 8 or decoding processing in FIG. 10) are controlled according to a predetermined program by an unshown CPU (Central Processing Unit) for example. The program is stored beforehand in an unshown ROM (Read Only Memory) for example. This is not limited however, and the entire device can be operated by interacting timing signals or control signals between each element comprising the image encoding device or image decoding device. Also, the image encoding device or image decoding device may be realized with software running on a computer device.

Next, a second embodiment according to the present invention will be described. With the second embodiment, an arrangement is made wherein, with a system such as that described above in the first embodiment, various elements of the image encoding device 1 and the image decoding device 20 are operated concurrently, thus performing the compression encoding and decoding processing of the image with less delay.

Note that with the second embodiment, the image encoding device 1 and the image decoding device 20 described in the above first embodiment with reference to FIG. 1 through FIG. 10, as well as the encoding method and decoding method, can be applied in the same way so the description of these will be omitted.

Figure 11:
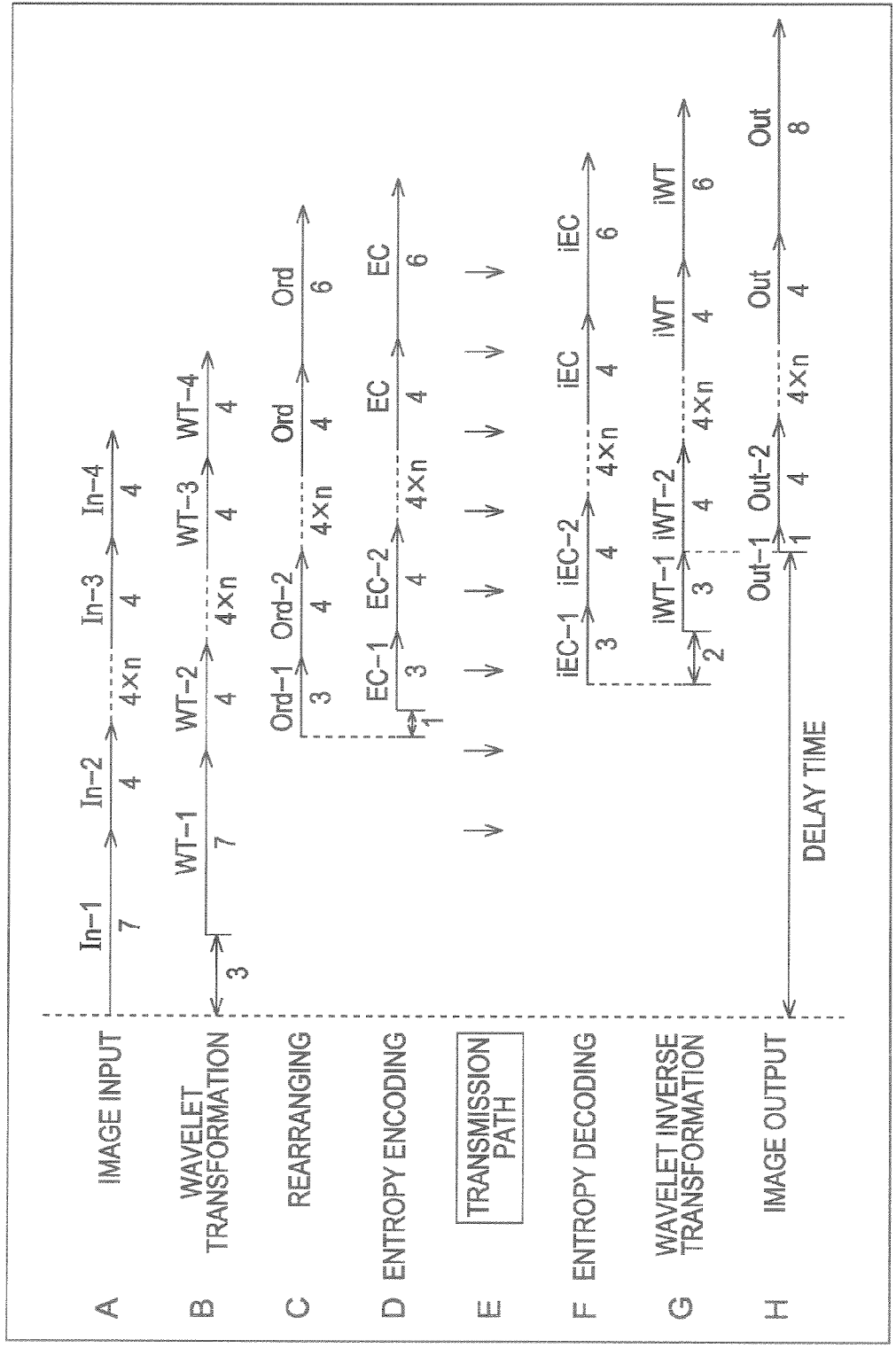
FIG. 11 is an outlined line drawing for schematically describing parallel actions of the components of an image encoding device and image decoding device to which the present invention has been applied.

FIG. 11 is a schematic view of concurrent operations of an example of the various elements of the image encoding device 1 and the image decoding device 20 according to the second embodiment of the present invention. FIG. 11 corresponds to the above-described FIG. 7. The first-time wavelet transformation WT-1 is performed (B in FIG. 11) at the entropy encoding unit 15 as to the image data input In-1 (A of FIG. 11). As described with reference to FIG. 6, the first-time wavelet transformation WT-1 is started at the point-in-time wherein the first three lines are input, and the coefficient C1 is generated. That is to say, from the input of the image data In-1 until the wavelet transformation WT-1 is started, a delay of three lines worth is generated.

The generated coefficient data is stored in the coefficient rearranging buffer unit 12. Hereafter, the input image data is subjected to wavelet transformation, and when the first-time processing ends, the processing moves to the second-time wavelet transformation WT-2.

The image data In-2 input for the purpose of the second-time wavelet transformation WT-2 and the second-time wavelet transformation WT-2 concurrently executes rearranging Ord-1 of three coefficients which are coefficient C1, coefficient C4, and coefficient C5 with the coefficient rearranging unit 13 (C of FIG. 11).

Note that the delay from the end of the wavelet transformation WT-1 to the start of the rearranging Ord-1 may be delays based on a device or system configuration, for example, a delay accompanying the transmittal of a control signal to instruct the rearranging process to the coefficient rearranging unit 13, a delay necessary for the processing start of the coefficient rearranging unit 13 as to a control signal, or a delayed necessary for program processing, and is not an actual delay of the coding processing.

The coefficient data is read from the coefficient rearranging buffer unit 12 in the order in which rearranging is ended, supplied to the entropy encoding unit 15, and subjected to entropy encoding EC-1 (D of FIG. 11). The entropy encoding EC-1 can start without waiting for the end of all of the rearranging of the three coefficients; coefficient C1, coefficient C4, and coefficient C5. For example, at the point in time of the rearranging being ended for the one line from the coefficient C5 which is output first, entropy encoding can begin for the coefficient C5. In this case, the delay from the start of the rearranging Ord-1 processing to the start of the entropy encoding EC-1 processing is one line worth.

The encoded data wherein the entropy encoding EC-1 by the entropy encoding unit 15 is ended is transmitted to the image decoding device 20 via some kind of transmission path (E in FIG. 11). As for a transmission path for transmitting the encoding data for example a communication network such as the Internet may be considered. In this case, encoded data is transmitted by IP (Internet Protocol). However, the arrangement is not restricted to this, and other transmission paths for encoded data may be a communication interface such as IEEE 1394 (Institute Electrical and Electronics Engineers 1394) or a wireless communication represented by the IEEE 802.11 standard or the like.

Following image data input of seven lines worth by the first-time processing into the image encoding device 1, the image data down to the lower edge of the screen is sequentially input. With the image encoding device 1, in accordance with the image data input In-n (n is 2 or more), as described above, wavelet transformation WT-n, rearranging Ord-n, and entropy encoding EC-n are performed in four-Dine increments. The rearranging Ord and entropy encoding EC for the last-time processing at the image encoding device are performed as to six lines. These processes are performed concurrently at the image encoding device 1, as the examples show in A of FIG. 11 through D of FIG. 11.

The encoded data which is encoded by the entropy encoding EC-1 with the image encoding device 1 is transmitted via a transmission path to the image decoding device and supplied to the entropy decoding unit 21. The entropy decoding unit 21 subjects the supplied encoded data which is encoded with the entropy encoding EC-1 to decoding iEC-1 of entropy encoding, sequentially, and restores the coefficient data (F in FIG. 11). The restored coefficient data is sequentially stored in the coefficient buffer unit 22. Upon the coefficient data being stored in the coefficient buffer unit 22 in only an amount able to be subjected to wavelet inverse transformation, the wavelet inverse transformation unit 23 reads the coefficient data from the coefficient buffer unit 22, and performs wavelet inverse transformation iWT-1 employing the read coefficient data (G in FIG. 11).

As described with reference to FIG. 6, the wavelet inverse transformation iWT-1 with the wavelet inverse transformation unit 23 can be started at the point in time of the coefficient C4 and coefficient C being stored in the coefficient buffer unit 22. Accordingly, the delay from the start of the decoding iEC-1 by the entropy decoding unit to the start of the wavelet inverse transformation iWT-1 by the wavelet inverse transformation unit 23 is two lines worth.

Upon the wavelet inverse transformation iWT-1 of three lines worth by the first-time wavelet transformation ended at the wavelet inverse transformation unit 23, output Out-1 of the image data generated with the wavelet inverse transformation iWT-1 is performed (H in FIG. 11). With the output Out-1, the image data of the first line is output, as described with reference to FIG. 6 and FIG. 7.

Following the input of the encoded coefficient data worth three lines by the first-time processing at the image encoding device 1 as to the image decoding device 20, the coefficient data encoded by the entropy encoding EC-n (n is 2 or more) is sequentially input. With the image decoding device 20, entropy decoding iEC-n and wavelet inverse transformation iWT-n is performed as to the input coefficient data in increments of four lines, as described above, and sequentially performs output Out-n of the restored image data by the wavelet inverse transformation iWT-n. The entropy decoding iEC and wavelet inverse transformation iWT corresponding to the last time of the image encoding device are performed as to six lines, and output Out outputs eight lines. These processes are performed concurrently at the image decoding device, as the examples show in F of FIG. 1i through H of FIG. 11.

As described above, by concurrently performing the various processing at the image encoding device 1 and image decoding device 20 in the order from the upper portion of the screen to the lower portion, image compression processing and image decoding processing can be performed with little delay.

The delay time from image input until image output in the case of performing wavelet transformation up to the division level=2 employing a 5×3 filter is calculated with reference to FIG. 11. The delay time from the first line of image data being input in the image encoding device 1 until the first line of image data being output from the image decoding device 20 becomes the total sum of the elements listed below. Note that delays differing due to system configurations, such as delays in the transmission path or delays in accordance with actual processing timing of the various parts of the device, are excluded.

(1) delay D_WT from first line input until ending of wavelet transformation WT-1 for seven lines worth (2) time D_Ord in accordance with rearranging Ord-1 for total of three lines worth (3) time D_EC in accordance with entropy encoding EC-1 for three lines worth (4) time D_iEC in accordance with the entropy decoding iEC-1 for three lines worth (5) m. D_iWT in accordance with the wavelet inverse transformation iWT-1 for three lines worth The delays from the above-described various elements will be calculated with reference to FIG. 11. The delay D_WT in (1) is ten lines worth of time. The time D-Ord in (2), the time D_EC in (3), the time D_iEC in (4), and the time D_iWT in (5) are each three lines worth of time. Also, with the image encoding device 1, entropy encoding EC-1 can be started after one line from the rearranging Ord-1 being started. Similarly, with the image decoding device 20, wavelet inverse transformation iWT-1 can be started after two lines from the entropy decoding iEC-1 being started. Also, the entropy decoding iEC-1 can start processing at the point in time of the encoding worth one line being finished at the entropy encoding EC-1.

Accordingly, with this example, the delay time from the image data of the first line being input into the image encoding device until the image data of the first line being output from the image decoding device is 10+1+1+2+3=17 lines worth.

A more specific example will be given to consider delay time. In the case that the input image data is of an interlaced video signal for HDTV (High Definition Television), one frame is configured with a resolution of 1920 pixels by 1080 lines, for example, and one field is 1920 pixels by 540 lines. Accordingly, if the frame frequency is at 30 Hz, one field of 540 lines is input into the image encoding device 1 in the time 16.67 msec (=1 sec/60 fields).

Accordingly, the delay time in accordance with the input of seven lines worth of image data is 0.216 msec (=16.67 msec× 7/540 lines), which is an extremely short time as to renewal time for one field, for example. Also, regarding the totals of the above described delay D_WT in (1), time D_Ord in (2), time D_EC in (3), time D_iEC in (4), and time D_iWT in (5), the number of lines to be processed are few, so the delay time is extremely shortened. If the elements performing the various processing are arranged as hardware, the processing time can be further shortened.

Next, a third embodiment of the present embodiment will be described. With the above-described first and second embodiments, the coefficient data is rearranged after performing wavelet transformation with the image encoding device 1. Conversely, with the third embodiment according to the present invention, the coefficient data rearranging is performed after entropy encoding. That is to say, with the image encoding device in this case, entropy encoding is performed as to the coefficients generated by subjecting the input image data to wavelet transformation, and rearranging processing is performed on the data subjected to entropy encoding. Thus, by performing coefficient data rearranging after performing entropy encoding, the storage capacity needed for the coefficient rearranging buffer can be suppressed.

For example, in the case that bit precision of the input image data is 8 bits, if the wavelet transformation is performed up to multiple level dividing, the bit precision of the generated coefficient data becomes around 12 bits, for example. In the case of performing coefficient rearranging processing before the entropy encoding processing, the coefficient rearranging buffer unit needs to store a predetermined number of lines worth of the coefficient data with a bit precision of 12 bits. By arranging the coefficient data generated with wavelet transformation to be subjected to rearranging processing after the entropy encoding, the coefficient rearranging buffer can store the data compressed by the entropy encoding, so only requires a small memory capacity.

Figure 12:
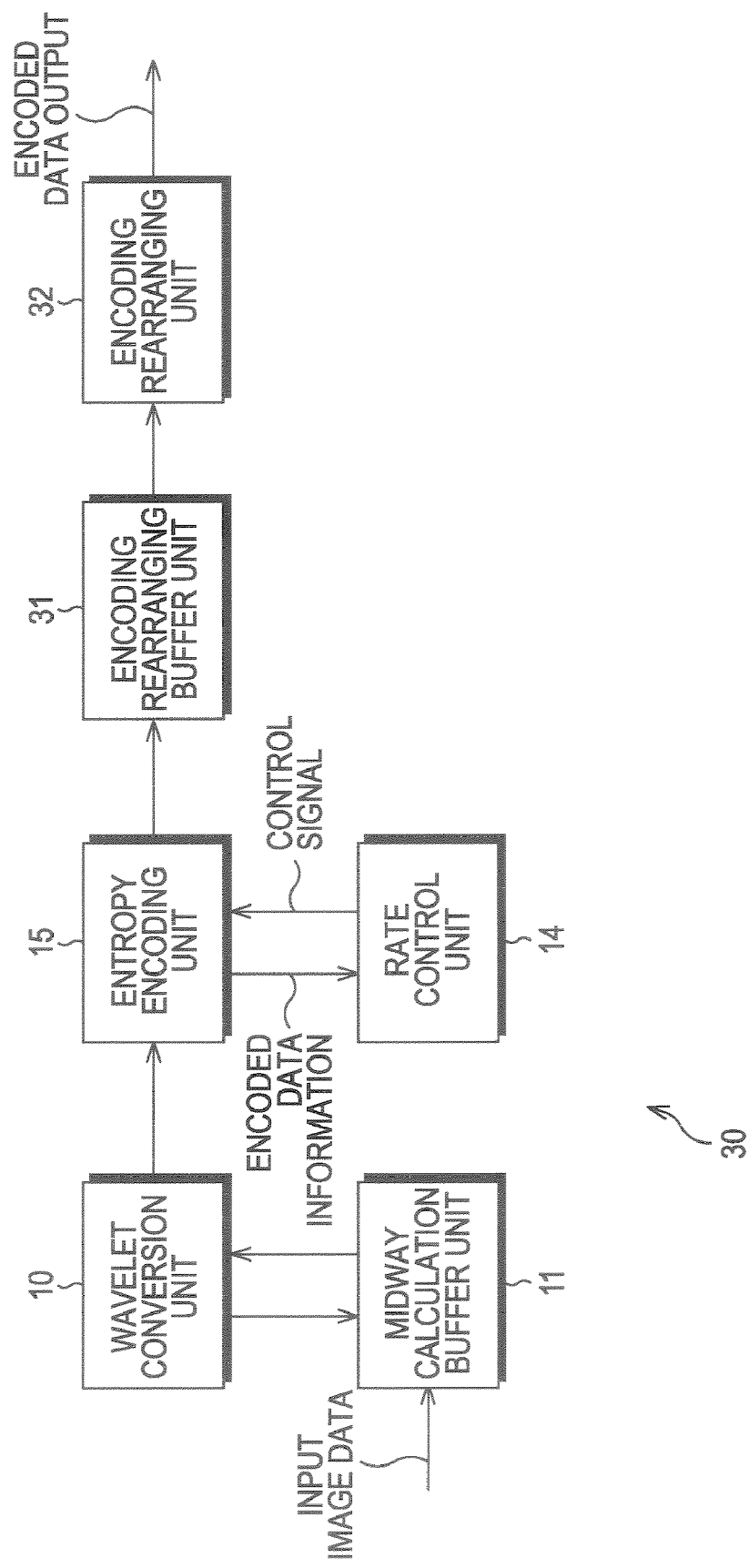
FIG. 12 is a block diagram illustrating the configuration of an example of an image encoding device to which the present invention has been applied.

FIG. 12 shows an example of an image encoding device according to the third embodiment of the present invention. The portions in FIG. 12 common to the above-described FIG. 1 have the same reference numerals, and detailed description thereof will be omitted.

The input image data is temporarily stored in the midway calculation buffer unit 11 of an image encoding device 30. The wavelet transformation unit 10 performs predetermined wavelet transformation as to the image data stored in the midway calculation buffer unit 11, as described with the first embodiment. The coefficient data generated with the wavelet transformation is supplied to the entropy encoding unit 15. The entropy encoding unit 15 operates in conjunction with the rate control unit 14, and is controlled so that the bit rate of the output compression encoding data becomes roughly a fixed value, and performs entropy encoding processing as to the supplied coefficient data. That is to say, the entropy encoding unit 15 encodes the obtained coefficients in the same order as obtained, regardless of the order of the coefficients.

The encoded data wherein the coefficient data generated by the wavelet transformation is subjected to entropy encoding with the entropy encoding unit 15 is temporarily stored in an encoding rearranging buffer unit 31. An encoding rearranging unit 32 rearranges and reads the encoded data from the encoding rearranging buffer unit 31, upon the encoded data to be rearranged is stored in the encoding rearranging buffer unit 31. As already described with the first embodiment, the coefficient data generated with the wavelet transformation unit 10 is generated in the order from highband components to lowband components, from the upper end side of the screen towards the lower end side. In order to output the image data on the decoding side with little delay, the encoding data stored in the encoding rearranging buffer unit 31 is rearranged in the order from lowband components to highband components of the coefficient data by the wavelet transformation, and is read out.

The encoded data read from the encoding rearranging buffer unit 31 is transmitted to a transmission path for example, as output encoded data.

Note that the data encoded and output with the image encoding device 30 according to the third embodiment can be decoded with the image decoding device 20 according to the first embodiment described with reference to FIG. 9, similarly with the case in the first embodiment. That is to say, the encoded data input in the image decoding device 20 via a transmission path for example, is subjected to decoding at the entropy encoding at the entropy decoding unit 21, and the coefficient data is restored. The restored coefficient data is stored sequentially in the coefficient buffer unit 22. The wavelet inverse transformation unit 23 subjects the coefficient data stored in the coefficient buffer unit 22 to wavelet inverse transformation, and outputs the image data.

Figure 13:
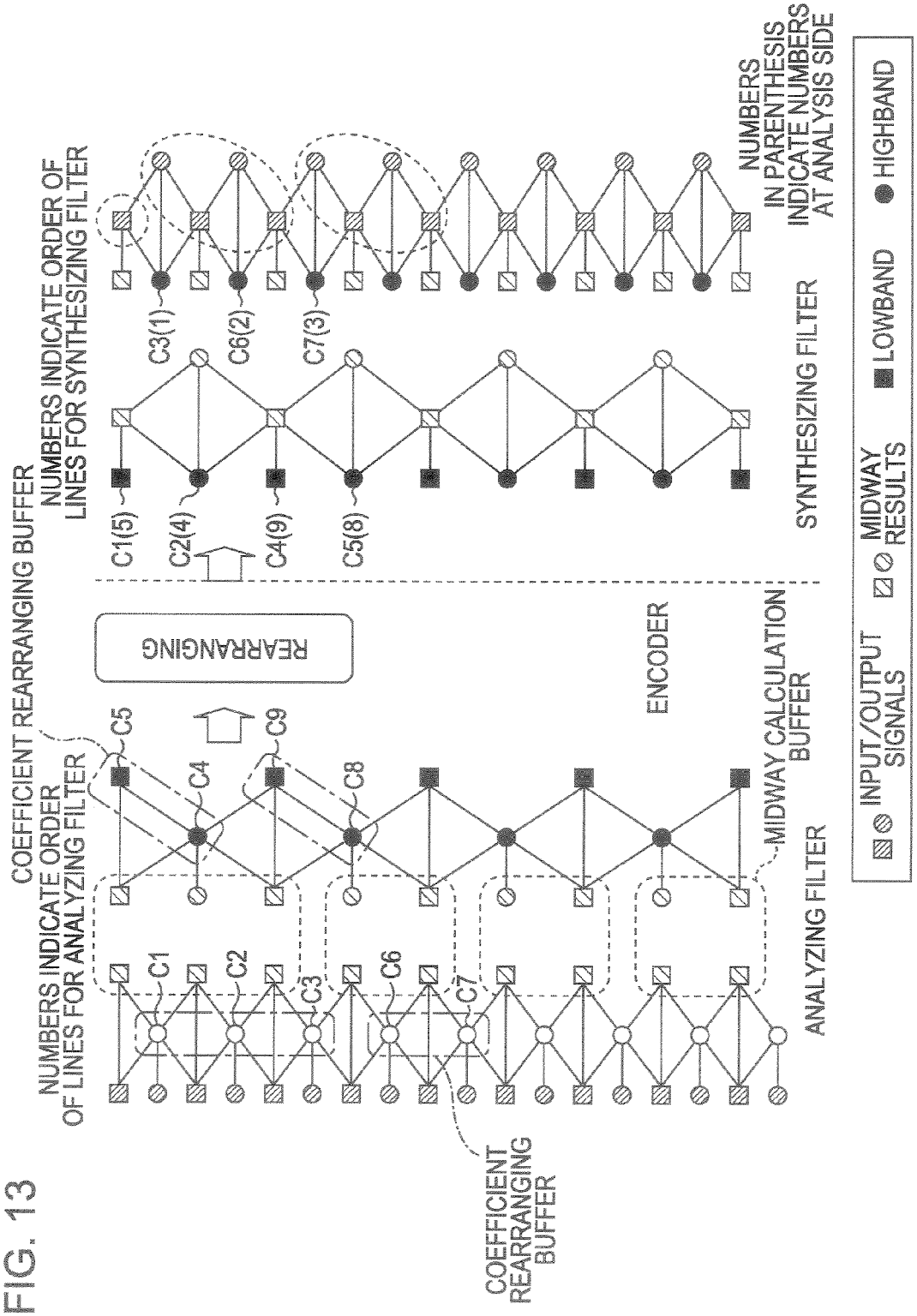
FIG. 13 is an outlined line drawing for describing the low of processing in a case of performing rearranging processing of wavelet coefficients at the image encoding device side.

Next, a fourth embodiment according to the present invention will be described. With the above-described first embodiment through third embodiment perform the rearranging processing of the coefficient data generated with the wavelet transformation on the image encoding device side, as an example shows in FIG. 13. Conversely, with the fourth embodiment of the present invention, the rearranging processing of the coefficient data generated by the wavelet transformation is arranged to be performed at the image decoding device side, as one example shows in FIG. 14.

With the rearranging processing of the coefficient data generated with the wavelet transformation, as described with the above-described third embodiment, a relatively large capacity is needed as storage capacity for the coefficient rearranging buffer, and also high processing ability is required for the processing itself for the coefficient rearranging processing. In this case also, if the processing ability on the image encoding device side is higher than a certain amount, even if the coefficient rearranging processing is performed on the image encoding device side no problems occur, as described in the first through third embodiments.

Here, situations in which an image encoding device is mounted on a device with relatively low processing ability, such as mobile terminals such as a cellular telephone terminal or PDA (Personal Digital Assistant). For example, recently products wherein photography functions are added to cellular telephone terminals have been widely used (called cellular telephone terminal with camera function). A situation may be considered wherein the image data image-captured by a cellular telephone device with camera function is subjected to compression encoding by wavelet transformation and entropy encoding, and transmitted via wireless or cable communications.

Such mobile terminals are restricted in the CPU processing capability thereof, and also have an upper limit to memory capacity. Therefore, the load for processing with the above-described coefficient rearranging is a problem which cannot be ignored.

Figure 14:
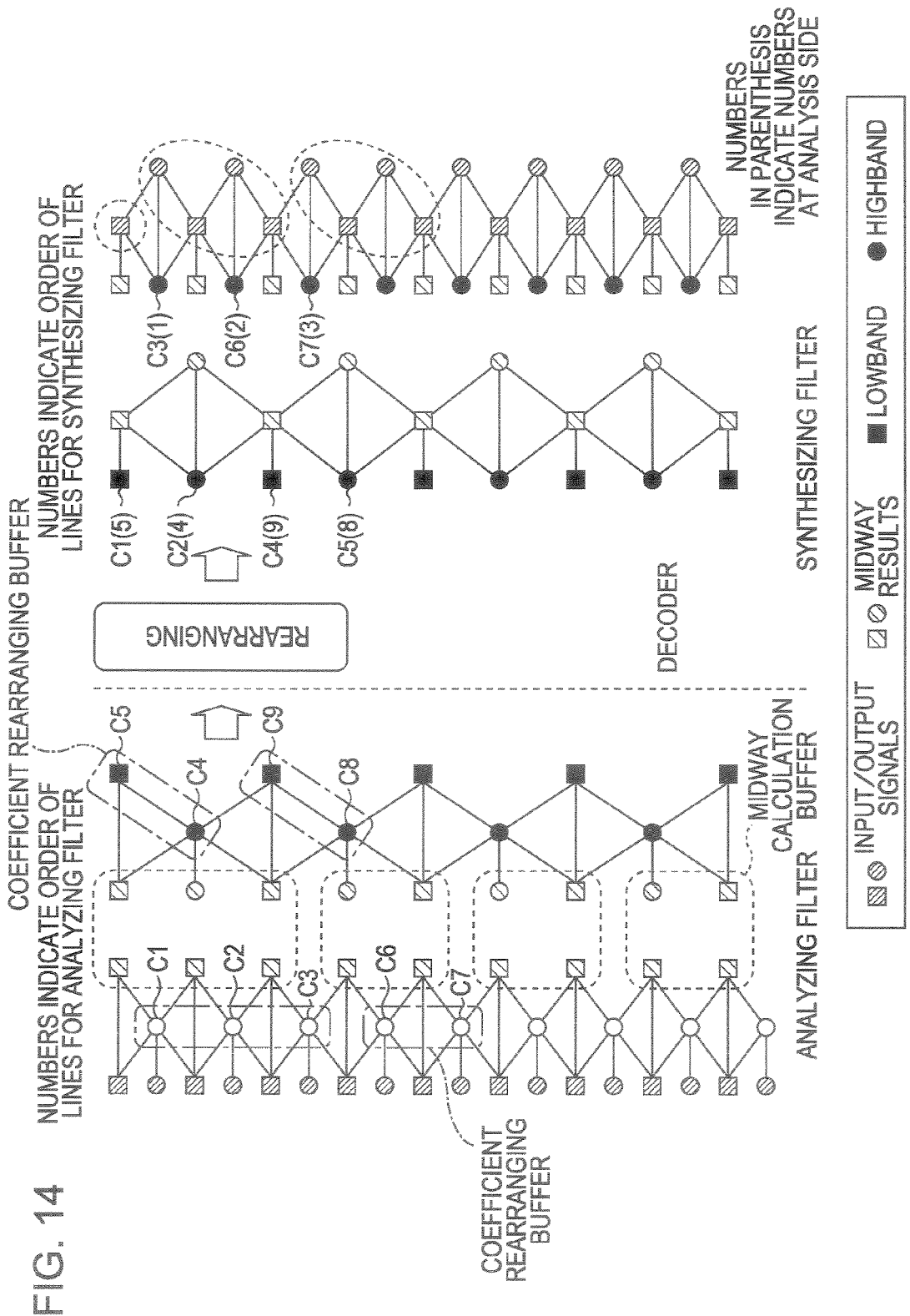
FIG. 14 is an outlined line drawing for describing the flow of processing in a case or performing rearranging processing of wavelet coefficients at the image decoding device side.

Thus, as one example shows in FIG. 14, by building the rearranging processing into the image decoding device side, the load on the image encoding device side can be alleviated, thus enabling the image encoding device to be mounted on a device with relatively low processing ability such as a mobile terminal.

Figure 15:
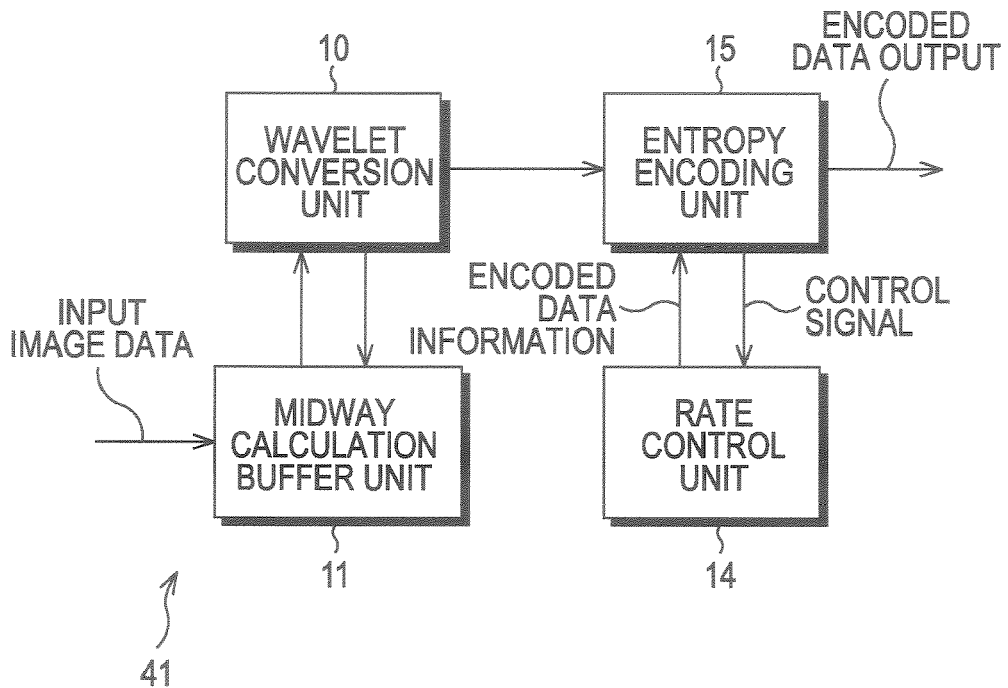
FIG. 15 is a block diagram illustrating the configuration of an example of an image encoding device to which the present invention has been applied.

FIG. 15 shows an example of a configuration of an image encoding device applicable to the fourth embodiment. Note that in FIG. 15, the portions common to the above-described FIG. 1 are given the same reference numerals, and detailed description is omitted.

The configuration of the image encoding device 41 shown in FIG. 15 is arranged as a configuration wherein the coefficient rearranging unit 13 and the coefficient rearranging buffer unit 12 are removed from the configuration of the image encoding device 1 shown in the above-described FIG. 1. In other words, with the fourth embodiment, the image encoding device 41 uses a configuration combing the wavelet transformation unit 10, midway calculation buffer unit 11, entropy encoding unit 15, and rate control unit 14.

The input image data is temporarily accumulated in the midway calculation buffer unit 11. The wavelet transformation unit 10 performs wavelet transformation as to the image data accumulated in the midway calculation buffer unit 11, and supplies the generated coefficient data, sequentially in the order of coefficient data generated, to the entropy encoding unit 15. That is to say, the generated coefficient data is supplied to the entropy encoding unit 15 in the order from highband components to lowband components according to the order of the wavelet transformation. The entropy encoding unit 15 performs entropy encoding on the supplied coefficients with the bit rate of the output data being controlled by the rate control unit 14. The coefficient data generated by the wavelet transformation is output as encoded data having been subjected to entropy encoding.

Figure 16:
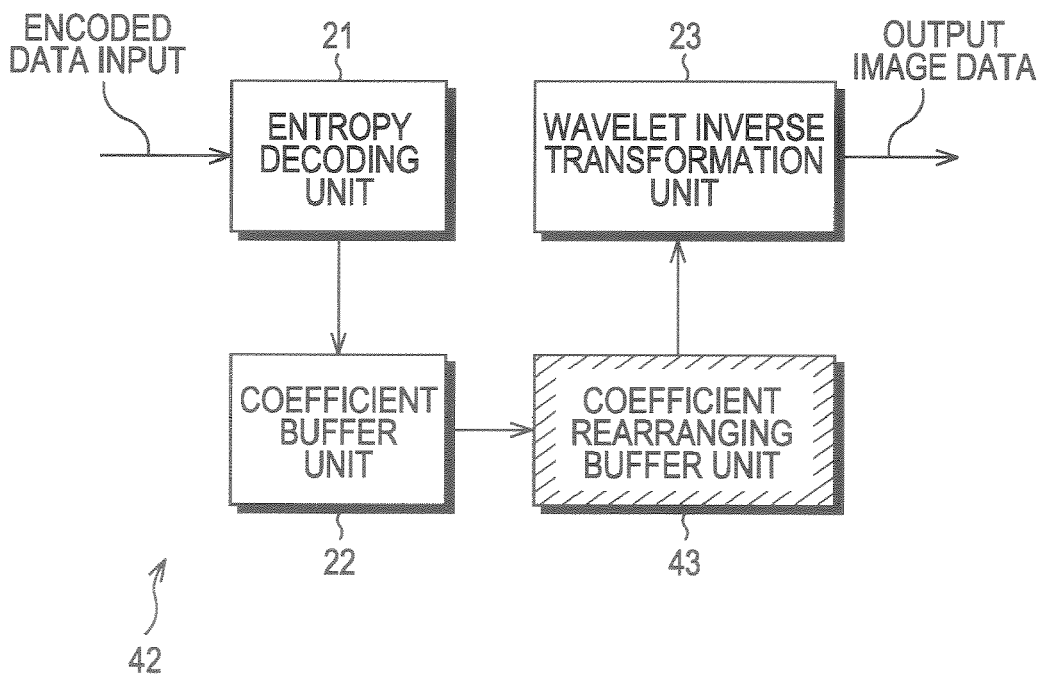
FIG. 16 is a block diagram illustrating the configuration of an example of an image decoding device to which the present invention has been applied.

FIG. 16 shows one example of a configuration of the image decoding device according to the fourth embodiment. Note that in FIG. 16, the portions common to the above-described FIG. 9 are given the same reference numerals, and detailed description is omitted.

The encoded data output from the entropy encoding unit of the image encoded device 41 described in FIG. 15 is supplied to the entropy decoding unit 21 of the image decoding device 42 in FIG. 16, subjected to entropy encoding, and becomes coefficient data. The coefficient data is stored in the coefficient rearranging buffer unit 43 via the coefficient buffer unit 22. Upon coefficient data being accumulated in the coefficient rearranging buffer unit 43 until the coefficient data can be rearranged, the wavelet inverse transformation unit 23 rearranges the coefficient data stored in the coefficient rearranging buffer unit 43 in the order from lowband components to highband components and reads out the coefficient data, then performs wavelet inverse transformation processing employing coefficient data in the order read out. In the case of employing a 5×3 filter, the arrangement thereof is as shown in the above-described FIG. 14.

That is to say, with processing from the beginning of one frame, for example, at the point in time of the coefficient and coefficient C4, and coefficient C5 decoded with the entropy encoding being stored in the coefficient rearranging buffer unit 43 the wavelet inverse transformation unit 23 reads the coefficient data for the coefficient rearranging buffer unit 43 and performs wavelet inverse transformation processing. The data subjected to wavelet inverse transformation with the wavelet inverse transformation unit 23 is sequentially output as output image data.

Note that in the case of the fourth embodiment as well, as described with the above-described second embodiment with reference to FIG. 11, the processing with the various elements of the image encoding device 41 and the encoding data transmission as to the transmission path, and the processing with the various elements of the image decoding device 42 are executed concurrently.

Next, the fifth embodiment of the present invention will be described. With the fifth embodiment, the encoded data transmitted between the image encoding device and image decoded device with the first embodiment through the fourth embodiment is arranged as packets.

Figure 17:
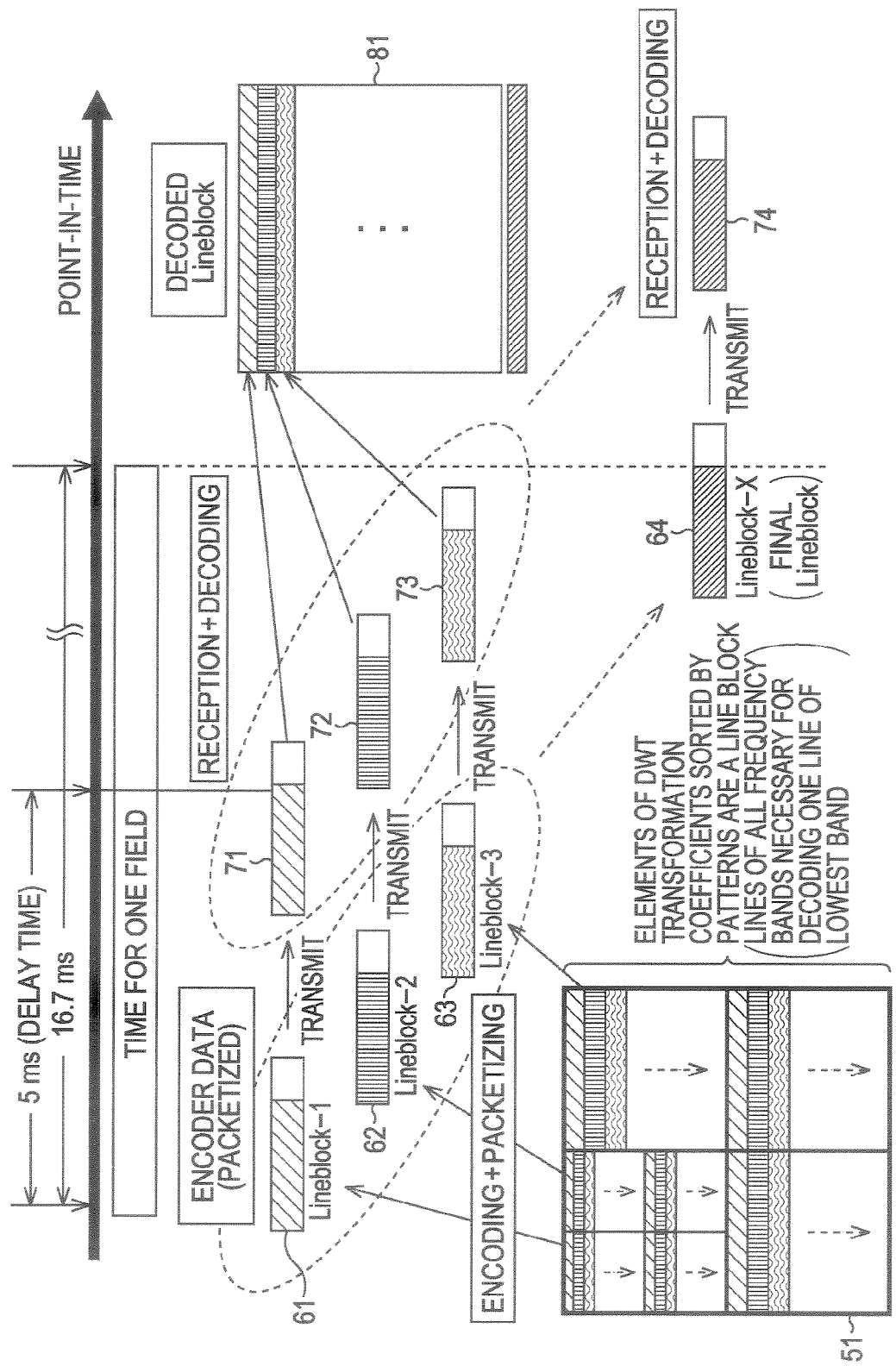
FIG. 17 is a schematic diagram for describing an example of how encoded data is exchanged.

FIG. 17 is a schematic diagram for describing an example of how encoded data is exchanged. In the case of the example shown in FIG. 17, similar to the other embodiments described above, the image data is subjected to wavelet transformation while being input in increments of line blocks, only a predetermined number of lines worth (sub-band 51). In the event of reaching the predetermined wavelet transformation division level the coefficient lines from the lowest band sub-band to the highest band sub-band are rearranged in an inverse order from the order when they were generated, i.e. in the order from lowband to highband.

With the sub-band 51 in FIG. 17, the portions divided out by the patterns of diagonal lines, vertical lines, and wavy lines are each different line blocks (as shown by the arrows, the white space in the sub-band 51 is also divided in increments of line blocks and processed). The coefficients of line blocks after rearranging are subjected to entropy encoding as described above, thus encoded data is generated.

Here, if the image encoding device transmits the encoded data as is, for example the image decoding device may have difficulty identifying the boundaries of the various line blocks (or complicated processing may be required). Thus, with the present embodiment, an arrangement is made wherein the image encoding device attaches a header to the encoded data in increments of line blocks for example, and transmits a packet formed of the header and the encoded data.

In other words, upon the image encoding device generating encoded data (encoder data) of the first line block (Lineblock-1), the encoded data is packetized, and transmitted as a transmission packet 61 to the image decoding device, as shown in FIG. 17. Upon the image decoding device receiving the packet (received packet 71), the encoded data thereof is decoded.

Similarly, upon the image encoding device generated the second line block (Lineblock-2 encoded data, the encoded data is packetized and transmitted as transmission packet 62 to the image decoding device. Upon the image decoding device receiving the packet (received packet 72), the encoded data thereof is decoded. Similarly again, upon the image encoding device generated the third line block (Lineblock-3) encoded data, the encoded data is packetized and transmitted as transmission packet 63 to the image decoding device. Upon the image decoding device receiving the packet (received packet 73), the encoded data thereof is decoded.

The image encoding device and image decoding device repeat the above-described processing until the final X'th line block (Lineblock-X) (transmission packet 64, received packet 74). Thus a decoded image 81 is generated at the image decoding device.

Figure 18:
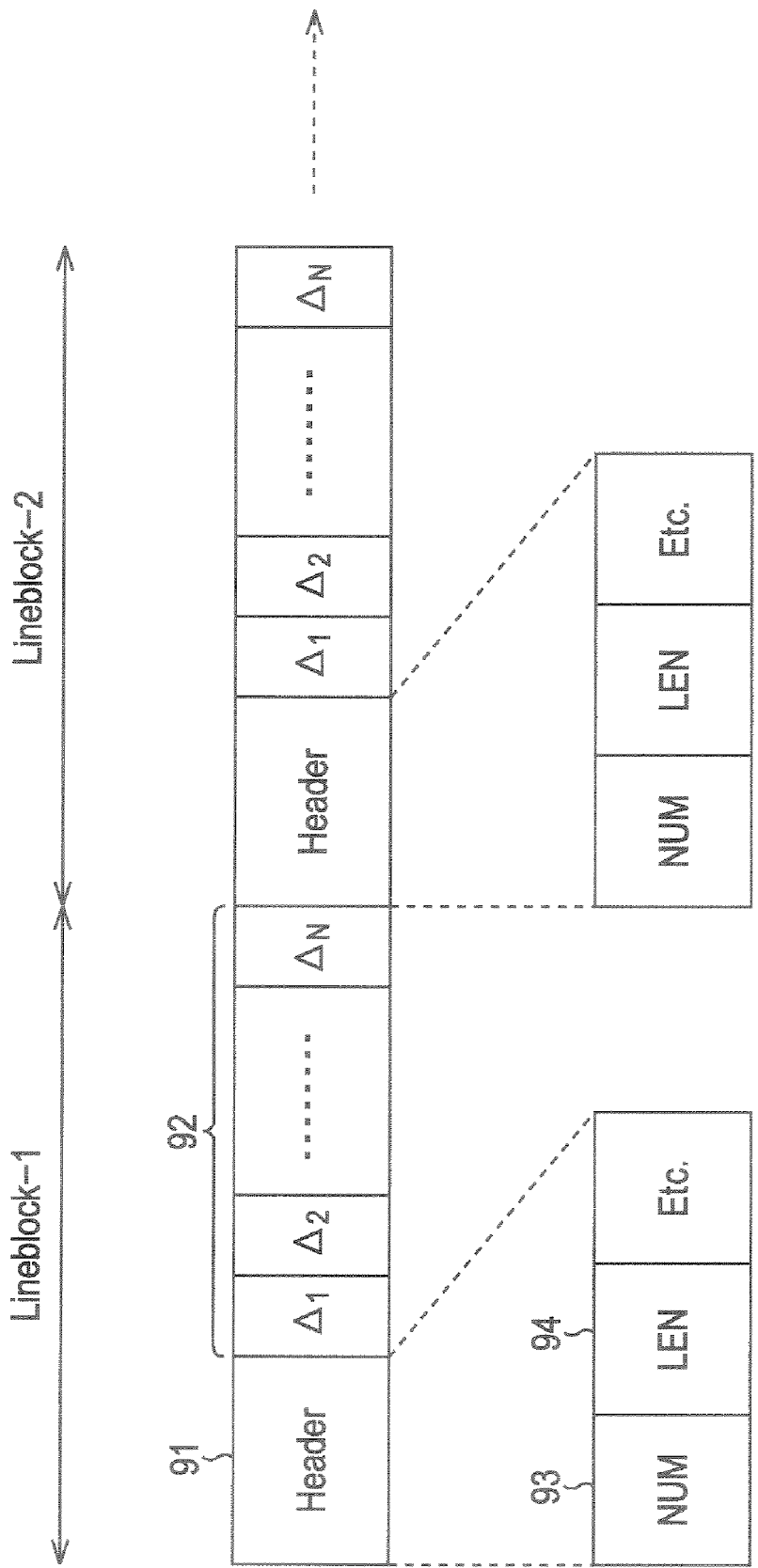
FIG. 18 is a diagram illustrating a configuration example of a packet.

FIG. 18 illustrates a configuration example of a header. As described above, the packet comprises a header (Header) 91 and encoded data, the Header 91 including descriptions of a line block number (NUM) 93 and encoded data length (LEN) 94.

The image decoding device can readily identify the boundaries of each line block by reading this information included in the header added to the received encoded data, thereby decreasing the load on the decoding process or processing time.

Note that as shown in FIG. 18, a description of a quantized step size ($\Delta 1$ through $\Delta N$) 92 in increments of sub-bands configuring the line block may be further added. Thus the image decoding device can perform inverse quantization in increments of sub-bands, thus able to perform further detailed image quality control.

Also, the image encoding device and image decoding device may be arranged to concurrently (in pipeline fashion) execute the above-described various processes of encoding, packetizing, exchange of packets, and decoding as described with the fourth embodiment, in increments of line blocks.

Thus, the delay time until the image output is obtained at the image decoding device can be greatly decreased. As an example, FIG. 17 shows an operation example with interlacing motion pictures (60 fields/sec). With this example, the time for one field is 1 second÷60 approximately 16.7 msec, but by concurrently performing the various processing, the image output can be arranged to be obtained with a delay time of approximately 5 msec.

Next, a sixth embodiment according to the present invention will be described. With the sixth embodiment, a specific example of entropy encoding with the image encoding device and entropy decoding at the image decoding device will be described with the various above-described embodiments. With the various above-described embodiments, any method may be employed for entropy encoding, but by employing the method shown with the present embodiment, the image encoding device can perform encoding with easier computations, thus decreasing delay time, power usage and buffer memory capacity and the like.

Note that as described above, with the various embodiments, encoding can be performed after quantization of the coefficient data in the event of entropy encoding, but the same can be said for the present embodiment, whereby entropy encoding may be performed after subjecting the coefficient data to quantization, or the coefficient data may be subjected to entropy encoding without the quantization. However, as will be described later, the method with performing the quantization facilitates increased image quality, thus hereafter, only entropy encoding with quantization performed will be described. In other words, entropy encoding without performing quantization will be omitted from description, but the description of entropy encoding with quantization performed may be applied thereto.

Also, hereafter descriptions of coefficient rearranging will be omitted. With the above-described various embodiments, description has been given for the case of subjecting the rearranged coefficient data to entropy encoding, the case of rearranging the encoded data having been subjected to entropy encoding, and the case of rearranging coefficient data after entropy decoding. However, the rearranging herein is basically a process for performing wavelet inverse transformation processing at high speed, and basically has no relation to entropy encoding processing (and entropy decoding processing). Also, even in the case of performing coefficient rearranging, the rearranging thereof is performed within the line blocks, therefore basically does not influence the entropy encoding to be described with the present embodiment although specific content thereof will be described later. In other words, the entropy encoding method according to the present example can be similarly used in the case of encoding coefficient data of which the order has been changed, or the case of encoding the coefficient data before rearranging. Accordingly, the description regarding coefficient rearranging will be omitted to simplify the description below.

In other words, hereafter entropy encoding according to the present embodiment will be described with a case wherein quantization processing is performed at the entropy encoding unit 15 of the image encoding device 41 of the fourth embodiment shown in FIG. 15. Note that for similar reasons, the image decoding device also will be described only corresponding to such image encoding device, and descriptions regarding cases of coefficient rearranging or not performing inverse quantization will be omitted.

Figure 19:
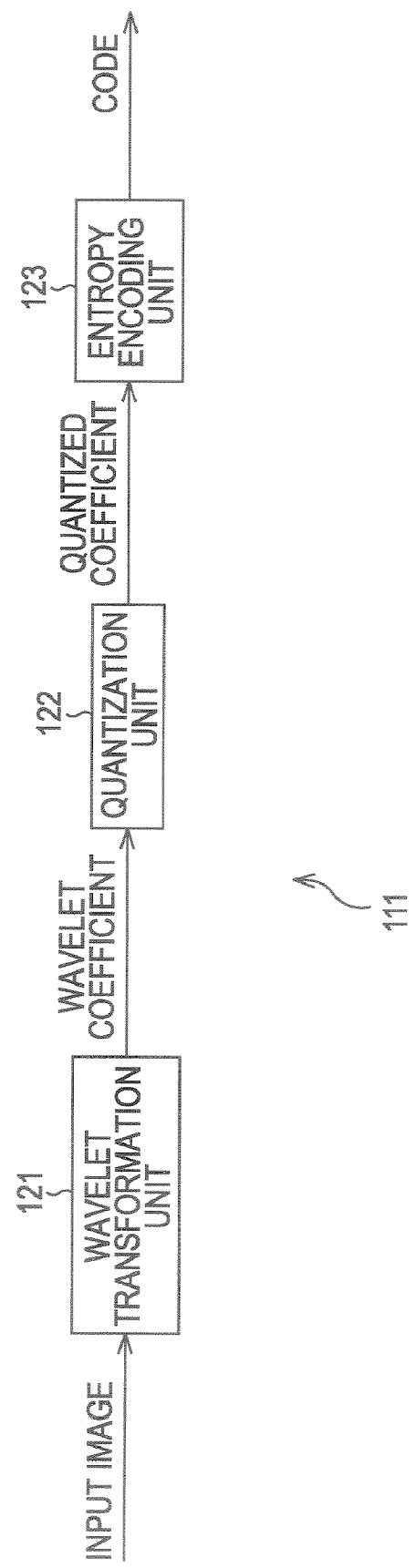
FIG. 19 is a block diagram illustrating the configuration of an example of an image encoding device to which the present invention has been applied.

FIG. 19 is a block diagram illustrating the configuration of an example of an image encoding device to which the present invention has been applied.

An image encoding device 111 has a wavelet transformation unit 121, quantization unit 122, and entropy encoding unit 123.

The wavelet transformation unit 121 for example corresponds to the wavelet transformation unit 10 in FIG. 15, and performs similar processing. That is to say, an image (data) serving as a component signal having been subjected to a DC level shift as necessary is input into the wavelet transformation unit 121, for example. The wavelet transformation unit 121 subjects the input image to wavelet transformation and divides the image into multiple sub-bands The wavelet transformation unit 121 supplies the wavelet coefficient of the sub-band obtained by the wavelet transformation to the quantization unit 122.

The quantization unit 122 quantizes the wavelet coefficients supplied from the wavelet transformation unit 121, and supplies the quantization coefficients obtained as a result thereof to the entropy encoding unit 123.

The entropy encoding unit 123 subjects the quantization coefficients supplied from the quantization unit 122 to entropy encoding, and outputs the encoding thus obtained as encoded image (data). The image output from the entropy encoding unit 123 may be, after subjected to rate control processing, for example, packetized and recorded, or supplied to other devices (not shown) connected to the image encoding device 111.

That is to say, the quantization unit 122 and entropy encoding unit 123 correspond to the entropy encoding unit 15 and rate control unit 14 in FIG. 15 for example.

Next, entropy encoding performed by the entropy encoding unit 123 in FIG. 19 will be described with reference to FIG. 20 and FIG. 21.

Figure 20:
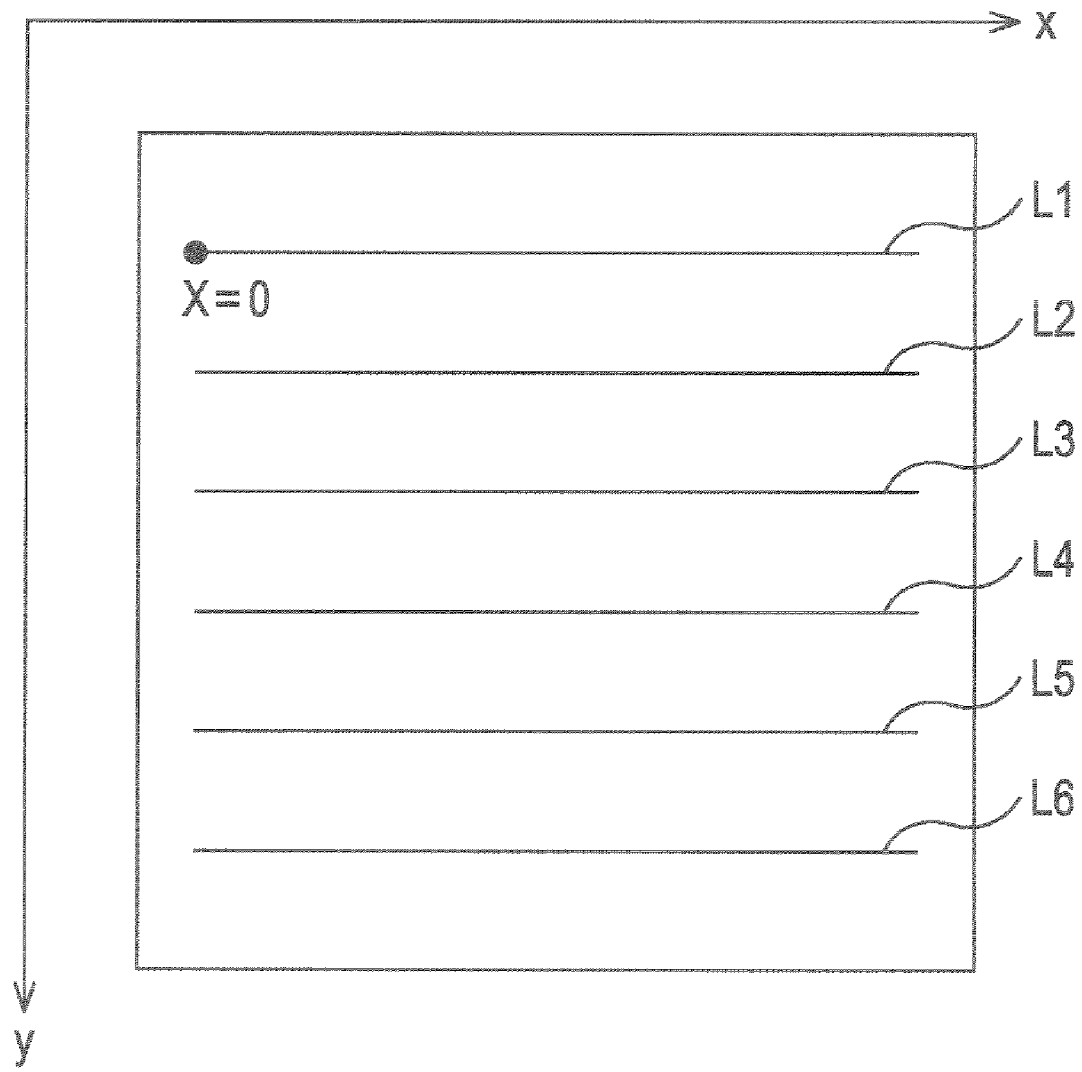
FIG. 20 is a diagram for describing sub-bands.

For example, as shown in FIG. 20, one sub-band is configured from six lines of line L1 through L6, and the position corresponding to the pixel on the line in an xy coordinate system is taken as (x, y). Now, in each of the line diagrams, the x coordinate at the left end position is taken as 0, and the y coordinate at the line L1 is taken as 0.

Quantization coefficients in bit plane expression and at each position (x, y) for the sub-bands are input in raster scan order from line L1 to line L6, from the quantization unit 122 to the entropy encoding unit 123.

In other words, first, a quantized coefficient corresponding to the left end coordinate (0, 0) of line L1 is input into the entropy encoding unit 123, Next, a quantized coefficient corresponding to the coordinate adjacent to the right (1, 0) of the coordinate (0, 0) is input into the entropy encoding unit 123, and quantized coefficients corresponding to corresponding to the coordinates adjacent to the coordinates wherein quantized coefficients have been input are sequentially input into the entropy encoding unit 123 until the coordinate on the right end of the line L1. Upon all quantized coefficients on the coordinates on the Line L1 being input, quantized coefficients corresponding to each coordinate on the line L2, from the coordinate on the left end of line L2 (0, 1) sequentially to the coordinate on the right end, are input into the entropy encoding unit 123, and similarly from line L3 to line L6, the quantized coefficients corresponding to the coordinates on each line are input into the entropy encoding unit 123.

For example in FIG. 21, as shown at the upper left of the diagram, upon twelve quantized coefficients being input into the entropy encoding unit 123 in order from the coordinate on the left end of the line L1 in FIG. 20, the entropy encoding unit 123 encodes the quantized coefficients in increments of a predetermined number w (w=4 in FIG. 21) determined beforehand.

Now, the quantized coefficients illustrated to the upper left in FIG. 21 are each expressed with the absolute values of the code thereof being divided into binary digits (bit-plane expression), and with the example shown in FIG. 21, the quantized coefficients "−0101", "+0011", "−0110", "+0010", "+0011", "+0110", "0000", "−0011", "+1101", "−0100", "+0111", and "−1010", of one line (line L1 in FIG. 20) are input in order to the entropy encoding unit 123.

Each quantized coefficient is made up of a quantized coefficient code expressed as "+" (positive) or "−" (negative) (hereafter called sign (Sign) of the quantized coefficients), and an absolute value of the quantized coefficient expressed in binary. In FIG. 21, of the bits representing the values of each digit of the absolute value of the quantized coefficients, the bit at the top side in the drawing represents the highest order bit (the bit of the highest order digit). Accordingly, with the quantized coefficient "−0101", the sign thereof is "−", and the absolute value expressed in binary is "0101", so the decimal representation of this quantized coefficient is "−5".

First, the entropy encoding unit 123 determines whether or not (the absolute values of) the quantized coefficients of one input line are all 0, and in accordance with the determination results thereof outputs code indicating whether or not all quantized coefficients of the line to be encoded are 0. In the event of determining that the quantized coefficients are all 0, the entropy encoding unit 123 outputs 0 as a code indicating whether or not all quantized coefficients of the line are 0, and ends encoding of the quantized coefficients of the line currently being performed. Also, in the event that determination is made that the value of all quantized coefficients is not 0 (not only quantized coefficients of 0), the entropy encoding unit 123 outputs 1 as a code indicating whether or not all quantized coefficients of the line are 0.

In the event that the twelve quantized coefficients shown to the upper left in the drawing are input, the quantized coefficients variable delay of the input line are not only 0, so the entropy encoding unit 123 outputs 1 as a code, as shown to the upper right in the drawing.

Upon the code 1, indicating that that quantized coefficients are not all 0, is output as a code indicating whether or not all quantized coefficients of the line are 0, next, the entropy encoding unit 123 performs encoding of the first four (w) input quantized coefficients "−0101", "+0011", "−0110", and "+0010".

The entropy encoding unit 123 compares the maximum significant digits of the four consecutive quantized coefficients input this time (the value of the variable B in FIG. 21) with the maximum significant digits of the four (w) quantized encoded (input) the previous time, determines whether or not the maximum significant digit has changed and outputs a code indicating the maximum significant digits of the quantized coefficients.

Now, the maximum significant digits is the maximum significant digits of the quantized coefficient having the greatest value, of the four (w) quantized coefficients to be encoded together. In other words, the maximum significant digit indicates, with the quantized coefficient having the greatest absolute value of the four quantized coefficients, at which digit the 1 of the highest order is. Accordingly, the maximum significant digit of the four quantized coefficients "−0101", "+0011", "−0110", and "0010", to be encoded together, for example, is "3", which is the digit at which the highest order 1 is situated, for the quantized coefficient "−0110" having the greatest absolute value.

Also, the code indicating the maximum significant digits of the quantized coefficients is made up of code indicating whether or not the maximum significant digit has changed, code indicating whether the maximum significant digit has increased or decreased, and code indicating the amount of change in the maximum significant digit and in the event that the maximum significant digit has not changed, the code indicating whether the maximum significant digit has increased or decreased and the code indicating the amount of change in the maximum significant digit are not output.

In the event that the maximum significant digit has changed, from the results of comparison of the maximum significant digits, the entropy encoding unit 123 outputs a code 1 indicating that the maximum significant digit has changed, and in the event that the maximum significant digit has not changed, outputs a code 0 indicating that the maximum significant digit has not changed.

Also, regarding determination of whether or not the maximum significant digit has changed, in the event that the four quantized coefficients are being input for the first time, i.e., in the event that the first quantized coefficients of the sub-band to be encoded are being input (e.g., in the event of the four quantized coefficients being input from the left in order in line L1 in FIG. 20), no quantized coefficients of the sub-band have been encoded previously, so the maximum significant digit of the previously-encoded four (w) quantized coefficients is set to 0.

Accordingly, the entropy encoding unit 123 compares the maximum significant digit of the four quantized coefficients "−0101", "+0011", "−0110", and "+0010", input this time, which is 3, with the maximum significant digits of the four quantized coefficients encoded the previous time, which is 0, and outputs a code 1 since the maximum significant digit has changed.

Also, the entropy encoding unit 123 outputs a code indicating whether the maximum significant digit has increased or decreased, following the code 1 indicating that the maximum significant digit has changed. Here, the entropy encoding unit 123 outputs a 0 in the event that the maximum significant digit has increased, and outputs a 1 in the event that the maximum significant digit has decreased.

The previous maximum significant digit was 0, and the current maximum significant digit is 3, so as shown to the upper right in the drawing, the entropy encoding unit 123 outputs a code 0 indicating that the maximum significant digit has increased.

Further, upon outputting the code indicating whether the maximum significant digit has increased or decreased, the entropy encoding unit 123 outputs a code indicating how much the maximum significant digit has increased or decreased by, i.e., a code indicating the amount of change of the maximum significant digit. Specifically, with the amount of change of the maximum significant digit (i.e., the amount of increase or the amount of decrease) as n, the entropy encoding unit 123 outputs (n−1) code 0s, and outputs a code 1 following these 0s.

In the case of encoding the first four quantized coefficients shown in FIG. 3, the amount of change of the maximum significant digit is 3 (=3−0), so the entropy encoding unit 123 outputs two (=3−1) 0s, and further outputs 1, as code.

Next, the entropy encoding unit 123 outputs code for the maximum significant digits indicating the absolute value of each of the four (w) quantized coefficients to be encoded this time. That is to say, the entropy encoding unit 123 outputs, with regard to each quantized coefficient, code indicating the value of each digit of the absolute value of the quantized coefficient, from the greatest digit of the significant digits indicated by the maximum significant digit, in order to the smallest digit.

The quantized coefficients to be encoded this time are "−0101", "+0011", "−0110", and "+0010", so the entropy encoding unit 123 first outputs code for the maximum significant digits indicating the absolute value of the quantized coefficient "−0101" input first. Here, the maximum significant digit is 3, so the entropy encoding unit 123 outputs the value "1" of the greatest digit of the significant digits indicated by the maximum significant digit of the quantized coefficient "−0101" (i.e., the third digit), the value "0" of the digit one below the greatest digit (the second digit), and the value "1" for the lowest order digit. Thus, the code "101" of the significant digits indicating the absolute value of the quantized coefficient "−0101" is output.

In the same way, the entropy encoding unit 123 outputs, in order, codes "011", "110", and "010", for the significant digits indicating the absolute values of the quantized coefficients "+0011", "−0110", and "+0010". Accordingly, "101011110010" is output as code for the maximum significant digits indicating the absolute values of each of "−0101", "+0011", "−0110", and "+0010". Thus, the entropy encoding unit 123 outputs code of a length corresponding to the maximum significant digits of the four quantized coefficients to be encoded, as code indicating the absolute values of the quantized coefficients.

Finally, the entropy encoding unit 123 outputs code indicating the sign of each of the four (w) quantized coefficients of which the absolute value is not 0. Now, in the event that the sign of the quantized coefficient is "+" (positive), the entropy encoding unit 123 outputs the code 0, and in the event that the sign of the quantized coefficient is "−" (negative), outputs the code 1.

The quantized coefficients to be encoded this time are "−0101", "+0011", "−0110", and "+0010", and the signs of these quantized coefficients are, in order, negative, positive, negative, positive, so as shown to the upper right in the drawing, the entropy encoding unit 123 outputs "1010" as code indicating the sign of each of the quantized coefficients.

Upon the four quantized coefficients first input being encoded, the entropy encoding unit 123 next encodes the following consecutive four quantized coefficients "+0011", "+0110", "0000", and "−0011".

In the same way as with the case of encoding the quantized coefficients input first (the previous time), the entropy encoding unit 123 first compares the maximum significant digit, of the four (w) quantized coefficients newly input this time, with the maximum significant digits of the four (w) quantized encoded the previous time.

The maximum significant digit of the four (w) quantized coefficients input this time, "+0011", "+0110", "0000", and "−0011", is "3", which is the digit at which the highest order 1 is situated, for the quantized coefficient "+0110" having the greatest absolute value, and this is the same as the maximum significant digits of the quantized coefficients encoded the previous time, so the entropy encoding unit 123 outputs a code 0 indicating that the maximum significant digit has not changed.

Next, the entropy encoding unit 23 outputs the code "011100000011", wherein the code for the maximum significant digits "011", "110", "000", and "011" indicating the absolute values of each of the four (w) quantized coefficients "+0011", "+0110", "0000", and "−0011" to be encoded this time, have been arrayed in order.

Upon the code indicating the absolute values of the quantized coefficients having been output, the entropy encoding unit 123 outputs code indicating the sign of each of the four (w) quantized coefficients of which the absolute value is not 0.

The quantized coefficients to be encoded this time are "+0011", "+0110", "0000", and "−0011", and the third quantized coefficient 0000 has an absolute value of 0, so the entropy encoding unit 123 outputs code "001", indicating the signs of these quantized coefficients which are not 0, "+0011", "+0110", and "−0011" (positive, positive, negative).

Upon the four quantized coefficients "+0011", "+0110", "0000", and "−0011" being encoded, the entropy encoding unit 123 next encodes the following consecutive four quantized coefficients "+1101", "−0100", "+0111", and "−0101".

The entropy encoding unit 123 first compares the maximum significant digit of the four (w) quantized coefficients newly input this time, with the maximum significant digits of the four quantized encoded the previous time.

The maximum significant digit of the four (w) quantized coefficients input this time, "+1101", "−0100", "+0111", and "−0101", is "4", which is the digit at which the highest order 1 is situated, for the quantized coefficient "+1101" having the greatest absolute value, and this is the different from the maximum significant digits "3" of the quantized coefficients encoded the previous time, so the entropy encoding unit 123 outputs a code 1 indicating that the maximum significant digit has changed.

Also, the previous maximum significant digit was 3, and the maximum significant digit this time is 4, so the entropy encoding unit 123 outputs a code 0 indicating that the maximum significant digit has increased, as shown to the right side in the drawing.

Further, the entropy encoding unit 123 outputs code indicating by how much the maximum significant digit has increased. In this case, the amount of change of the maximum significant digit is 1 (=4−3), so the entropy encoding unit outputs 0 (=1−1) zeroes, and further outputs a 1 (i.e., outputs a code 1).

Next, the entropy encoding unit 123 outputs the code "1101010001111010", wherein the code for the maximum significant digits "1101", "0100", "0111", and "1010", indicating the absolute values of each of the four (w) quantized coefficients "+1101", "−0100", "+0111", and "−1010" to be encoded this time, have been arrayed in order.

Upon the code indicating the absolute values of the quantized coefficients having been output, the entropy encoding unit 123 outputs code indicating the sign of each of the four (w) quantized coefficients of which the quantized coefficient is not 0.

The quantized coefficients to be encoded this time are "+1101", "−0100", "+0111", and "−1010", and the signs of these quantized coefficients are, in order, positive, negative, positive, negative, so as shown to the lower right in the drawing, the entropy encoding unit 123 outputs "0101" as code indicating the sign of each of the quantized coefficients.

The entropy encoding unit 123 thus encodes consecutive predetermined number (w) of input quantized coefficients. Thus, upon code indicating whether or not all quantized coefficients of the line to be encoded are 0 being output, and code indicating that not all quantized coefficients of the line are 0 being output, from the entropy encoding unit 123, next, code indicating the maximum significant digits of the w quantized coefficients, code indicating the absolute values (bit-plane expression) of the w quantized coefficients, and code indicating the signs of the quantized coefficients, are output.

As for the code indicating the maximum significant digits of these w quantized coefficients, code indicating the absolute values of the w quantized coefficients, and code indicating the signs of the quantized coefficients, code indicating the maximum significant digits of the next w quantized coefficients, code indicating the absolute values of the w quantized coefficients, and code indicating the signs of the quantized coefficients, is repeatedly output, until all quantized coefficients of that line are encoded.

Now, description has been made that the quantized coefficients are encoded in raster scan order, but the order in which the quantized coefficients are encoded does not necessarily have to be in raster scan order. For example, in the case of the quantized coefficients of the sub-band shown in FIG. 20 being encoded, an arrangement may be made wherein the quantized coefficients at the positions (0, 0) (0, 1), (0, 2), and (0, 3) (i.e., the positions at the left end in the drawing of each of line L1 through line L4) are encoded, and next the quantized coefficients at the positions (1, 0), (1, 1), (1, 2), and (1, 3) are encoded, and so on, quantized coefficients at four positions vertically aligned in the drawing are taken as the w quantized coefficients and encoded in order, w at a time.

The entropy encoding unit 123 shown in FIG. 1 which performs processing such as described above is configured as shown in FIG. 22, in further detail.

The entropy encoding unit 123 includes a line determination unit 161, VLC (Variable Length Code) encoding unit 162, maximum significant digit calculating unit 163, VLC encoding unit 164, significant digit extracting unit 165, VLC encoding unit 166, sign extracting unit 167, VLC encoding unit 168, and code linking unit 169.

Quantized coefficients output from the quantization unit 122 (FIG. 19) are supplied (input) to the line determination unit 161, maximum significant digit calculating unit 163, significant digit extracting unit 165, and sign extracting unit 167.

The line determination unit 161 determines whether or not all quantized coefficients of the one line to be encoded that has been input from the quantization unit 122 are 0, and supplies information indicating the results of the determination to the VLC encoding unit 162.

Based on the information indicating the results of the determination made by the line determination unit 161, the VLC encoding unit 162 outputs code, indicating whether or not all quantized coefficients of the line to be encoded are 0, to the code linking unit 169.

The maximum significant digit calculating unit 163 calculates the maximum significant digits of the w continuous quantized coefficients input from the quantization unit 122, and supplies information indicating the calculation results thereof to the VLC encoding unit 164 and significant digit extracting unit 165.

Based on the information indicating the calculation results from the maximum significant digit calculating unit 163, the VLC encoding unit 164 supplies code indicating the maximum significant digits of the w quantized coefficients to the code linking unit 169.

Based on the information indicating the calculation results from the maximum significant digit calculating unit 163, the significant digit extracting unit 165 extracts the significant digits of the w quantized coefficients supplied form the quantization unit 122, and supplies (data of) the extracted significant digits of the quantized coefficients to the VLC encoding unit 166 and sign extracting unit 167.

The VLC encoding unit 16 encodes the absolute values of these quantized coefficients based on the significant digits of the quantized coefficients from the significant digit extracting unit 165, and supplies the absolute values of quantized coefficients obtained thereby to the code linking unit 169.

The sign extracting unit 167 extracts the signs of the quantized coefficients supplied form the quantization unit 122 based on the significant digits of the quantized coefficients from the significant digit extracting unit 165, and supplies (data of) the extracted signs to the VLC encoding unit 168.

The VLC encoding unit 168 encodes the (data of) the extracted signs supplied from the sign extracting unit 167, and supplies code indicating the signs of the quantized coefficients obtained thereby to the code linking unit 169.

The code linking unit 169 links the code indicating whether or not all quantized coefficients of the line are 0, code indicating the maximum significant digits, code indicating the absolute value of the quantized coefficients, and code indicating the signs of the quantized coefficients, supplied from VLC encoding unit 162, VLC encoding unit 164, VLC encoding unit 166, and VLC encoding unit 168 respectively, and outputs as an encoded image (data).

Next, the encoding processing with the image encoding device 111 (FIG. 19) will be described with reference to the flowchart in FIG. 23. This encoding processing is started upon an image (data) to be encoded is input to the wavelet transformation unit 121.

In step S111, the wavelet transformation unit 121 subjects the input image to wavelet transformation, divides the input image into multiple sub-bands, and supplies the wavelet coefficients of each sub-band to the quantization unit 122.

In step S112, the quantization unit 122 quantizes the wavelet coefficients supplied from the wavelet transformation unit 121, and supplies the quantized coefficients obtained as a result thereof to the entropy encoding unit 123. Thus, the quantized coefficients of each position in the sub-bands, in bit-plane expression that has been described with reference to FIG. 21 for example, are input to the entropy encoding unit 123.

In step S113, the entropy encoding unit 123 performs entropy encoding processing, and ends the encoding processing. While details of entropy encoding processing will be described later, in the entropy encoding processing as described with reference to FIG. 21, the entropy encoding unit 123 encodes a consecutive predetermined number (w) of quantized coefficients supplied from the quantization unit 122 at a time, and outputs, as an encoded image data), the code indicating whether or not all quantized coefficients of the line to be encoded are 0, the code indicating the maximum significant digits of the w quantized coefficients, the code indicating the absolute values of the quantized coefficients, and the code indicating the signs of the quantized coefficients.

Thus, the image encoding device 111 encodes and outputs the input image.

Next, the entropy encoding processing corresponding to the processing in step S113 in FIG. 23 will be described with reference to FIG. 24.

Figure 22:
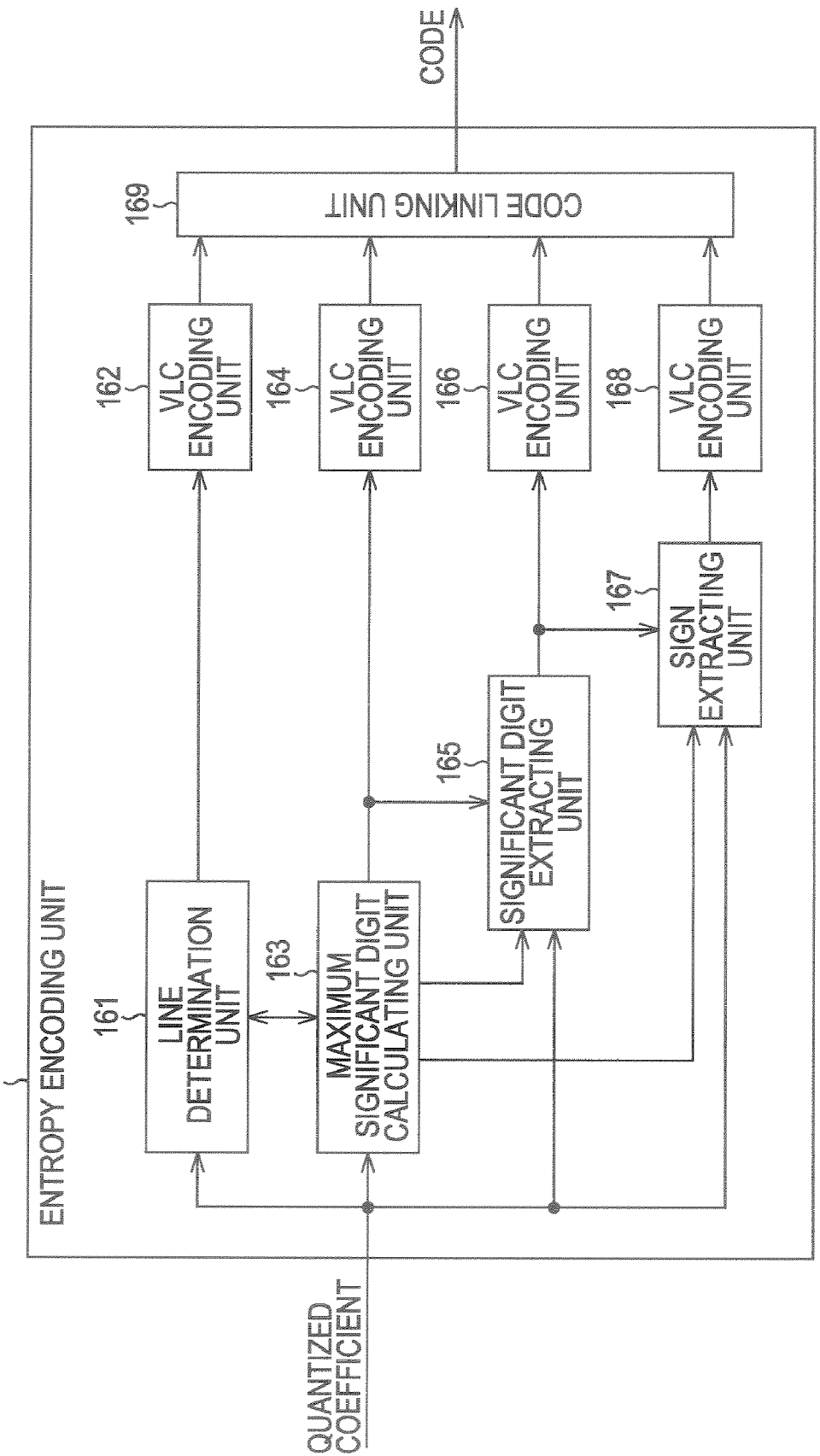
FIG. 22 is a block diagram illustrating a configuration example of an entropy encoding unit.
Figure 23:
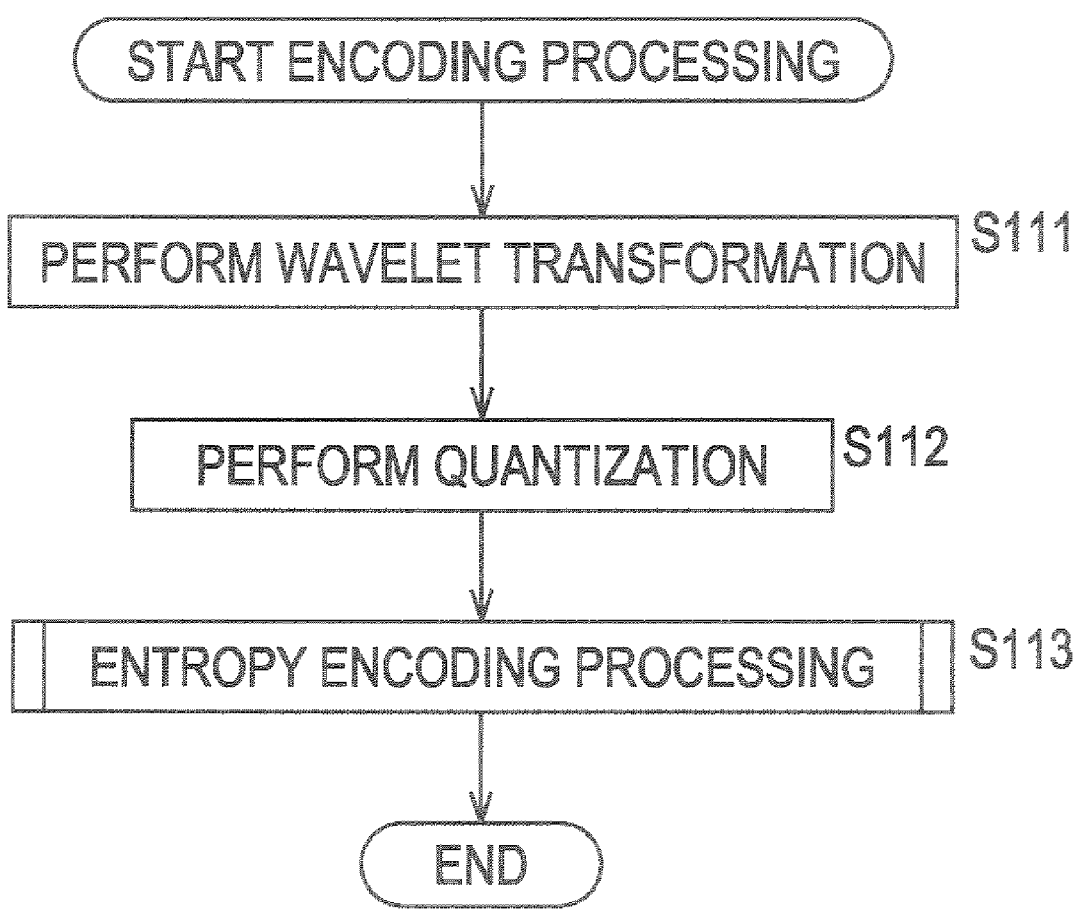
FIG. 23 is a flowchart for describing encoding processing.

In step S112 in FIG. 23, the quantized coefficients output from the quantization unit 122 are supplied (input) to the line determination unit 161, maximum significant digit calculating unit 163, significant digit extracting unit 165, and sign extracting unit 167, of the entropy encoding unit 123 (FIG. 22).

In step S141, the line determination unit 161 takes the variable y indicating the line of the sub-band to be now encoded as y=0, and stores this.

For example, in the event of encoding the quantized coefficients of the sub-band shown in FIG. 20, the line determination unit 161 takes a variable y indicating the lines (line L1 through line L6) as y=0. Note that the line y indicated by the variable y indicates the line of which the y coordinate at each position (x, y) on the line of the sub-band is y. Accordingly, in the event that the variable y which the line determination unit 161 stores is y=0 for example, the line indicated by the variable becomes line L1 of which the y coordinate at each position on the line is 0.

In step S142, the maximum significant digit calculating unit 163 takes a variable Binit indicating the maximum significant digits of the w quantized coefficients input first on the line (y−1) which is one before the line y indicated by the variable y stored in the line determination unit 161 as Binit=0, and stores this.

For example in the event that the line (y−1) is the line L1 shown in FIG. 20, the value of the variable Binit indicating the maximum significant digit of the w quantized coefficients first input on the line (y−1) is the maximum significant digit of the w quantized coefficients from the left edge of line L1 in the drawing, i.e., of the w quantized coefficients at positions (0, 0), (1, 0), . . . , (w−1, 0). Also, in the event that the variable y stored in the line determination unit 161 is y=0, the line (y−1) does not exist, so the value of the variable Binit is Binit=0.

In step S143, the line determination unit 161 determines whether or not (the absolute values of) the quantized coefficients of the line y indicated by the variable y stored therein are all 0. For example, in the event that the line y is the line L1 shown in FIG. 20, the line determination unit 161 determines that all quantized coefficients are 0 in a case that all of the quantized coefficients at the positions (x, y) on the line L1 are 0.

In the event that determination is made in step S143 that the quantized coefficients are all 0 the line determination unit 161 generates information to the effect that all of the quantized coefficients are 0 and supplies this to the VLC encoding unit 162 and the maximum significant digit calculating unit 163, and the flow proceeds to step S144.

In step S144, based on the information to the effect that all of the quantized coefficients are 0, the VLC encoding unit 162 outputs (supplies) a code 0 indicating that all of the quantized coefficients of the line to be encoded are 0 to the code linking unit 169. The code linking unit 169 takes the code 0 supplied form the VLC encoding unit 162 and outputs this without change, as code obtained as the result of encoding of the quantized coefficients of the line y.

In step S145, the maximum significant digit calculating unit 163 sets the value of the variable Binit stored therein to Binit=0, and updates the variable Binit, based on the information to the effect that all of the quantized coefficients are 0 from the line determination unit 161.

In step S146, the line determination unit 161 determines whether or not there are any unprocessed lines in the lines of the sub-band being encoded. That is to say, the line determination unit 161 determines whether or not the quantized coefficients of all of the lines other sub band being encoded, have been encoded. For example, in a case of encoding the quantized coefficients of the sub-band shown in FIG. 20, the line determination unit 161 determines that there are not unprocessed lines existing at the point that the quantized coefficients at all of the positions on line L1 through L6 have been encoded.

In the event that determination is made in step S146 that there is an unprocessed line, the line determination unit 161 advances the flow to step S147 to encode the quantized coefficients at each position on the next line, i.e. line (y+1).

In step S147, the line determination unit 161 increments the variable y indicating the stored line by y=y+1, returns the flow to step S143, and executes the above-described subsequent processing again.

Conversely, in the event that determination is made in step S146 that there are no unprocessed lines, the quantized coefficients for all of the lines making up the sub-band have been encoded, and so the line determination unit 161 ends the entropy encoding processing, the flow returns to step S113 in FIG. 23, and the encoding processing ends.

Figure 24:
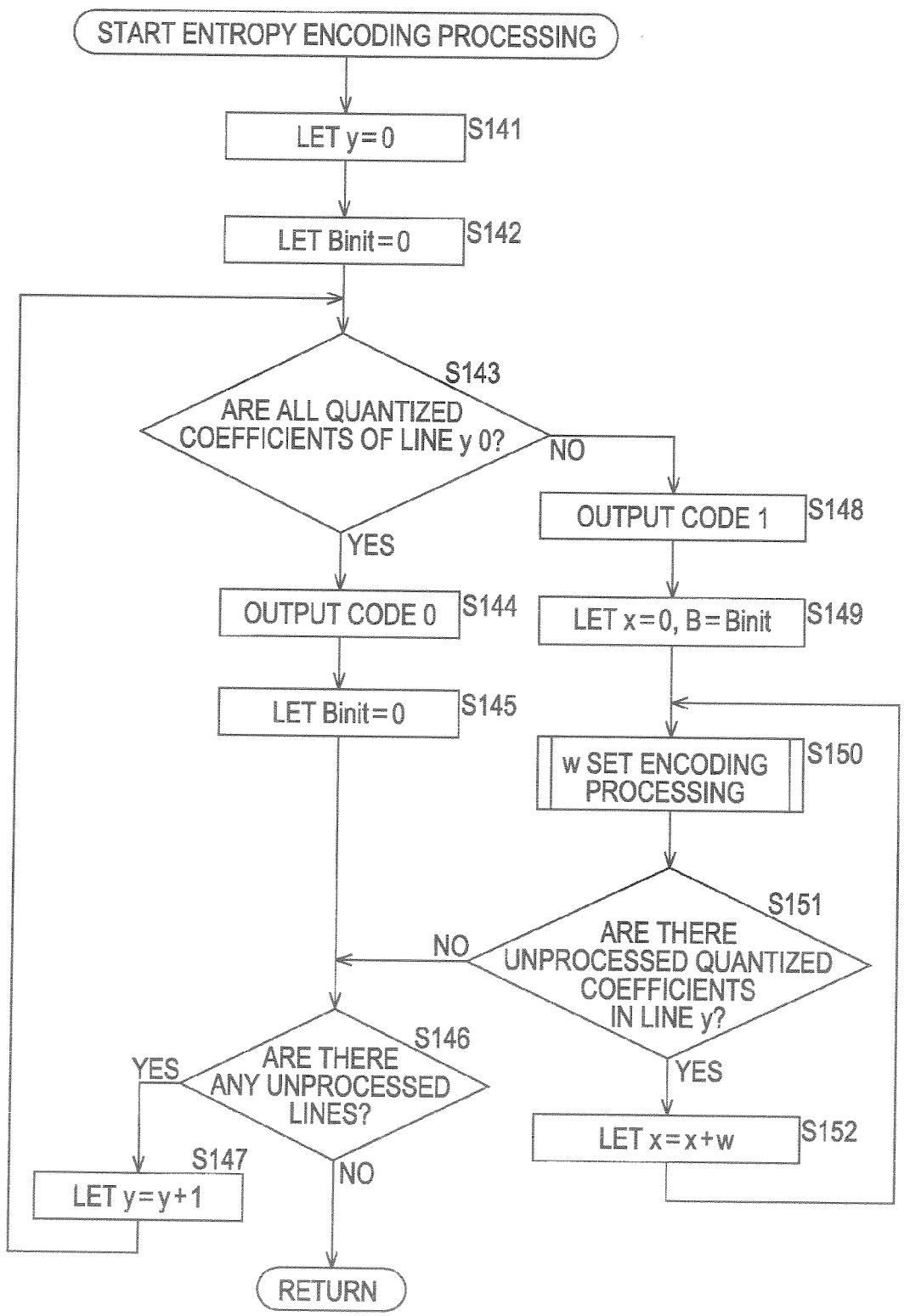
FIG. 24 is a flowchart for describing entropy encoding processing.

Also, in the event that determination is made in step S143 in FIG. 24 that the quantized coefficients of line y are not all 0 (there is a quantized coefficient that is not 0), the line determination unit 161 generates information to the effect that the quantized coefficients are not all 0 (there is a quantized coefficient that is not 0, supplies this to the VLC encoding unit 161 and the maximum significant digit calculating unit 163, flow to step S148.

In step S148, based on the information from the line determination unit 161 to the effect that the quantized coefficients are not all 0, the VLC encoding unit 162 outputs (supplies) a code 1 indicating that the quantized coefficients of the line to be encoded are not all 0 to the code linking unit 169.

In step S149, based on the information to the effect that all of the quantized coefficients are 0 from the line determination unit 161, the maximum significant digit calculating unit 163 sets the value of the variable x, indicating the x coordinate of the position on line y of the first quantized coefficient to be input of the w quantized coefficients to be encoded now, to x=0, and stores the variable x.

For example, in the event that the line y is the line L1 shown in FIG. 20, the value of the variable x which the maximum significant digit calculating unit 163 stores indicates, of the w continuous positions (x, 0), (x+1, 0), . . . , (x+w−1, 0), on the line L1 to be encoded, the x coordinate at the farthest upper left position, (x, 0).

Also, in step S149, the maximum significant digit calculating unit 163 sets the value of the variable B which indicates the maximum significant digits of the w quantized coefficients encoded the previous time to B=Binit, and stores the variable B. That is to say, the maximum significant digit calculating unit 163 updates the value of the variable B as the value of the variable Binit stored therein, and stores the value of the updated variable B.

Upon updating the value of the variable B, the maximum significant digit calculating unit 163 supplies information indicating the value of the updated variable B (maximum significant digit) to the VLC encoding unit 164 and significant digit extracting unit 165. Also, the VLC encoding unit 164 and the significant digit extracting unit 165 each store the value of the variable B supplied from the maximum significant digit calculating unit 163.

In step S150, the entropy encoding unit 123 performs w set encoding processing. While details of w set encoding processing will be described later, in the w set encoding processing the entropy encoding unit 123 encodes w continuous quantized coefficients on the line y indicated by the variable y stored in the line determination unit 161

Now, with a position on a line y identified by the variable y stored in the line determination unit 161 and the variable x stored in the maximum significant digit calculating unit 163 as x, y), the w consecutive positions on the line y are the consecutive positions (x, y), (x+1, y) . . . , (x+w−1, y), on the line y. That is to say, in the w set encoding processing the entropy encoding unit 123 encodes the quantized coefficients at each of the positions (x, y), (x+1, y), . . . , (x+w−1, y).

In step S151, the maximum significant digit calculating unit 163 determines whether or not there are unprocessed quantized coefficients on the line y. That is to say, the maximum significant digit calculating unit 163 determines whether or not all quantized coefficients at the positions on the line y indicated by the variable y stored at the line determination unit 161 have been encoded.

In the event that determination is made in step S151 that there are unprocessed quantized coefficients on the line y, the maximum significant digit calculating unit 163 advances the flow to step S152 to encode the next w quantized coefficients.

In step S152, the maximum significant digit calculating unit 163 takes the variable x stored therein as x=x+w, and returns the flow to step S150. Accordingly, the quantized coefficients of each of the positions (x+w, y), (x+w+1, y), . . . , (x+2w−1, y), on the line y are encoded in the processing of the following step S150.

Also, the event that determination is made in step S151 that there are no unprocessed quantized coefficients on the line y, the quantized coefficients at all positions on the line y have been encoded, so the maximum significant digit calculating unit 163 returns the flow to step S146, and the subsequent processing is executed.

Thus, the entropy encoding unit 123 encodes the quantized coefficients at each position of the sub-band by a predetermined number each, in raster scan order.

Thus, by encoding the quantized coefficients at each position of the sub-band by a predetermined number each, in raster scan order, the input quantized coefficients can be processed in the order in which they were input, and delay due to quantized coefficient encoding can be reduced.

Next, the w set encoding processing corresponding to the processing of step S150 in FIG. 24 will be described.

In step S181, the maximum significant digit calculating unit 163 takes the position on the line y identified by the variable x stored therein as (x, y), and of the w continuous positions (x, y), (x+1, y), . . . , (x+w−1, y), takes the significant digits of the quantized coefficients having the greatest absolute value as the value of the variable Bnew indicating the maximum significant digits of the w quantized coefficients to be encoded now, and stores this variable Bnew.

Also, the maximum significant digit calculating unit 163 supplies the obtained maximum significant digit of the w quantized coefficients, i.e., the value of the variable Bnew, to the VLC encoding unit 164 and the significant digit extracting unit 165.

For example, in the event that the quantized coefficients of the w consecutive positions are the quantized coefficients "−0101", "+0011", "−0110", and +0010", shown in FIG. 21, of these quantized coefficients the quantized coefficient with the greatest absolute value is "−0110" and the significant digit thereof is "3", which is the digit at which the highest order 1 is situated, for the "−0110", so the value of the variable Bnew is set to 3.

In step S182, the VLC encoding unit 164 determines whether or not B=Bnew. That is to say, the VLC encoding unit 164 determines whether or not the value of the variable B indicating the greatest significant digit of the w quantized coefficients encoded the previous time is the same as the value of the variable Bnew indicating the greatest significant digit of the w quantized coefficients to b encoded now that have been supplied from the maximum significant digit calculating unit 163.

In the event that determination is made in step S182 that B=Bnew, the VLC encoding unit 164 advances the flow to step S183, and outputs to the code linking unit 169 a code 0 indicating the maximum significant digit of the w quantized coefficients to be encoded from now. Upon outputting the code 0 indicating the maximum significant digit, the VLC encoding unit 164 skips the processing in step S84 through the processing in step S88, and advances the flow to step S189.

Conversely, in the event that determination is made in step S182 that B=Bnew does not hold, the VLC encoding unit 164 advances the flow to step S184, and (since the maximum significant digit has changed) outputs code 1 to the code linking unit 169 indicating that the maximum significant digit has changed.

In step S185, the VLC encoding unit 164 obtains integers n and m which satisfy the following Expression (8)

$$Bnew = B + (n+1) \times (-1)^m \qquad (8)$$

Now, the symbol "^" in Expression (8) represents the exponential. Accordingly, $(-1)^m$ means $(-1)$ to the m'th power.

For example, in the event that Bnew=3 and B=0, n=2 and m=0 are obtained as an n and m which satisfy Expression (8). Comparing the variable Bnew with the variable B, the greater the difference between the absolute value of the value of the variable Bnew and the between the absolute value of the value of the variable B is, the greater the value of n in Expression (8) is. Also, in the event that the value of the variable Bnew is greater than the value of the variable B, the value of m is 0, and conversely, in the event that the value of the variable Bnew is smaller than the value of the variable B, the value of m is 1. Accordingly, the value of m in Expression (8) can be said to be indicating whether the maximum significant digit has increased or decreased.

In step S186, the VLC encoding unit 164 outputs to the code linking unit 169 the value of m which satisfies Expression (8) as code of 1 bit, as code indicating whether the maximum significant digit has increased or decreased. For example, in the event that the value of m which satisfies Expression (8) is 0, the VLC encoding unit 164 outputs code 0 indicating that the maximum significant digit has increased.

In step S187, the VLC encoding unit 164 outputs as many zeroes as the value of n satisfying the Expression (8), followed by one 1, as code indicating the amount of change in the maximum significant digit, to the code linking unit 169. That is to say, the VLC encoding unit 164 outputs n 0s and one 1 as code indicating the amount of change in the maximum significant digit.

For example, in the event that the value of n which satisfies Expression (8) is 2, the VLC encoding unit 164 outputs "001" as code indicating the amount of change in the maximum significant digit, to the code linking unit 169.

Thus, the VLC encoding unit 164 outputs to the code linking unit 169, code indicating that the maximum significant digit has changed, code indicating whether the maximum significant digit has increased or decreased, and code indicating the amount of change of the maximum significant digit, as code indicating the maximum significant digit of the w quantized coefficients to be encoded from now.

In step S188, the maximum significant digit calculating unit 163 sets the value of the stored variable B to B=Bnew, and advances the flow to step S189. That is to say, the maximum significant digit calculating unit 163 updates the value of the stored variable B to the value of the variable Bnew stored therein. Also, the VLC encoding unit 164 and the significant digit extracting unit 165 also set the value of the stored variable B to B=Bnew.

Upon the value of the variable B being set to B=Bnew in step S188, or code indicating the maximum significant digit of the quantized coefficients being output in step S183, in step S189 the maximum significant digit calculating unit 163 sets the value of the stored variable Binit to Binit=B in the event that the value of the stored variable x is 0.

That is to say, in the event that the value of the stored variable x is 0, the maximum significant digit calculating unit 163 updates the variable Binit by taking for the value of the variable Binit indicating the maximum significant digit of the w quantized coefficients first input on the line (y−1) stored therein, the value of the variable B indicating the maximum significant digit of the w quantized coefficients encoded the previous time.

Thus, in the event that the variable x=0, the value of the variable Binit is set to Binit=B, whereby encoding of the quantized coefficients can be performed for the w quantized coefficients starting from x=0 in the next line (e.g., line (y+1)), using the correlative relation with the maximum significant digit of the w quantized coefficients starting from x=0 in the previous line (e.g., line y).

In step S190, the significant digit extracting unit 165 takes a predetermined variable i and varies the variable i from 0 to (w−1), so as to extract the significant digits of quantized coefficients from the quantized coefficients at the positions (x−i, y) on the line y. The significant digit extracting unit 165 supplies the extracted (data of) significant digits of the quantized coefficients to the VLC encoding unit 166 and sign extracting unit 167. Also, the VLC encoding unit 166 outputs code indicating the absolute values of the w quantized coefficients to the code linking unit 169, based on the significant digits supplied from the significant digit extracting unit 165 (encoding the significant digits).

Now, the value of x at the positions (x+i, y) is the value of the variable x stored at the maximum significant digit calculating unit 163. For example, in the event that the value of the variable x stored at the maximum significant digit calculating unit 163 is 0, the value of the variable B stored at the significant digit extracting unit 165 is 3, and further, the quantization unit 122 supplies the significant digit extracting unit 165 with the w (four) quantized coefficients "−0101", "+0011", "−0110", "+0010" shown in FIG. 21, corresponding to the quantized coefficients at each of the positions (X+i, y) (0≦i≦3) i.e., the positions (0, y), (1, y), (2, y), and (3, y), the significant digit extracting unit 165 extracts the significant digits from these quantized coefficients.

In this case the value of the variable B stored at the significant digit extracting unit 165 is 3, and the significant digits is 3 digits, so the significant digit extracting unit 165 extracts, from the quantized coefficient "−0101" corresponding to the position (x, y), the value "101" which is the three digits from the lowest order.

In the same way, the significant digit extracting unit 165 sequentially extracts, from the quantized coefficients "−0011", "−0110", and "0010" at the position (x+1, y), the position (x−2, y), and the position (x+3, y), the values "011", "110", and "010", which are the three digits from the lowest order thereof. Accordingly, (code of) the significant digits "101", "011", "110", and "010", of the quantized coefficients "−0101", "−0011", "−0110", and "+0010" are output to the VLC encoding unit 166 and sign extracting unit 167. The VLC encoding unit 166 encodes the code "101", 011", "110" and "010", supplied from the significant digit extracting unit 165, and outputs code "101011110010" indicating the absolute value of the w quantized coefficients to the code linking unit 169.

In step S191, the sign extracting unit 167 takes a predetermined variable i and varies the variable i from 0 to (w−1), so as to extract the signs of the quantized coefficients, from the quantized coefficients at positions (x+i, y) on the line y of which quantized coefficients the absolute value is not 0, supplied from the quantization unit 122, and supplies the extracted (data of) signs extracted to the VLC encoding unit 168. The VLC encoding unit 168 encodes the signs from the sign extracting unit 167, and outputs code indicating the signs of the quantized coefficients obtained thereby to the code linking unit 169.

Upon code indicating the signs of the quantized coefficients being input from the VLC encoding unit 168, the code linking unit 169 links the code indicating whether or not all quantized coefficients of the line are 0, the code indicating the maximum significant digits of the quantized coefficients, the code indicating the absolute value of the quantized coefficients, and the code indicating the signs of the quantized coefficients supplied from VLC encoding unit 162, VLC encoding unit 164, VLC encoding unit 166 and VLC encoding unit 168 respectively, outputs the linked code as an encoded image, ends w set encoding processing, returns the flow to step S150 in FIG. 24, and executes the processing from step S151 on.

Now, the value of x at the positions (x+i, y) is the value of the variable x stored at the maximum significant digit calculating unit 163. For example, in the event that the value of the variable x stored at the maximum significant digit calculating unit 163 is 0, and the quantization unit 122 supplies the w (four) quantized coefficients "−0101", "+0011", "−0110, +0010" shown in FIG. 21, corresponding to the quantized coefficients at each of the positions (X+i, y) (0≦i≦3), i.e., the positions (0, y), (1, y), (2, y), and (3, y), none of "−0101", "+0011", "−0110" and "+0010", are 0, so the sign extracting unit 167 extracts the signs from these quantized coefficients.

In this case, the sign extracting unit 167 extracts the sign "−" of the quantized coefficient from the quantized coefficient "−0101" corresponding to the position (x, y).

In the same way, the sign extracting unit 167 sequentially extracts the signs "+", "−", "+", of the quantized coefficients from the quantized coefficients "+0011", "−0110", "+0010", corresponding to the positions (x+1, y), (x+2, y), and (x+3, y). Thus, the signs "−", "+", "−", "+", of the quantized coefficients "−0101", "+0011", "−0110", "+0010", are output from the sign extracting unit 167 to the VLC encoding unit 168. The VLC encoding unit 168 encodes the signs "−", "+", "−", and "+", of the quantized coefficients supplied from the sign extracting unit 167.

For example, upon the sign "−" being input, the VLC encoding unit 168 outputs the code 1, and upon the sign "+" being input, outputs the code 0, thereby encoding the input signs. In this case, the signs "−", "+", "−", and "+", of the quantized coefficients are input to the VLC encoding unit 168, so the VLC encoding unit 168 outputs a code "1010" made up of the code "1", "0", "1", "0", as code indicating the signs of the quantized coefficients, to the code linking unit 169.

Thus, the entropy encoding unit 123 encodes quantized coefficients of a sub-band in batches of predetermined units, and outputs code indicating the maximum significant digits of quantized coefficients, code indicating the absolute values of quantized coefficients, and code indicating the signs of quantized coefficients.

Thus, encoding quantized coefficients of a sub-band in batches of predetermined units does away with the need to perform processing multiple times on the bit plane based on multiple coding paths, unlike the case of encoding an image with JPEG 2000 for example, and also, variable code length encoding is preformed, so the amount of processing for encoding can be markedly reduced. Accordingly, image encoding can be performed at higher speeds, and an encoding device for encoding high-resolution images at real-time can be realized inexpensively.

Further, there is no need to explicitly encode the length of code at the image encoding device 111 in a case of encoding an image so the amount of code can be reduced and there is no need to manage information regarding the length of code.

Note that while description has been made above that, of the w quantized coefficients, the significant digit of the quantized coefficient having the greatest absolute value is taken as the value of the variable Bnew indicating the maximum significant digit, however, it is sufficient that the value of the variable Bnew be a value equal to or greater than the significant digit of the quantized coefficient having the greatest absolute value of the w quantized coefficients. If the value of the variable Bnew is greater, the amount of code increases for the code indicating the absolute value of the quantized coefficients, but the amount of code increases for the code indicating the absolute value of the quantized coefficients can be reduced by setting the value of the variable Bnew to a value equal to or greater than the significant digit of the quantized coefficient having the greatest absolute value.

Next, description will be made regarding the image decoding device for decoding an image encoded by the image encoding device 111.

Figure 26:
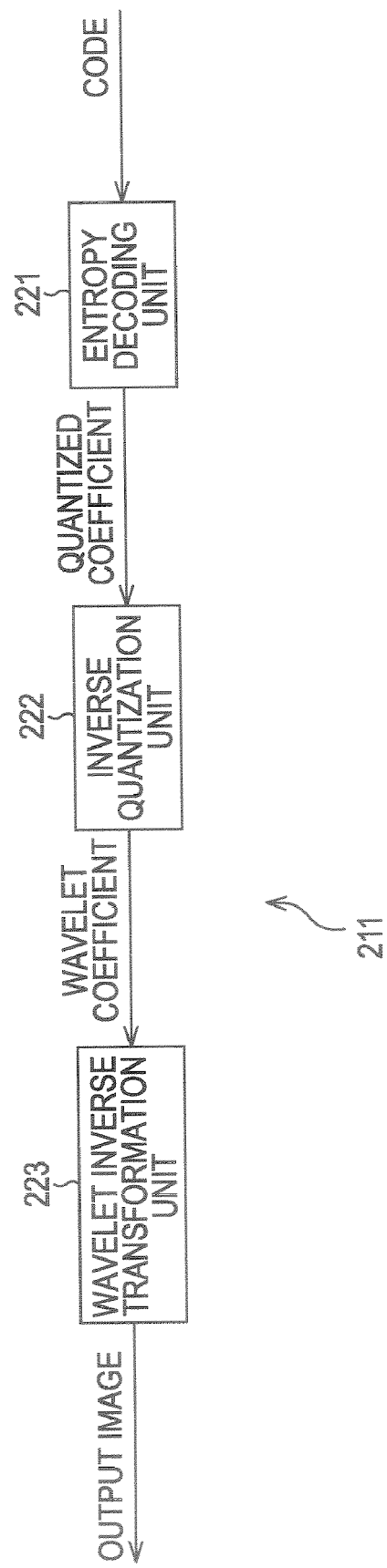
FIG. 26 is a block diagram illustrating a configuration example of an image decoding device.

FIG. 26 is a block diagram illustrating a configuration example of the image decoding device.

The image decoding device 211 is configured of an entropy decoding unit 221, inverse quantization unit 222, and wavelet inverse transformation unit 223, with encoded image (data) being input to the entropy decoding unit 221.

The entropy decoding unit 221 performs entropy decoding of the code which is the input encoded image, and supplies the obtained quantized coefficients obtained thereby to the inverse quantization unit 222.

The inverse quantization unit 222 performs inverse quantization of the quantized coefficients supplied from the entropy decoding unit 221, and supplies the wavelet coefficients for each sub-band obtained by inverse quantization to the wavelet inverse transformation unit 223.

The wavelet inverse transformation unit 223 subjects the wavelet coefficients for each sub-band supplied from the inverse quantization unit 222 to wavelet inverse transformation, and outputs the image obtained as a result thereof as a decoded image.

Figure 27:
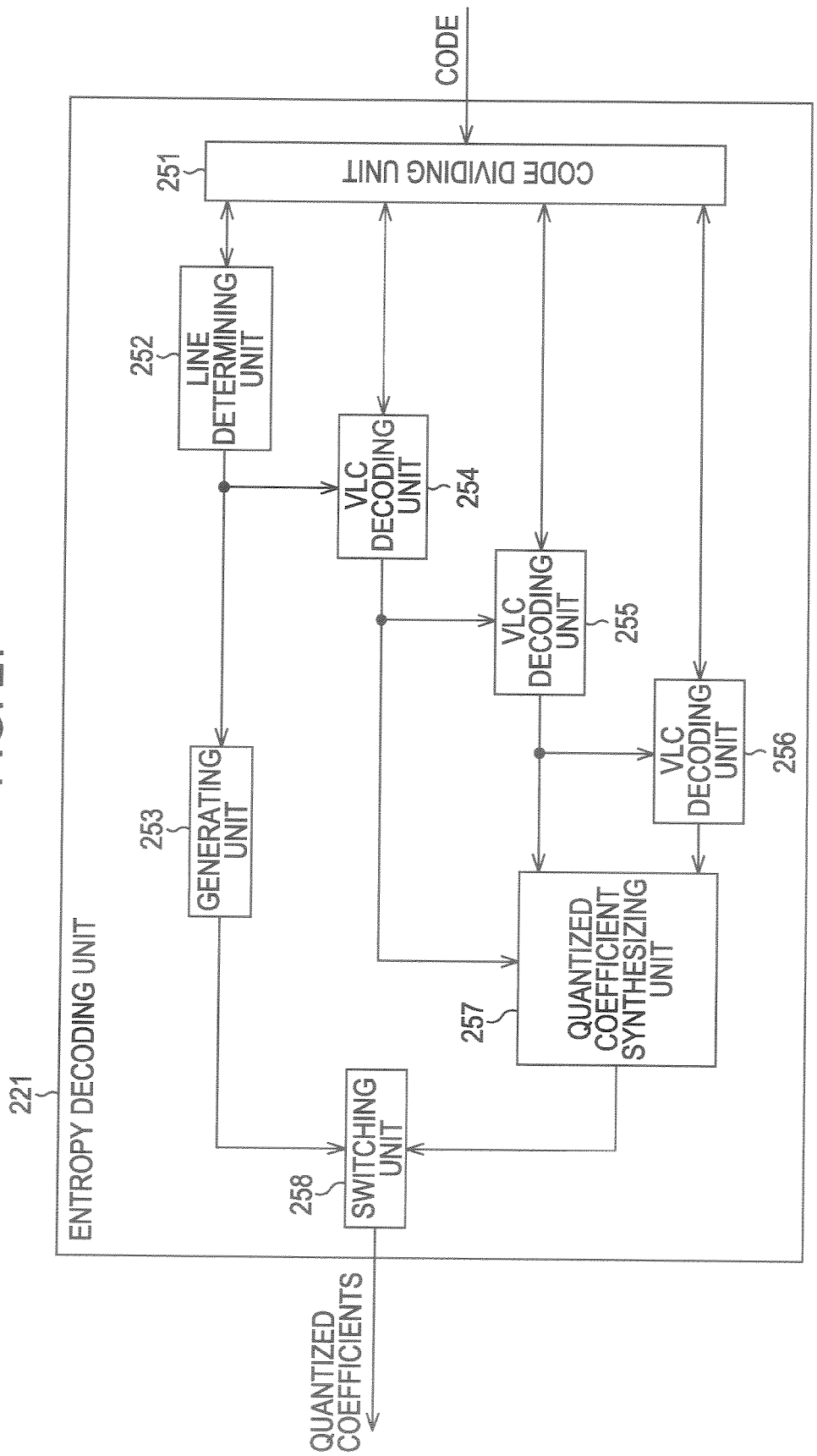
FIG. 27 is a block diagram illustrating a configuration example of an entropy decoding unit.

Also, the entropy decoding unit 221 of the image decoding device 211 which performs such processing is configured as shown in FIG. 27 for example, in further detail.

In further detail, the entropy decoding unit 221 has a code dividing unit 251, line determining unit 252, generating unit 253, VLC decoding unit 254, VLC decoding unit 255, VLC decoding unit 256, quantized coefficient synthesizing unit 257, and switching unit 258.

The code dividing unit 251 divides the code which is an encoded image that has been input, based on information supplied from each of the line determining unit 252, VLC decoding unit 254, VLC decoding unit 255, and VLC decoding unit 256, and supplies divided code of predetermined lengths to the line determining unit 252, VLC decoding unit 254, VLC decoding unit 255, or VLC decoding unit 256.

That is to say, the code dividing unit 251 divides the input code into code indicating whether or not the quantized coefficients of one encoded line are all 0, code indicating the maximum significant digit of w encoded quantized coefficients, code indicating the absolute values of w encoded quantized coefficients, and code indicating the signs of the encoded quantized coefficients, and supplies each of the line determining unit 252, VLC decoding unit 254, VLC decoding unit 255, and VLC decoding unit 256, respectively.

The line determining unit 252 determines whether or not the quantized coefficients of one line of an encoded sub-band are all 0, based on the code supplied from the code dividing unit 251, and supplies information indicating the determination results to hereof to the code dividing unit 251, generating unit 253, and VLC decoding unit 254.

The generating unit 253 generates code indicating one line worth of quantized coefficients which are 0, based on information indicating the results of the determination from the line determining unit 252, and supplies this to the switching unit 258.

The VLC decoding unit 254 decodes the code supplied from the code dividing unit 251 indicating the maximum significant digit of the w encoded quantized coefficients, obtains the maximum significant digit of the w encoded quantized coefficients, and supplies information indicating the obtained maximum significant digit to the code dividing unit 251, VLC decoding unit 255, and quantized coefficient synthesizing unit 257.

The VLC decoding unit 255 decodes the code indicating the absolute values of the quantized coefficients supplied form the code dividing unit 251, based on the information indicating the maximum significant digit from the VLC decoding unit 254, and supplies (data of) significant digits of the w quantized coefficients obtained thereby to the VLC decoding unit 256 and quantized coefficient synthesizing unit 257. Also, the VLC decoding unit 255 supplies information indicating the results of decoding the code indicating the absolute values of the quantized coefficients, to the code dividing unit 251.

Based on the significant digits of the quantized coefficients supplied from the VLC decoding unit 255, the VLC decoding unit 256 decodes the code indicating the signs of the quantized coefficients supplied from the code dividing unit 251, and supplies the (data of) sings of the quantized coefficients obtained thereby to the quantized coefficient synthesizing unit 257. Also, the VLC decoding unit 256 supplies information indicating the results of decoding of the code indicating the signs of the quantized coefficients to the code dividing unit 251.

The quantized coefficient synthesizing unit 257 synthesizes the significant digits of the quantized coefficients supplied from the VLC decoding unit 255 and the sings of the quantized coefficients supplied from the VLC decoding unit 256, based on the information indicating the maximum significant digit supplied from the VLC decoding unit 254, and supplies the w quantized coefficients thus obtained to the switching unit 258.

The switching unit 258 outputs quantized coefficients from the generating unit 253 or the quantized coefficient synthesizing unit 257.

Figure 28:
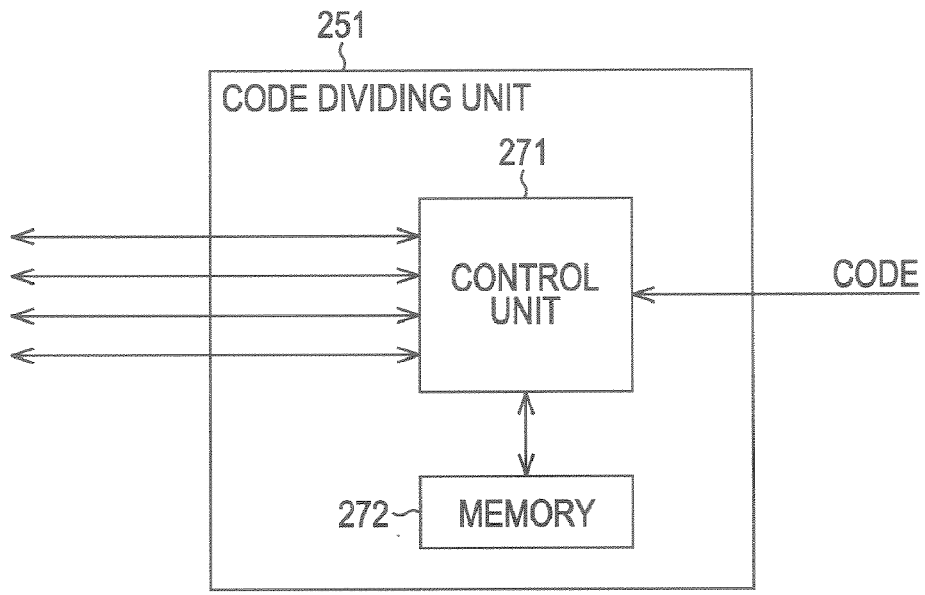
FIG. 28 is a block diagram illustrating a configuration example of a code dividing unit.

FIG. 28 is a block diagram illustrating a more detailed configuration of the code dividing unit 251.

The code dividing unit 251 has a control unit 271 and memory 272. Upon code, which is an encoded image, being input, the control unit 271 supplies the input code to the memory 272 for temporary storage.

The control unit 271 then read out code of a predetermined length, from the code temporarily stored in the memory 272, based on the information supplied from each of the line determining unit 252, VLC decoding unit 254, VLC decoding unit 255, and VLC decoding unit 256, and supplies to the line determining unit 252, VLC decoding unit 254, VLC decoding unit 255, or VLC decoding unit 256.

Figure 29:
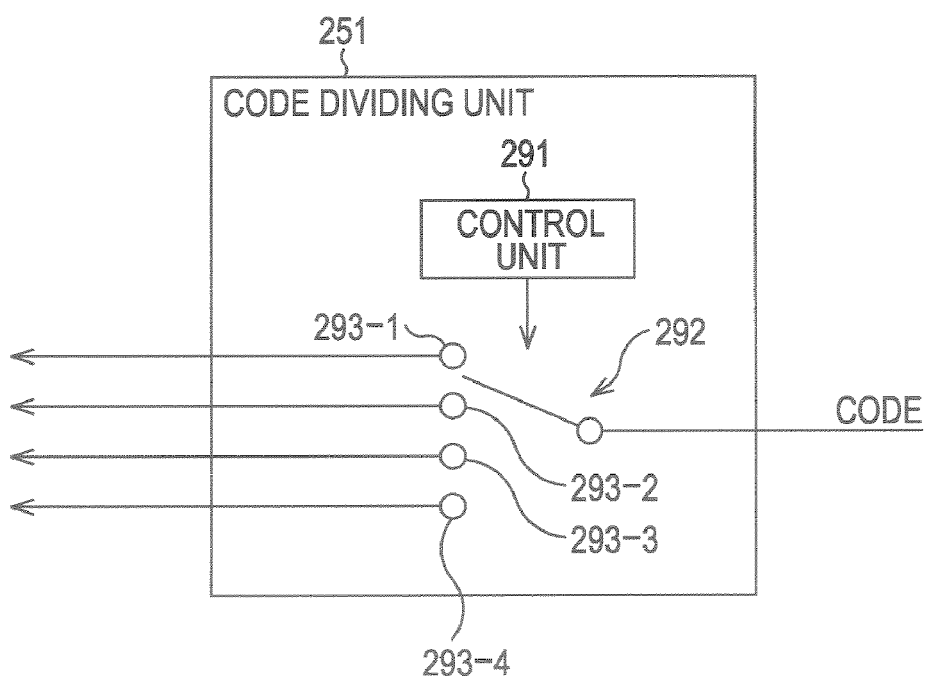
FIG. 29 is a block diagram illustrating a configuration example of a code dividing unit.

Also, the code dividing unit 251 may be configured as shown in FIG. 29, besides the configuration example shown in FIG. 28.

The code dividing unit 251 shown in FIG. 29 has a control unit 291, switch 292, and node 293-1 through node 293-4.

Upon code, which is an encoded image, being input, control unit 291 controls the switch 292 based on the information supplied from each of the line determining unit 252, VLC decoding unit 254, VLC decoding unit 255, and VLC decoding unit 256, and supplies to the line determining unit 252, VLC decoding unit 254, VLC decoding unit 255, or VLC decoding unit 256, code of a predetermined length.

That is to say, the node 293-1 through node 293-4 are each connected to the line determining unit 252, VLC decoding unit 254, VLC decoding unit 255, and VLC decoding unit 256, respectively, and the control unit 291 selects one of the node 293-1 through node 293-4 as the supply destination of code, and controls connection between the switch 292 and the selected node.

The switch 292 connects the node selected based on the control of the control unit 291 with the input, so the code input to the code dividing unit 251 is supplied to the line determining unit 252, VLC decoding unit 254, VLC decoding unit 255, or VLC decoding unit 256, as the code supply destination, via the switch 292, and the node connected to the switch 292.

Next, decoding processing with the image decoding device 211 will be described with reference to the flowchart shown in FIG. 30. This decoding processing is started upon the code which is an encoded image being input to the entropy decoding unit 221.

In step S231, the entropy decoding unit 221 performs entropy decoding processing, performs entropy decoding of the code which is an encoded image that has been input, and supplies the quantized coefficients obtained thereby to the inverse quantization unit 222. While details of entropy decoding processing will be described later in detail, with this entropy decoding processing, the entropy decoding unit 221 decodes quantized coefficients at consecutive positions on a line of an encoded sub-band w at a time, and supplies the decoded quantized coefficients to the inverse quantization unit 222.

In step S232, the inverse quantization unit 222 performs inverse quantization of the quantized coefficients supplied form the entropy decoding unit 221, and supplies the wavelet coefficients of each sub-band obtained by inverse quantization to the wavelet inverse transformation unit 223.

In step S233, the wavelet inverse transformation unit 223 subjects the wavelet coefficients of each sub-band that have been supplied from the inverse quantization unit 222 to wavelet inverse transformation, and outputs the image obtained as a result thereof, whereby the decoding processing ends.

Thus, the image decoding device 211 decodes and outputs an encoded image.

Next, entropy decoding processing corresponding to the processing of step S231 in FIG. 30 will be described with the flowchart in FIG. 31.

In step S261, the line determination unit 252 takes the variable y indicating the line of the sub-band to be now decoded as y=0, and stores this.

In step S262, the VLC decoding unit 254 takes a variable Binit indicating the maximum significant digits of the w quantized coefficients input first on the line (y−1) which is one before the line y indicated by the variable y stored in the line determination unit 252 as Binit=0, and stores this.

For example, in the event that the line (y−1) is the line L1 shown in FIG. 20, the value of the variable Binit indicating the maximum significant digit of the w quantized coefficients first input on the line (y−1) is the maximum significant digit of the w quantized coefficients from the left edge of line L1 in the drawing. Also, in the event that the variable y stored in the line determination unit 252 is y=0, the line (y−1) does not exist, so the value of the variable Binit is Binit=0.

Also, in step S262, the code dividing unit 251 supplies the line determination unit 252 with the first 1-bit code of the input code as a code indicating whether or not all quantized coefficients of the line to be decoded now are 0.

In step S263 the line determination unit 252 determines whether or not the 1-bit code read in (supplied) from the code dividing unit 251 is 0, generates information indicating the result of the determination, and supplies to the generating unit 253, VLC decoding unit 254, and code dividing unit 251.

In the event that determination is made in step S263 that the code is 0, this means that the quantized coefficients of the line y are all 0, so the line determination unit 252 advances the flow to step S264. In step S264, the generating unit 253 takes all the quantized coefficients on the line y to be 0, based on the information indicating the results of determination from the line determination unit 252. The generating unit 253 then generates a code indicating the quantized coefficients of the line y and supplies this to the switching unit 258.

For example, in the event that one quantized coefficient is represented by four digits, as shown in FIG. 21, and there are five quantized coefficients on one line, the generating unit 253 generates 20 (=4×5) zeroes as code indicating the quantized coefficients of the line y, and supplies to the switching unit 258. The switching unit 258 outputs the 20 continuous 0s, supplied from the generating unit 253, as code indicating the quantized coefficients of one line, to the inverse quantization unit 222.

In step S655, the VLC decoding unit 254 sets the value of the variable Binit stored therein to Binit=0, based on information indicating the results of the determination from the line determination unit 252, and updates the variable Binit.

In step S266, the line determination unit 252 determines whether or not there are unprocessed lines in the lines of the sub-band being decoded. That is to say, the line determination unit 252 determines whether or not quantized coefficients on positions on all lines of the sub-band being decoded have been decoded.

In the event that determination is made in step S266 that there is an unprocessed line, the line determination unit 252 advances the flow to step S267 to decode the quantized coefficients at each position on the next line (y+1) of the line y indicated by the variable y stored within itself.

In step S267, the line determination unit 252 increments the variable y indicating the stored line by y=y+1, returns the flow to step S263, and executes the subsequent processing.

Figure 30:
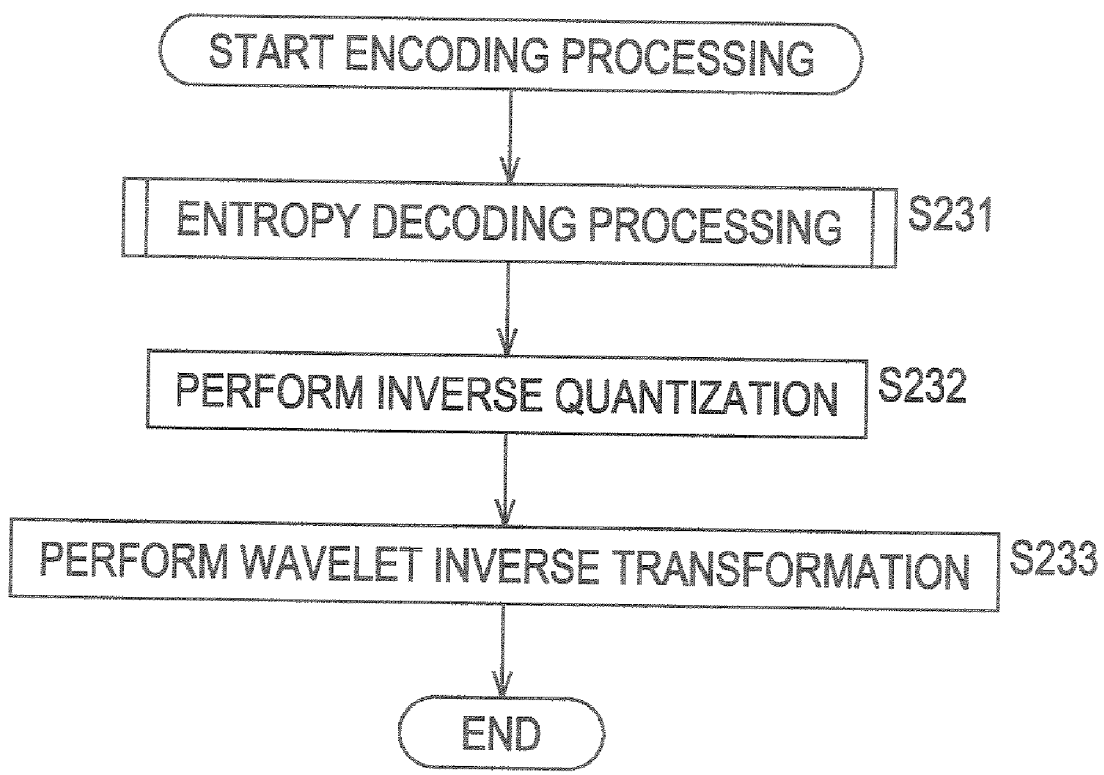
FIG. 30 is a flowchart for describing decoding processing.

Conversely, in the event that determination is made in step S266 that there are no unprocessed lines, the quantized coefficients for all of the lines making up the sub-band have been decoded, and so the line determination unit 252 ends the entropy decoding processing, the flow returns to step S231 in FIG. 30, and the processing from step S232 on is executed.

Figure 31:
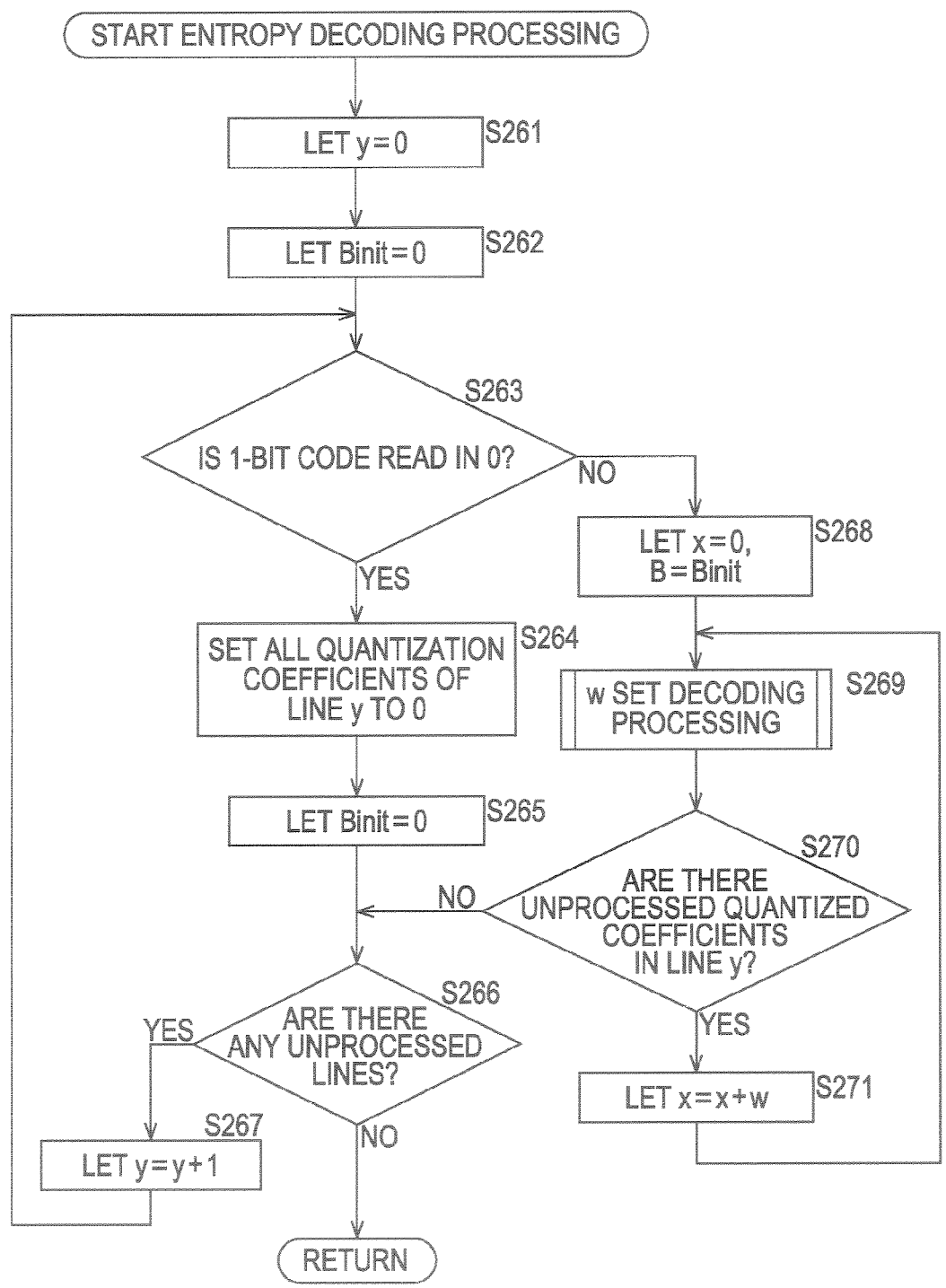
FIG. 31 is a flowchart for describing entropy decoding processing.

Also, a event that determination is made in step S263 in FIG. 31 that the code is not 0, the line determination unit 252 advances the flow to step S268. In step S268, based on the information indicating the determination results from the line determination unit 252, the VLC decoding unit 254 sets the value of the variable x, indicating the x coordinate of the position on line y of the first quantized coefficient to be input of the w quantized coefficients to be decoded now, to x=0, and stores the variable x.

Also, in step S268, the VLC decoding unit 254 takes the value of the variable B indicating the maximum significant digit of the w quantized coefficients decoded the previous time as B=Binit, and stores this variable B. That is to say, the VLC decoding unit 254 updates the variable B with the value of the variable B as the value of the stored variable Binit, and stores the value of the updated variable B.

Further, in step S268, the code dividing unit 251 supplies to the VLC decoding unit 254 the next 1-bit code of the input code as code indicating whether or not the maximum significant digit of the w quantized coefficients to be encoded from now has changed, based on the information indicating the results of determination from the line determination unit 252.

In step S269, the entropy decoding unit 221 performs set decoding processing. While details of w set decoding processing will be described later, in the w set decoding processing the entropy decoding unit 221 decodes w continuous quantized coefficients on the line y indicated by the variable y stored in the line determination unit 252.

In step S270, the VLC decoding unit 254 determines whether or not there are unprocessed quantized coefficients on the line y. That is to say, the VLC decoding unit 254 determines whether or not all quantized coefficients at the positions on the line y indicated by the variable y stored at the line determination unit 252 have been decoded.

In the event that determination is made in step S270 that there are unprocessed quantized coefficients on the line y, the VLC decoding unit 254 advances the flow to step S271 to decode the next w quantized coefficients.

In step S271, the VLC decoding unit 254 takes the variable x stored therein as x=w, and returns the flow to step S269. Accordingly, the quantized coefficients of each of the positions (x+w, y), (x+w+1, y), . . . , (x+2w−1, y) on the line y are decoded in the processing of the following step S269.

Also, the event that determination is made in step S270 that there are no unprocessed quantized coefficients on the line y, the quantized coefficients at all positions on the line y have been decoded, so the VLC decoding unit 254 returns the flow to step S266, and the subsequent processing is executed.

Thus, the entropy decoding unit 221 decodes the quantized coefficients at each position of the sub-band by a predetermined number each, in raster scan order.

Thus, by decoding the quantized coefficients at each position of the sub-band by a predetermined number each, in raster scan order, the input quantized coefficients can be processed in the order in which they were input, and delay due to quantized coefficient encoding can be reduced.

Next, the w set decoding processing corresponding to the processing of step S269 in FIG. 31 will be described with reference to the flowchart shown in FIG. 32.

As described above, in step S268 of FIG. 31, the code dividing unit 251 through VLC decoding unit 254 are supplied with 1-bit code indicating whether or not the maximum significant digit of the w quantized coefficients to be decoded has changed.

Figure 32:
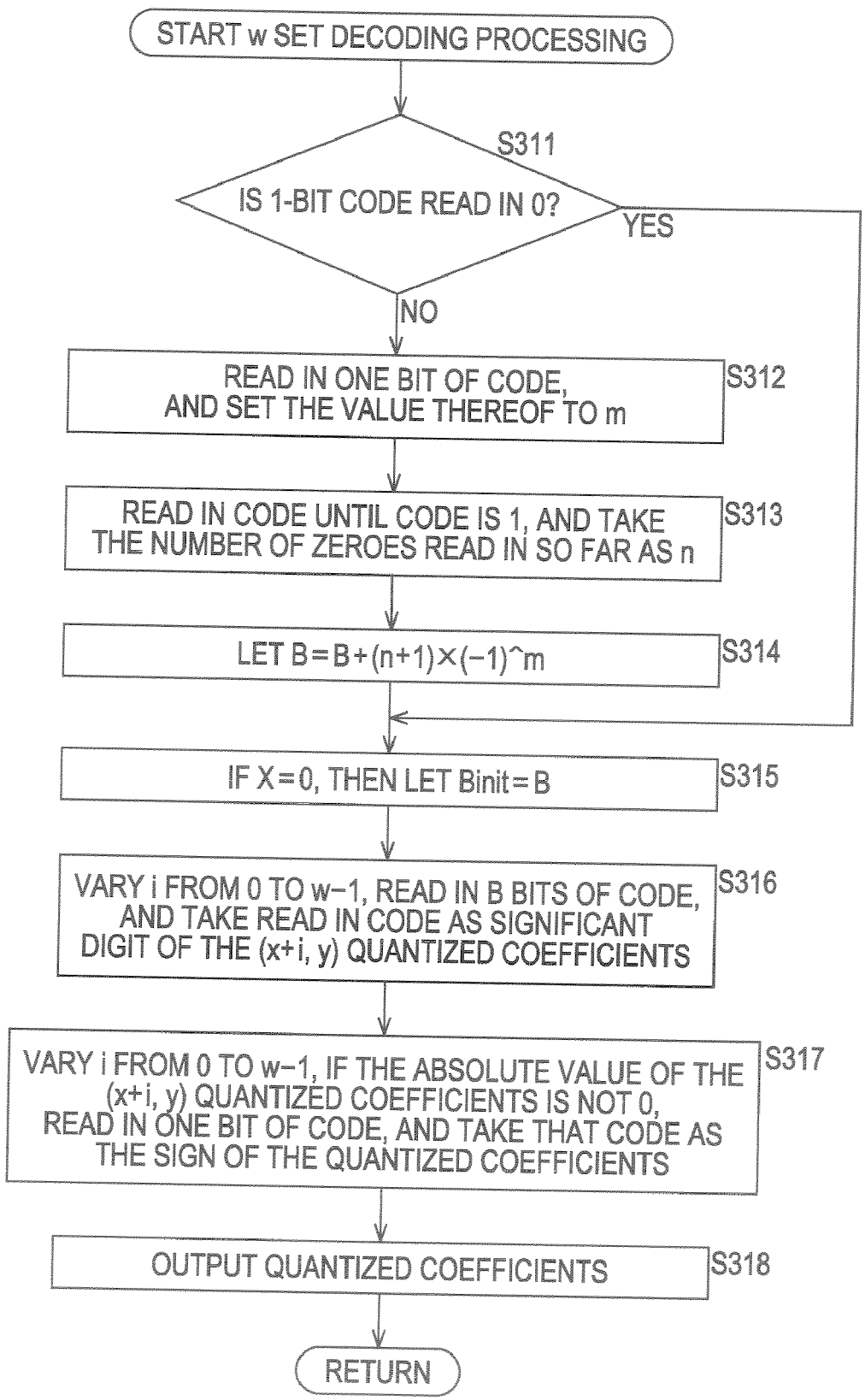
FIG. 32 is a flowchart for describing w set decoding processing.

In step S311 in FIG. 32, the VLC decoding unit 254 determines whether or not the 1-bit code read in (supplied) is 0.

In the event that determination is made in step S311 that code read in is 0 the maximum significant digit has not changed, so the VLC decoding unit 254 generates information to the effect that the maximum significant digit has not changed, and supplies this to the code dividing unit 251, VLC decoding unit 255, and quantized coefficient synthesizing unit 257, skips the processing in step S312 through S314, and advances the flow to step S315.

That is to say, in the event that the code indicating whether or not the maximum significant digit has changed is 0, input following the 1-bit code 0 indicating whether or not the maximum significant digit has changed is not the code indicating whether the maximum significant digit has increased or decreased, and the code indicating the amount of change of the maximum significant digit, but rather is code indicating the absolute value of the quantized coefficients so step S312 through step S314, which are processing for decoding the code indicating whether the maximum significant digit has increased or decreased, and the code indicating the amount of change of the maximum significant digit, are skipped.

Conversely, in the event that determination is made in step S311 that the code read in is not 0, the maximum significant digit has changed, so the VLC decoding unit 254 advances the flow to step S312, reads in 1 bit of code from the code dividing unit 251, and stores the value thereof as a predetermined variable m.

In step S313, the VLC decoding unit 254 reads in code from the code dividing unit 521 until the code is 1 (until a code 1 is read in), and stores the number of codes 0 read in up to that point as a variable n. For example, in the event that the third code which the VLC decoding unit 254 has read in from the code dividing unit 251 is a 1, that is to say, in the event that the VLC decoding unit 254 has read in the code "001", the number of codes 0 read in until the VLC decoding unit 254 has read in the 1 is 2, so the VLC decoding unit 254 stores 2, which is the number of codes 0 read in, as the value of the variable n.

In step S314, the VLC decoding unit 254 obtains the value of B indicating the maximum significant digits from the following expression (9), and stores the value of the obtained variable B.

$$B=B+(n+1)\times(-1)^{\wedge}m \qquad (9)$$

Now, the left side of Expression (9) represents the value of the variable B to be newly obtained, with the B at the right side representing the value of the stored variable B. Also, the symbol "^" in Expression (9) represents the exponential. Accordingly $(-1)^{\wedge}m$ means $(-1)$ to the m'th power.

The VLC decoding unit 254 calculates the Expression (9) and changes the variable B that is stored, based on the stored variable B, variable m, and variable n. Upon updating the variable B indicating the maximum significant digit, the VLC decoding unit 254 generates information indicating the updated maximum significant digit, and supplies this to the code dividing unit 251, VLC decoding unit 255, and quantized coefficient synthesizing unit 257.

Upon obtaining a new maximum significant digit in step S314 or determining in step S311 that the 1-bit code that has been read in is 0, the VLC decoding unit 254 advances the flow to step S315, and in the event that the value of the stored variable x is 0, sets the value of the stored variable Binit to Binit=B.

That is to say, in the event that the value of the variable x stored is 0, the VLC decoding unit 254 takes the stored value of the variable Binit indicating the maximum significant digit of the w quantized coefficients input first on the line (y−1) as the value of the variables indicating the maximum significant digit of the w quantized coefficients to be decoded from now, and updates the variable Binit.

Thus, in the event that the variable x=0, the value of the variable Binit is set to Binit=B, whereby encoding of the quantized coefficients can be performed for the w quantized coefficients starting from x=0 in the next line (e.g., line (y+1)), using the correlative relation with the maximum significant digit of the w quantized coefficients starting from x=0 in the previous line (e.g., line y).

In step S316, the VLC decoding unit 255 takes a predetermined variable i and varies the variable i from 0 to (w−1), so as to read code from the code dividing unit 251 in increments of B bits, and supplies (outputs) the b bits of code read in to the VLC decoding unit 256 and quantized coefficient synthesizing unit 257, as code indicating the significant digits of the quantized coefficients at the positions (x+i, y) on the line y. Also, the VLC decoding unit 255 generates information indicating the significant digits of the quantized coefficients, and supplies this to the code dividing unit 251.

Now the value of x at the positions (x+i, y) is the value of the variable x stored at the VLC decoding unit 254. For example, in the event that the value of the variable x stored at the VLC decoding unit 254 is 0, and the value of the variable B stored at the VLC decoding unit 255 is 3, the VLC decoding unit 255 reads in the 3 bits of code from the code dividing unit 251 with variable i=0, and outputs the code of the 3 bits read in as the significant digit of the quantized coefficient at the position (0, y).

In the same way, the VLC decoding unit 255 reads in another 3 bits of code from the code dividing unit 251 with variable i=1, and outputs the code of the 3 bits read in as the significant digit of the quantized coefficient at the position (1, y), reads in the next 3 bits of code from the code dividing unit 251 with variable i=2, and outputs the code of the 3 bits read in as the significant digit of the quantized coefficient at the position (2, y), and reads in the next 3 bits of code from the code dividing unit 251 with variable i=3, and outputs the code of the 3 bits read in as the significant digit of the quantized coefficient at the position (3, y).

In step S317, the VLC decoding unit 256 takes a predetermined variable i and varies the variable i from 0 to (w−1), and in the event that the significant digits (absolute values) of the quantized coefficients at the positions (x+i, y) on the line y are not 0, reads in 1 bit of code form the code dividing unit 251. The VLC decoding unit 256 then decodes the code that has been read in, and supplies (outputs) the code obtained thereby to the quantized coefficient synthesizing unit 257, as signs of the quantized coefficients. Also, the VLC decoding unit 256 generates information indicating the signs of the quantized coefficients, and supplies this to the code dividing unit 251.

Now, the value of x at the positions (x+i, y) is taken as the value of the variable x stored at the VLC decoding unit 254. For example, in the event that the value of the variable x stored at the VLC decoding unit 254 is 0, and (code indicating) a significant digit not 0 is supplied from the VLC decoding unit 255, the VLC decoding unit 256 takes the variable i=0 and reads in 1 bit of code from the code dividing unit 215, and in the event that the code is 0, supplies code indicating the sign "−" of the quantized coefficient at the position (0, y) to the quantized coefficient synthesizing unit 257, and in the event that the code is 1, supplies code indicating the sign "+" of the quantized coefficient at the position (0, y) to the quantized coefficient synthesizing unit 257.

Also, in the event that the absolute value of the (code indicating) a significant digit supplied from the VLC decoding unit 255 is 0, there is no sign for the quantized coefficient at the position (0, y), so the VLC decoding unit 256 does not read in code from the code dividing unit 251.

In the same way, in the event that (the absolute value of) the significant digit supplied from the VLC decoding unit 255 is not 0, the VLC decoding unit 256 takes the variable i=1 and reads in bit of code from the code dividing unit 215, and in the event that the code is 0, supplies code indicating the sign "−" to the quantized coefficient synthesizing unit 257, and in the event that the code is 1, supplies code indicating the sign "+".

Further, in the event that the significant digit supplied next from the VLC decoding unit 255 is not 0, the VLC decoding unit 256 takes the variable i=2 and reads in 1 bit of code from the code dividing unit 215, and in the event that the code is 0 supplies code indicating the sign "−" to the quantized coefficient synthesizing unit 257, and in the event that the code is 1, supplies code indicating the sign "+". Also, in the event that the significant digit supplied next from the VLC decoding unit 255 is not 0, the VLC decoding unit 256 takes the variable i=3 and reads in 1 bit of code from the code dividing unit 215, and in the event that the code is 0, supplies code indicating the sign "−" to the quantized coefficient synthesizing unit 257, and in the event that the code is 1, supplies code indicating the sign "+".

In step S318, the quantized coefficient synthesizing unit 257 synthesizes the significant digits supplied from the VLC decoding unit 256 and the signs supplied from the VLC decoding unit 256, outputs the quantized coefficients obtained thereby to the inverse quantization unit 222 via the switching unit 258, ends the w set decoding processing and returns the flow to step S269 in FIG. 31, and the processing from step S270 on is executed.

For example, the number of digits of the absolute values of the quantized coefficients to be output is determined beforehand. In the event that the number of digits of the absolute value of the quantized coefficients to be output that is determined beforehand is 4 digits, and the maximum significant digit indicated by the information indicating the maximum significant digit from the VLC decoding unit 254 is 3, significant digit "101" is supplied from the VLC decoding unit 255, and upon the code indicating the sign "−" being supplied from the VLC decoding unit 255, the quantized coefficient synthesizing unit 257 outputs the quantized coefficient "−0101".

That is to say, the number of digits of the absolute value of the quantized coefficients to be output is 4 digits, and the significant digits is "101" (three digits), so the quantized coefficient synthesizing unit 257 takes one higher order bit of the significant digits "101" as 0 for the 4-digit absolute value of the quantized coefficient pf"0101". Further, the sign "−" of the quantized coefficient and the absolute value "0101" of the quantized coefficient are synthesized to obtain "−0101", which is output as the quantized coefficient.

Note that in the event that the significant digit supplied from the VLC decoding unit 255 is 0, the quantized coefficient synthesizing unit 257 outputs a quantized coefficient with no sign. For example, in the event that the number of digits of the absolute value of the quantized coefficients to be output that is determined beforehand is 4 digits, and the maximum significant digit indicate by the information indicating the maximum significant digit from the VLC decoding unit 254 is 3 and significant digit "000" is supplied from the VLC decoding unit 255, the quantized coefficient synthesizing unit 257 outputs the quantized coefficient "0000".

Thus the entropy decoding unit 221 decodes quantized coefficients of a sub-band in batches of predetermined units.

Thus, decoding the encoded quantized coefficients of a sub-band in batches of predetermined units does away with the need to perform processing multiple times on the bit plane based on multiple coding paths, unlike the case of decoding an image with JPEG 2000, so image decoding can be performed faster. Accordingly, an encoding device for decoding high-resolution images at real-time can be realized inexpensively.

Now, with the image encoding device 111 described above, description has been made that the absolute values of a predetermined w quantized coefficients are encoded in order when encoding (or decoding) the absolute values of the quantized coefficients, but image encoded (or decoding) can be performed faster by simultaneously (in parallel) encoding (or decoding) the w quantized coefficients, using SIMD (Single Instruction Multiple Data) computation commands used with a general-purpose DSP (Digital Signal Processor) or a general-purpose CPU.

Now, an example of SIMD operation instructions includes MMX (MultiMedia extension), SSE (Streaming SIMD Extensions), SSE2, SSE3, used with Intel Corporation CPUs, and so forth, for example.

Figure 33:
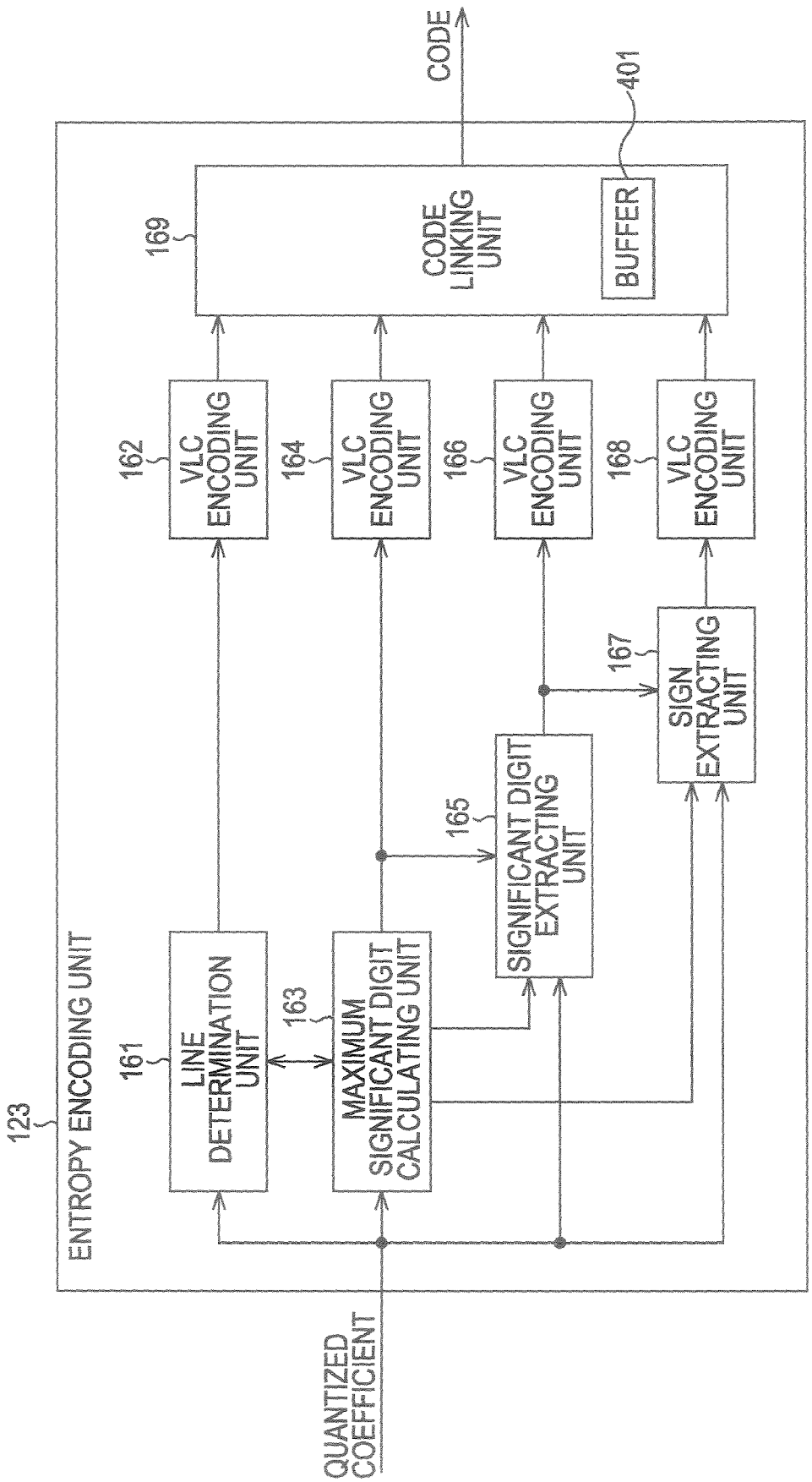
FIG. 33 is a block diagram illustrating another configuration example of an entropy encoding unit.

In a case of encoding the absolute values of quantized coefficients using such SIMD operation instructions, the entropy encoding unit 123 of the image encoding device 111 is configured as shown in FIG. 33, for example.

The entropy encoding unit 123 shown in FIG. 33 is the same as the entropy encoding unit 123 shown in FIG. 22 in that a line determination unit, 161, VLC encoding unit 162, maximum significant digit calculating unit 163, VLC encoding unit 164, significant digit extracting unit 165, VLC encoding unit 166, sign extracting unit 167, and VLC encoding unit 168 are provided, and differs in that a buffer 401 is provided to the code linking unit 169. Note that the portions shown in FIG. 33 which correspond to those in FIG. 22 are denoted with the same reference numerals, and description will be omitted.

The buffer 401 of the code linking unit 169 temporarily stores code indicating whether or not all quantized coefficients of a line are 0, code indicating a maximum significant digit, code indicating an absolute value of quantized coefficients, and code indicating the sign of quantized coefficients, respectively supplied from the VLC encoding unit 162, VLC encoding unit 164, VLC encoding unit 166, and VLC encoding unit 168.

The storage region of the buffer 401 is managed in increments of 32 bits, and code (data) input to the buffer 401 is stored divided into code used for scalar computation processing, and code used for vector computation processing. That is to say, one 32-bit storage region stores code used for scalar computation processing or code used for vector computation processing, as code (data) to be temporarily stored.

With the entropy encoding unit 123 shown in FIG. 33, the absolute values of quantized coefficients are encoded in parallel using SIMD operation instructions, so the code indicating the absolute values of quantized coefficients is taken as code used for vector computation processing, and other code is taken as code used for scalar computation processing.

Note that in the following description, of the 32-bit storage regions provided to the buffer 401, the storage regions where code used for scalar computation processing is stored will be referred to as scalar regions, and the storage regions where code used for vector computation processing is stored will be referred to as vector regions.

Next, the entropy encoding performed by the entropy encoding unit 123 shown in FIG. 33 will be described with reference to FIG. 34.

Figure 34:
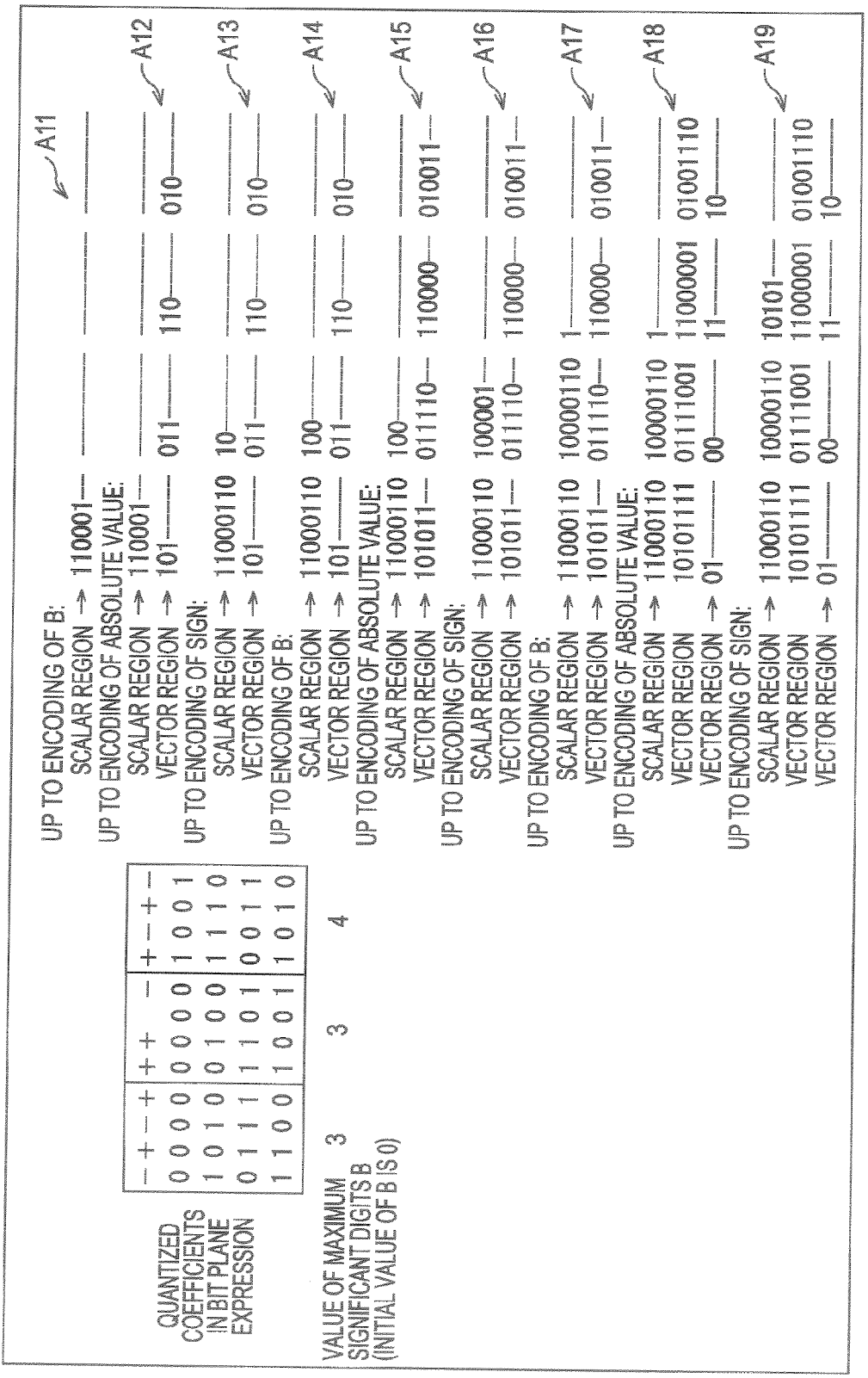
FIG. 34 is a diagram illustrating an example of quantized coefficients to be encoded.

For example, let is say that the 12 quantized coefficients "−0101", "+0011", "−0110", "+0010", "+0011", "+0110", "0000", "−0011", "+1101", "−0100", "+0111", and "−1010", shown in FIG. 21, are input to the entropy encoding unit 123 as shown to the upper left in FIG. 34.

In the same way as described with reference to FIG. 21, the code linking unit 169 of the entropy encoding unit 123 is supplied with the code "1" indicating whether or not the quantized coefficients of the line to be encoded are all 0, and code "10001" indicating the maximum significant digits of the first four input quantized coefficients "−0101", "+0011", "−0110", and "+0010".

Then, a code "110001" made up of the code "1" indicating whether or not the quantized coefficients of the line to be encoded are all 0, and code "10001" indicating the maximum significant digits of the quantized coefficients, is stored in a 32-bit scalar region provided in the buffer 401 of the code linking unit 169, as indicated by the arrow A11.

In the example shown in FIG. 34, code to be stored in the scalar region is stored from the left cc right direction in the diagram, in order from higher order bits. Upon code being stored in all of one scalar region, i.e., upon 32 bits of code being stored in one scalar region, one new scalar region is provided in the buffer 401, and code used with the scalar computation processing is sequentially stored in the newly-provided scalar region.

Upon the code "110001" made up of the code "1" indicating whether or not the quantized coefficients of the line to be encoded are all 0, and code "10001" indicating the maximum significant digits of the quantized coefficients, being stored in the scalar region, next, the entropy encoding unit 123 stores, in the vector region, code equivalent to the maximum significant digits representing the absolute values of each of the first input w (four) quantized coefficients "−0101", "+0011", "−0110", and "+0010", simultaneously (arrayed in parallel).

The maximum significant digits of the quantized coefficients "−0101", "+0011", "−0110" is, as described with reference to FIG. 21, "3", so the code representing the absolute value of the four quantized coefficients is "101", "011", "110", and "010", respectively, and as shown by arrow A12, the codes "101", "011", "110", and "010", representing the absolute value of the quantized coefficients, are stored arrayed in a single vector region provided to the buffer 401.

Now, a vector region is further divided into four 8-bit regions, with each of the four regions of the vector region having stored therein code representing the absolute values of the four quantized coefficients of the same length (bit length) from the left to the right direction in the drawing, in order from higher order bits.

With the vector region shown by arrow A12, in the drawing, the code "101" indicating the absolute value of the quantized coefficient is stored from the left in the 8-bit region at the left, the code "011" is stored from the left in the 8-bit region second from the left, the code "110" is stored from the left in the region second from the right, and the code "010" is stored from the left in the region at the far right.

Also, in the same way as with the case of a scalar region, with a vector region, upon code being stored in the entirety of one vector region, i.e., upon 32 bits of code being stored in one vector region, one new vector region is provided in the buffer 401, and code used with the vector computation processing is sequentially stored in the newly-provided scalar region.

Upon code indicating the absolute values of the quantized coefficients "−0101", "+0011", "−0110", and "+0010", being stored in the vector region the entropy encoding unit 123 stores the code indicating the signs of the four quantized coefficients in the scalar region, as shown by arrow A13.

As shown with arrow A11, the code "110001" made up of the code "1" indicating whether or not the quantized coefficients of the line to be encoded are all 0, and code "100001" indicating the maximum significant digits of the quantized coefficients, is already stored in the scalar region, so as shown by arrow A13, the code "1010", indicating the signs of the quantized coefficients "−0101", "+0011", "−0110", and "+0010", is stored to the right side of the code "110001" already stored in the scalar region (consecutively to the right of the code "110001").

Further, upon the first four quantized coefficients being encoded, the entropy encoding unit 123 encodes the next four quantized coefficients "+0011", "+0110", "0000", and "−0011".

First, the entropy encoding unit 123 compares the maximum significant digits "3" of the four quantized coefficients encoded the previous time, with the maximum significant digits "3" of the next four quantized coefficients "+0011", "+0110", "0000", and "−0011" encoded this time, and since the maximum significant digits is unchanged, stores a code "0" indicating that the maximum significant digits has not changed as a code for indicating the maximum significant digits, as shown by arrow A14, in the scalar region consecutively to the right of the code "1100011010" already stored.

Next, the entropy encoding unit 123 stores each of the codes "011", "110", "000", and "011", representing the absolute value of each of the w (four) quantized coefficients "+0011", "+0110", "0000", and "−0011" input this time, in the vector region as shown by arrow A15, simultaneously.

As shown by arrow A12, at the 8-bit region of the vector region at the left side in the drawing, at the 8-bit region second from the left, at the 8-bit region second from the right, and at the 8-bit region at the far right, the codes "101", "011", "110", and "010" are already stored, so the entropy encoding unit 123 stores each of the codes "011", "110", "000" and "011", representing the absolute value of each of the quantized coefficients input this time, consecutively to the right of the respective codes "101", "011", "110", and "010" already stored in the vector region, as shown by the arrow A15.

Further, the entropy encoding unit 123 takes the code "001" indicating the signs of the quantized coefficients of which the absolute value is not 0 for the four quantized coefficients "+0011", "+0110", "0000", and "−0011" input this time, and stores this consecutively to the right of the code "11000110100" already stored in the scalar region.

Upon the four quantized coefficient "+0011", "+0110", "0000", and "−0011" being encoded, the entropy encoding unit 123 performs encoding of the next four quantized coefficients "+1101", "−0100", "+0111", and "−1010".

First, the entropy encoding unit 123 compares, the maximum significant digits "4" of the four quantized coefficients "+1101", "−0100", "+0111", and "−1010" input this time, with the "3" of the four quantized coefficients encoded the previous time, and stores a code "101" indicating the maximum significant digits, made up of "1" indicating that the maximum significant digits has changed, "0" indicating that the maximum significant digits has increased, and "1" indicating the amount of increase of the maximum significant digits, as shown by arrow A17, in the scalar region.

In this case, the code "11000110100001" is already stored in the scalar region as shown by arrow A16, so the entropy encoding unit 123 stores the code "101" indicating the maximum significant digits to the right of the code "11000110100001" in the drawing.

Further, upon the code indicating the maximum significant digits of the four quantized coefficients "+1101", "−0100", "+0111", and "−1010", being stored, the entropy encoding unit 123 stores each of the codes "1101", "0100", "0111", and "1010" representing the absolute value of each of these, in the vector region as shown by arrow A18 simultaneously.

As shown by the arrow A15, at the 8-bit region of the vector region in the drawing, at the 8-bit region second from the left, at the 8-bit region second from the right, and at the 8-bit region at the far right, are already stored "101011", "011110", "110000", and "010011", respectively, so each of the 8-bit region at the left, the 8-bit region second from the left, the 8-bit region second from the right, and the 8-bit region at the far right, are only capable of storing two bits of code.

Accordingly, the entropy encoding unit 123 secures (provides) a new vector region in the buffer 401 as shown by arrow A18, stores code of the two higher order bits "11", "01", "01", and "10" of the codes "1101", "0100", "0111", "1010", representing the absolute value of the quantized coefficients input this time, consecutively to the right side of the code "101011", "011110", "1100000", and "010011", already stored in the vector region, and stores the two lower order bits "01", "00", "11", and "10", of the codes "1101", "0100", "0111", "1010", representing the absolute value of the quantized coefficients input this time, at the left side of each of the 8-bit region of the newly-provided vector region (of the two vector regions indicated by the arrow A18, the vector region at the bottom in the drawing) in the drawing, the 8-bit region second from the left, the 8-bit region second from the right, and the 8-bit region at the far right, respectively.

Upon code indicating the absolute value of the four quantized coefficients "+1101", "−0100", "+0111", and "−1010" being stored, as shown by the arrow A19 the entropy encoding unit 123 stores the code "0101" indicating the signs of the four quantized coefficients of which the absolute value is not zero, consecutively to the right side of the code "11000110100001101" already stored within the scalar region.

Thus, upon the input quantized coefficients being encoded, the entropy encoding unit 123 outputs in order, the code stored in the scalar region shown by the arrow A19, the code stored to the upper vector region in the drawing of the two vector regions shown by the arrow A19, and the code stored in the lower vector region, as an encoded image.

In this case, there is no code stored in the 11 bits to the right side in the diagram of the scalar region shown by the arrow A19. Also there is no code stored in the region of the right six bits of each of the 8-bit region at the left, the 8-bit region second from the left, the 8-bit region second from the right, and the 8-bit region at the far right, in the vector region at the bottom of the two vector regions indicated by the arrow A19.

In a case of outputting code stored in the scalar regions and vector regions in this way as an encoded image, in the event that here are regions where code is not stored in the scalar regions and vector regions at the point in time that encoding of the input quantized coefficients is completed, an arbitrary code such as code "0" for example, is stored, following which the code stored in the scalar regions and vector regions is encoded and output as an image.

Accordingly, in the example shown by arrow A19 for example, the code "11000110100001101101010100000000000" stored in the scalar region, the code "10101111011110011100000101001100" stored in the upper vector region in the drawing, and the code "0100000000000000110000001000000" stored in the lower vector region, are output in order as an encoded image. Now, the arbitrary code stored in the scalar regions and vector regions in regions where code is not stored at the point that encoding of the quantized coefficients ends is not read in at the time of decoding, so any sort of code may be stored.

In cases of encoding absolute values of the quantized coefficients using SIMD operation instructions as well, upon an image being input, the image encoding device 111 performs the encoding processing described with reference to the flowchart in FIG. 23. Also, at the entropy encoding processing in FIG. 24 corresponding to step S113 in FIG. 23, the image encoding device 111 performs processing the same as with a case of not using SIMD operation instructions for the processing of step S141 through step S149 in FIG. 24, the processing of step S151, and the processing of step S152 (the processing described with reference to FIG. 24), and for the w set encoding processing corresponding to step S150 performs processing difference from a case of not using SIMD operation instructions.

Figure 25:
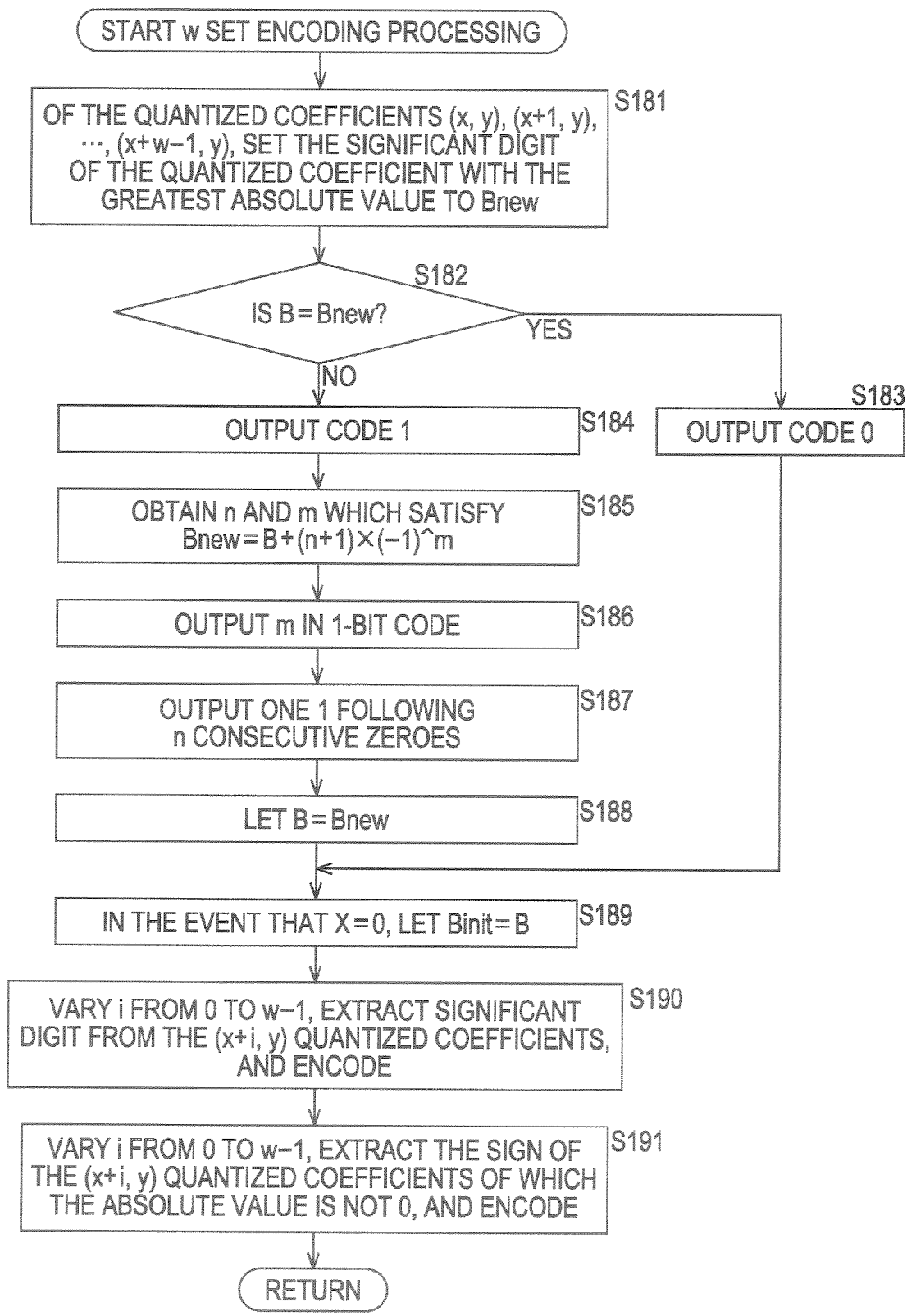
FIG. 25 is a flowchart for describing w set encoding processing.
Figure 35:
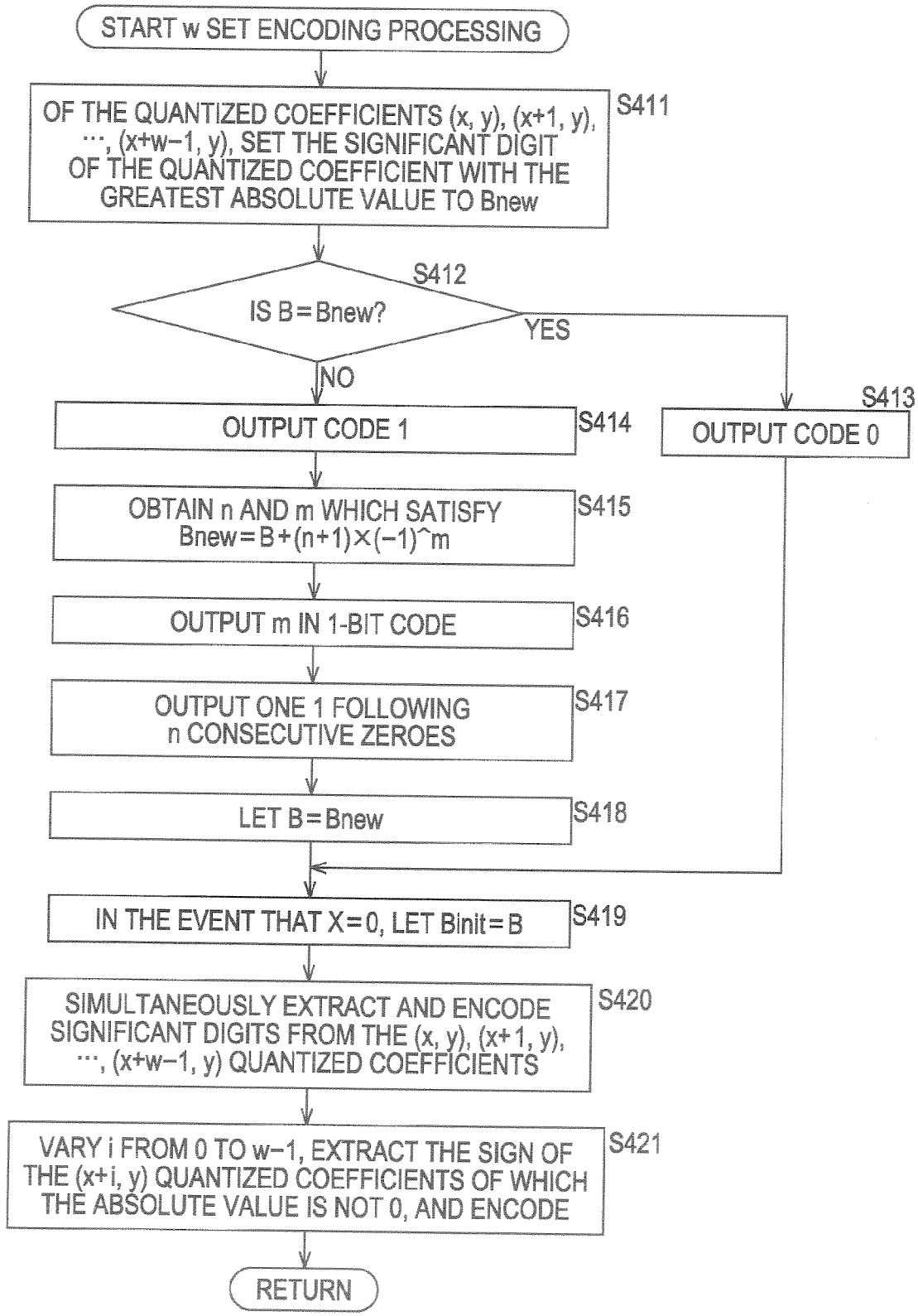
FIG. 35 is a flowchart for describing w set encoding processing.

The following is a description of w se encoding processing in a case of the image encoding device 111 encoding absolute values of the quantized coefficients using SIMD operation instructions, which will be given with reference to the flowchart in FIG. 35. Note that each processing in step S411 through S419 corresponds to each processing in step S181 through S189 in FIG. 25, and each is executed in the same way. Accordingly, description thereof would be redundant and therefore will be omitted.

Also, in a case of encoding absolute values of the quantized coefficients using SIMD operation instructions, in the processing described with reference to FIG. 24 and FIG. 35, code indicating whether or not the absolute values of the quantized coefficients of the line to be encoded, supplied from the VLC encoding unit 162 to the code linking unit 169, are all 0, code indicating the maximum significant digits of the quantized coefficients supplied from the supplied from the VLC encoding unit 164 to the code linking unit 169, and code indicating the sign of the quantized coefficients supplied from the VLC encoding unit 168 to the code linking unit 169 are each stored in scalar regions provided within the buffer 401 of the code linking unit 169, as described with reference to FIG. 34.

In step S420, the significant digit extracting unit 165 simultaneously extracts the significant digits of quantized coefficients from the w consecutive quantized coefficients at the positions (x, y), (x+1, y), . . . , (x+w−1, y), on the line y, supplied from the quantization unit 122. The significant digit extracting unit 165 supplies the extracted significant digits of the quantized coefficients to the VLC encoding unit 166 and sign extracting unit 167. Also, the VLC encoding unit 166 simultaneously outputs code indicating the absolute values of w quantized coefficients based on the significant digits supplied from the significant digit extracting unit 165 (encoding the significant digits) to the code linking unit 169.

Now, the value of x at the position (x, y) is taken as the value of the variable x stored at the maximum significant digit calculating unit 163, and the value of y is taken as the value of the variable y stored at the line determination unit 161. For example, in the event that the significant digit extracting unit 165 extracts the significant digits "101", "011", "110", and "010", as the significant digits of the quantized coefficients, code "101", "011", "110", and "010", indicating the absolute values of the four quantized coefficients is supplied from the VLC encoding unit 166 to the code linking unit 169, so the code lining unit 169 encodes the code indicating the absolute values of the quantized coefficients supplied hereto, and as shown by arrow A12 in FIG. 34, stores in the vector region.

In step S421, the sign extracting unit 167 takes a predetermined variable i and varies the variable i from 0 to (w−1), so as to extract the signs of the quantized coefficients, from the quantized coefficients at positions (x+i, y) on the line y of which quantized coefficients is not 0, supplied from the quantization unit 122, and supplies the extracted (data of) signs to the VLC encoding unit 168. Now, the value of x at the position (x, y) is taken as the value of the variable x stored at the maximum significant digit calculating unit 163, and the value of y is taken as the value of the variable y stored at the line determination unit 161.

The VLC encoding unit 168 encodes the signs from the sign extracting unit 167, and outputs code indicating the signs of the quantized coefficients obtained thereby to the code linking unit 169. Also, as described with reference to FIG. 34, the code linking unit 169 stores code indicating the signs of the quantized coefficients supplied from the VLC encoding unit 168, in the scalar region of the buffer 401.

Upon storing code indicating the signs of the quantized coefficients in the scalar region of the buffer 401, the code linking unit 169 links the codes stored in the scalar regions and vector regions of the buffer 401 as described with reference to FIG. 34, outputs the linked code as an encoded image, whereby the w set encoding processing is ended, and the processing is returned to step S150 in FIG. 24 and processing from step S151 on is executed.

Thus, the entropy encoding unit 123 simultaneously encodes the absolute values of a predetermined number of quantized coefficients.

With the JPEG 2000 method entropy encoding, quantized coefficients are subjected to arithmetic encoding in increments of bit planes, based on multiple coding paths, so performing predetermined processes in entropy encoding in parallel at the same time has been difficult, but with the entropy encoding unit 123, there is no need to perform complex processing in increments of bit planes, so the absolute values of multiple quantized coefficients can be encoded simultaneously.

Thus, simultaneously encoding the absolute values of a predetermined number of quantized coefficients enables multiple processes to be performed simultaneously in parallel), so images can be encoded at higher speeds.

Note that in the processing in step S421, description has been made that encoding of the signs of the w quantized coefficients is performed in order, but encoding of the signs of the w quantized coefficients may be performed simultaneously by using SIMD operation instructions, in the same way as with the case of encoding the absolute values of the quantized coefficients. In this case, each of the codes indicating the signs of the w quantized coefficients obtained by encoding are stored in the vector region of the buffer 401, having been divided into w.

Also, while description has been made regarding the buffer 401 that one scalar region or vector region is a 32-bit region, and that the 32-bit regions are further divided into 8-bit regions for use, but the size and the like of a scalar region or vector region may be of arbitrary size. For example, an arrangement may be made wherein a scalar region or vector region is set as a 128-bit region, with the 128-bit region being divided into eight 16-bit regions for use.

Further, in a case of decoding an image encoded using SIMD operation instructions, the code dividing unit 251 (FIG. 27) of the image decoding device 211 which decodes the image is configured as shown in FIG. 28, for example, and code which is an encoded image is stored 32 bits at a time in the memory 272, as described with reference to FIG. 34.

In the event of reading out code from the memory and outputting this, the control unit 271 first takes the storage region where the first 32 bits of code are stored as a scalar region, and reads out and outputs, in order from the top of the scalar region, code indicating whether or not the absolute values of the quantized coefficients of the line to be decoded are all 0, code indicating the maximum significant digit of the quantized coefficients, or code indicating the signs of the quantized coefficients.

Also, in the event of reading out code indicating the absolute values of the quantized coefficients from the memory 272, the control unit 271 takes the 32-bit storage region following the storage region taken as a scalar region in the memory 272 (accordingly, code has not yet been read out of this region) as a vector region, and reads out and outputs code indicating the absolute values of the quantized coefficients from this vector region.

Note that in the event that an image is encoded, the image is encoded such that, at the time of reading out code indicating the absolute values of the quantized coefficients the first time upon decoding, there is always code indicating the absolute values of the quantized coefficients (code used for vector computation) stored in the next 32-bit storage region following a storage region used as a scalar region.

Further, how many bits each the storage regions, into which the code that is the encoded image is divided and stored in the memory 272, are made up of, changes according to how many bits one scalar region and vector region are set to in the event of encoding an image with the image encoding device 111. That is to say, the size of each of the multiple storage regions within the memory 272 to which the code that is the encoded image is divided and stored, is the size of one scalar region and vector region in the event of encoding an image.

In the case of decoding absolute values of the quantized coefficients using SIMD operation instructions as well, the image decoding unit 211 performs the decoding processing described with reference to the flowchart shown in FIG. 30 upon an encoded image being input. Also, with the entropy decoding processing in FIG. 31 corresponding to the processing of step S231 in FIG. 30, regarding each process of step S261 through step S268 in FIG. 31, the processing in step S270, and the processing in step S271, the image decoding device 211 performs processing the same as with a case of not using SIMD control commands (the processing described with reference to FIG. 31), and in the w set decoding processing corresponding to step S269, performs processing different from that of a case of not using SIMD control commands.

Figure 36:
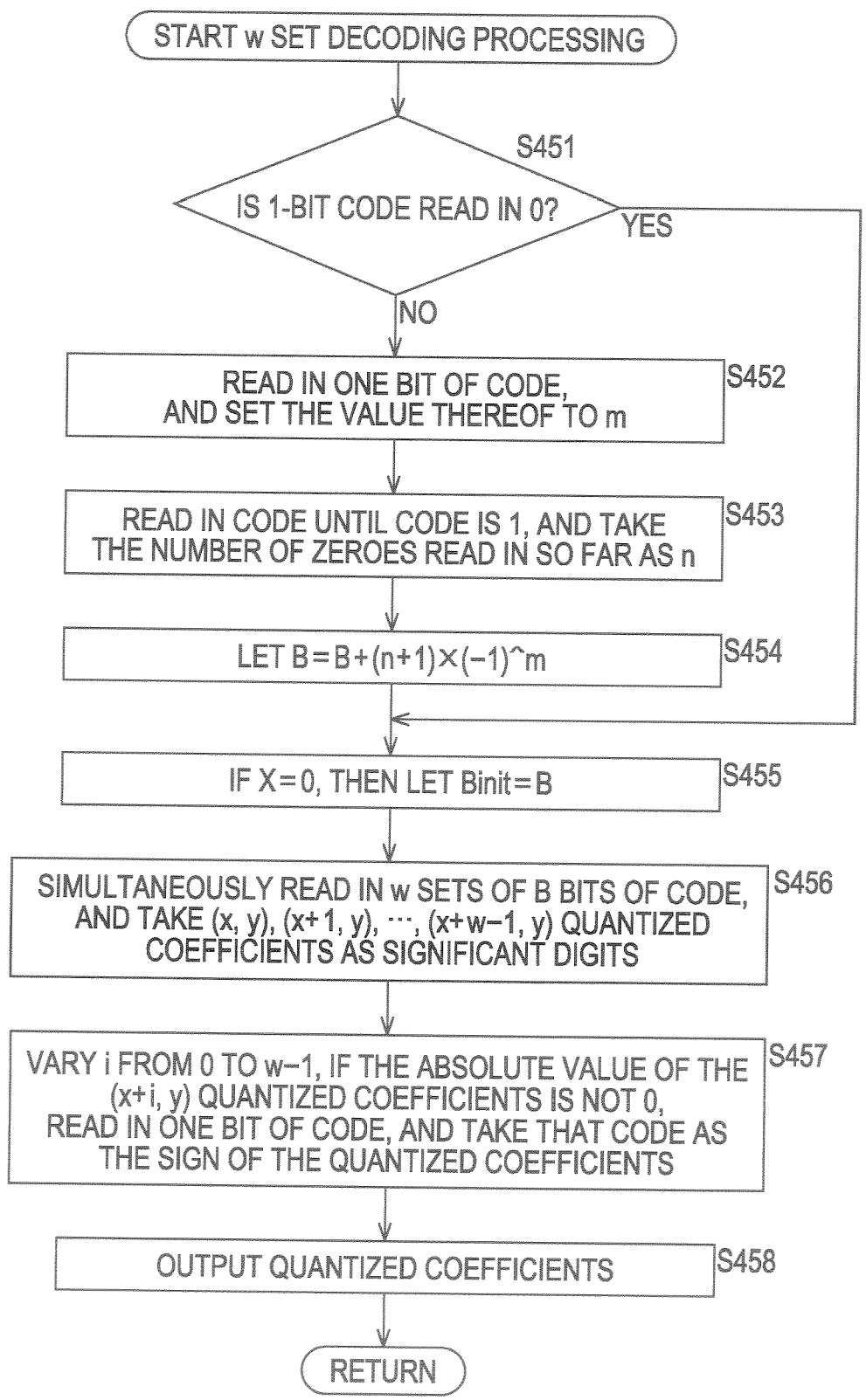
FIG. 36 is a flowchart for describing w set decoding processing.

The following is a description of w set decoding processing in a case of the image decoding device 221 decoding absolute values of the quantized coefficients using SIMD operation instructions, with reference to the flowchart shown in FIG. 36.

Note that the processes in step S451 through step S455 corresponds to the processes in step S311 through step S315 in FIG. 32, and are each executed in the same way. Accordingly, redundant description thereof will be omitted.

Also, in a case of decoding the absolute values of the quantized coefficients using SIMD operation instructions, code which is an image is stored in the memory 272 of the code dividing unit 251 divided into three 32-bit regions, for example, as shown by the arrow A19 in FIG. 34. The line determination unit 252, VLC decoding unit 254, and VLC decoding unit 256 each take, of the three 32-bit regions, the uppermost region in FIG. 34, as the scalar region, and sequentially read out and decode from the top of the scalar region (the left side in the drawing) code indicating whether or not the quantized coefficients of the line are all 0, code indicating that maximum significant digit of the quantized coefficients, and code indicating the signs of the quantized coefficients.

In step S456, the VLC decoding unit 255 simultaneously reads in w sets of B consecutive bits of code from the code dividing unit 255, and takes each of the w sets of B bits of code read in as code indicating the significant digits of quantized coefficients from the w consecutive quantized coefficients at the positions (x, y), (x+1, y), . . . , (x+w−1, y), on the line y, and supplies (outputs) this to the VLC decoding unit 256 and quantized coefficient synthesizing unit 257. Also, the VLC decoding unit 255 generates information indicating the significant digits of the quantized coefficients, and supplies this to the code dividing unit 251. Now, the value of x at the position (x, y) is taken as the value of the variable x stored at the VLC decoding unit 254, and the value of y is taken as the value of the variable y stored at the line determination unit 252.

For example, if we say that the predetermined number w is 4, the value of the variable B is 3, and code, which is an image, is stored in the memory 272 of the code dividing unit 251 by being divided into three 32-bit storage regions, as shown by the arrow A19 in FIG. 34, the 32-bit storage region at the uppermost side in FIG. 34 is already taken as a scalar region, with code indicating whether or not the quantized coefficients of the line are all 0, and code indicating the maximum significant digit of the quantized coefficients, having being read out, and the code has not been read out yet from the next 32-bit storage region (storage region the second from the top), so the VLC decoding unit 255 takes the storage region the second from the top as a vector region, and reads out simultaneously the codes "101", "011", "110", and "010" indicating the significant digits of the quantized coefficients at the positions (x, Y), (x+1, y), (x+2, y), and (x+3, y), from the left-side 8-bit region of the vector region in the drawing, the 8-bit region second from the left, the 8-bit region second from the right, and the 8-bit region at the far right.

Upon code indicating the significant digits of the w quantized coefficients being supplied to the VLC decoding unit 256 and the quantized coefficient synthesizing unit 257, subsequently, the processing of step S457 and the processing of step S458 are performed, but these processes are the same as the processing of step S317 and the processing of step S318 in FIG. 32, so description thereof will be omitted.

Thus, the entropy decoding unit 221 simultaneously decodes the absolute values of a predetermined number of quantized coefficients.

Thus, simultaneously decoding the absolute values of a predetermined number of quantized coefficients enables multiple processes to be performed simultaneously (in parallel), and images can be decoded at higher speeds.

Note that while description has been made regarding the processing in step S457 that the decoding of each of codes indicating the signs of the w quantized coefficients is to be performed in order, an arrangement may be made wherein decoding of each of the codes indicating the signs of the w quantized coefficients is performed simultaneously (in parallel), using SIMD operation instructions.

As described above, there is no need to perform arithmetic encoding of quantized coefficients in increments of bit planes, based on multiple coding paths, unlike the case of encoding (or decoding) an image with conventional JPEG 2000, so image encoding (or decoding) can be performed faster, with simpler processing.

With the conventional JPEG 2000 method, processing is performed for each bit plane based on multiple coding paths, so in the event of performing processing thereof, quantized coefficients have to be accessed around as many times as a number obtained by multiplying the quantized coefficients by the number of bit planes, meaning that the amount of processing was great.

Also, in the case of packetizing an encoded image, packetizing processing cannot be started unless encoding of one image is completely ended, so delay equivalent to the standby interval thereof is generated accordingly. Further, with the JPEG 2000 method, encoded) quantized coefficients corresponding to positions within a rectangular region made up of parallel sides in the x direction and y direction on the sub-band shown in FIG. 2 for example, are stored within one packet, so there is also generated delay corresponding to the length of the y direction of the rectangular region With the conventional JPEG 2000 method, such delays due to encoding are generated, so real-time processing has been difficult. Now, while delay could be reduced by shortening the length in the y direction of the rectangular region on the sub-band, encoding efficiency deteriorates in this case.

Conversely, with the image encoding device 111, there is no need to perform arithmetic encoding of quantized coefficients for each bit plane based on multiple coding paths as described above, and the quantized coefficients are accessed only at the time of encoding the image, when outputting code indicating the absolute values of the quantized coefficients when outputting code indicating maximum significant digits, and when outputting code indicating the signs of the quantized coefficients, so images can be encoded in a simpler manner.

Also, there are cases wherein the code indicating the maximum significant digit and the code indicating the signs of the quantized coefficients are 1 bits or 0 bits, so in a case of encoding this image, an image can actually be encoded by accessing the quantized coefficients only around twice. Also, in the case of decoding an image, the quantized coefficients only need to be accessed once, so images can be decoded in a more simple and faster manner.

At the image encoding device 111 and image decoding device 211, quantized coefficients of a sub-band are encoded and decoded in raster scan order, so there is no need to buffer the quantized coefficients, whereby delay due to encoding and decoding can be reduced.

Further, actual encoding and decoding of a YUV 4:2:2 format image 1920 pixels horizontal×1080 pixels vertical using SIMD operation instructions (wherein w=4) yielded the following results. Note that at the time of performing encoding, the image was subjected to wavelet transformation and decomposed into five levels of sub-bands, and further the quantized coefficients obtained by quantizing wavelet coefficients for each sub-band were encoded. Also, functional blocks necessary for encoding and decoding (e.g., the entropy encoding unit 123 in FIG. 33 and the entropy decoding unit 221 in FIG. 27), and functional blocks for encoding and decoding the image with JPEG 2000, were realized by causing a CPU (clock frequency of 3.0 GHz) called Pentium (a registered trademark) 4 (a trademark of Intel Corporation) to execute predetermined programs.

In the case of encoding one frame of the image with the conventional JPEG 2000 method, the code size was 291571 bytes, and the amount of time required for encoding was 0.26157 seconds. Also, the time necessary for decoding the encoded image was 0.24718 seconds.

Conversely, in the case of encoding one frame of the image with the entropy encoding unit 123 in FIG. 33, the code size was 343840 bytes, and the amount of time required for encoding was 0.03453 seconds. Also, the time necessary for decoding the encoded image with the entropy decoding unit 221 in FIG. 27 was 0.02750 seconds.

Moving images are often displayed with 30 frames per second, so images can be processed in real-time as long as encoding or decoding can be performed in 0.033 (=$\frac{1}{30}$) seconds per frame. With the JPEG 2000 method, the amount of time necessary for encoding is 0.26157 seconds, and the amount of time necessary for decoding is 0.24718 seconds, so real-time processing of images is difficult, but in the case of encoding an image with the entropy encoding unit 123 in FIG. 33, the amount of time required for encoding is 0.03453 seconds, so images can be processed in just about real-time. Also, in the case of decoding an image with the entropy decoding unit 221 in FIG. 27, the amount of time required for decoding is 0.02750 seconds, so images can be sufficiently processed in real-time.

In the above, an example of encoding image data or an example of decoding encoded data wherein image data has been encoded, has been described, but this is not restricted to image data, and can be applied to cases of encoding audio data or the like, or decoding encoded data wherein audio data has been encoded, for example. For example, in the case of encoding audio data, code indicating the maximum significant digits of w predetermined values expressed by code input as audio data, code indicating the absolute values of the numeric values, and code indicating the signs of the numeric values, are output as encoded audio data.

To mention a further feature of the present embodiment, with the encoding method describe with the present embodiment, the quantized coefficients are losslessly encoded. Accordingly, quantizing with greater step sizes for higher band coefficients so as to match human visual perception properties allows image quality per amount of generated code to be markedly improved. Also, reducing quantization step sizes used in a particular space range allows the image quality of that space range to be improved.

Further, with the encoding method described with the present embodiment, an array of the significant digit portion of absolute values is encoded. If we say that the significant digit portion of absolute values is subjected to VLC encoding and transmitted, in the event that the significant digit of absolute values is N, an extremely large VLC table having $2^{(N*W)}$ entries is necessary (increasing not only the load and processing time for necessary for holding the VLC table). Conversely, with the encoding method described in the present embodiment, there is no need to use such a large table (not only the load and processing time for computation processing, but also the memory capacity necessary can be reduced).

Also, using arithmetic encoding with a high compression rate than VLC can be conceived, but even using a compression method with arithmetic encoding such as JPEG 2000 for example does not greatly improve compression rate over the case of the encoding method described with the present embodiment. That is to say, with the encoding method described with the present embodiment, encoding processing is easy while the compression rate is high.

With the encoding method described with the present embodiment, the maximum significant digits of the absolute values of w sets of coefficients are encoded, so the size of generated code can be reduced utilizing the fact that the significant digits of adjacent coefficients are similar.

Also, with the encoding method described with the present embodiment, differential encoding is performed when encoding the maximum significant digits of absolute values of w sets of coefficients, so the size of generated code can be reduced utilizing the fact that the significant digits of adjacent coefficients are similar in this point as well.

Also, the entropy encoding processing by the entropy encoding unit 123 and the entropy decoding processing by the entropy decoding unit 221 according to the above-described sixth embodiment can be applied to each of the above-described first through fifth embodiments, whereby the delay time, power consumption, buffer memory size necessary for processing, and so forth, can be further reduced for the overall image encoding processing and image decoding processing. For example the entropy encoding unit 123 can be applied as the entropy encoding unit 15 of the image encoding device 1 in FIG. 1 (i.e., the entropy encoding unit can execute entropy encoding processing in the same way as with the entropy encoding unit 123). Also, for example, the entropy decoding unit 221 can be applied as the entropy decoding unit 21 of the image decoding device 20 in FIG. 9 (i.e., the entropy decoding unit 21 can execute entropy decoding processing in the same way as with the entropy decoding unit 221).

That is to say, applying the entropy encoding processing according to the sixth embodiment to each of the above-described first embodiment through fifth embodiment allows the code size generated to be reduced by capitalizing on the feature of the order of output of coefficients from the wavelet transformation unit in each of the embodiments (i.e., that the significant digits of consecutive coefficients are similar). Also, even in cases of rearranging coefficients, the wavelet transformation unit performs wavelet transformation in increments of line bocks, so the feature that the significant digits of consecutive coefficients are similar is not greatly affected, and the generated code size in the entropy encoding processing does not greatly change.

As described above, the entropy encoding processing according to the sixth embodiment, and the features of processed coefficient data and the anticipated advantages thereof, are similar to the wavelet transformation processing described with the above-described first embodiment through fifth embodiment, and have strong affinity with each other. Accordingly, with the overall image encoding processing, greater advantages can be expected from applying the entropy encoding processing according to the present embodiment to the wavelet transformation processing described with the above-described first embodiment through fifth embodiment, as compared to applying other encoding methods.

Next, a seventh embodiment of the present invention will be described. This seventh embodiment is an example of a digital triax system to which the image encoding device and image decoding device according to the above-described embodiments have been applied.

A triax system is a system used in television broadcasting stations, production studios, and so forth. With such a system, at the time of recording in the studio or broadcasting live from a remote location, a single triaxial cable connecting a video camera and a camera control unit or a switcher is used to transmit multiplex signals such as picture signals, audio signals, return picture signals, synchronizing signals, and so forth, and also to supply power.

Many conventional triax systems have been arranged to transmit the above-described signals in the form of analog signals. On the other hand, in recent years, entire systems are becoming digital, and accordingly, triax systems used in television broadcasting stations are also becoming digital.

With known digital triax systems, the digital video signals transmitted over the triax cable have been uncompressed video signals. The reason for this is that the specs demanded regarding signal delay time are particularly severe with television broadcasting stations, basically, the delay time from shooting to monitor output, for example, is required to be within one field (16.67 msec). Compression encoding systems such as MPEG2 and MPEG4 which have realized high compression rates and high image quality have not been used in triax systems since time equivalent to several frames worth is required for video signal compression and encoding, and decoding of compressed video signals, meaning that delay time is great.

The image encoding and image decoding methods according to the present invention, as described above, have an extremely short delay time for input of image data to obtaining of an output image, within one filed time, i.e., several lines to several tens of lines, and accordingly suitable application can be made to a digital triax system.

Figure 37:
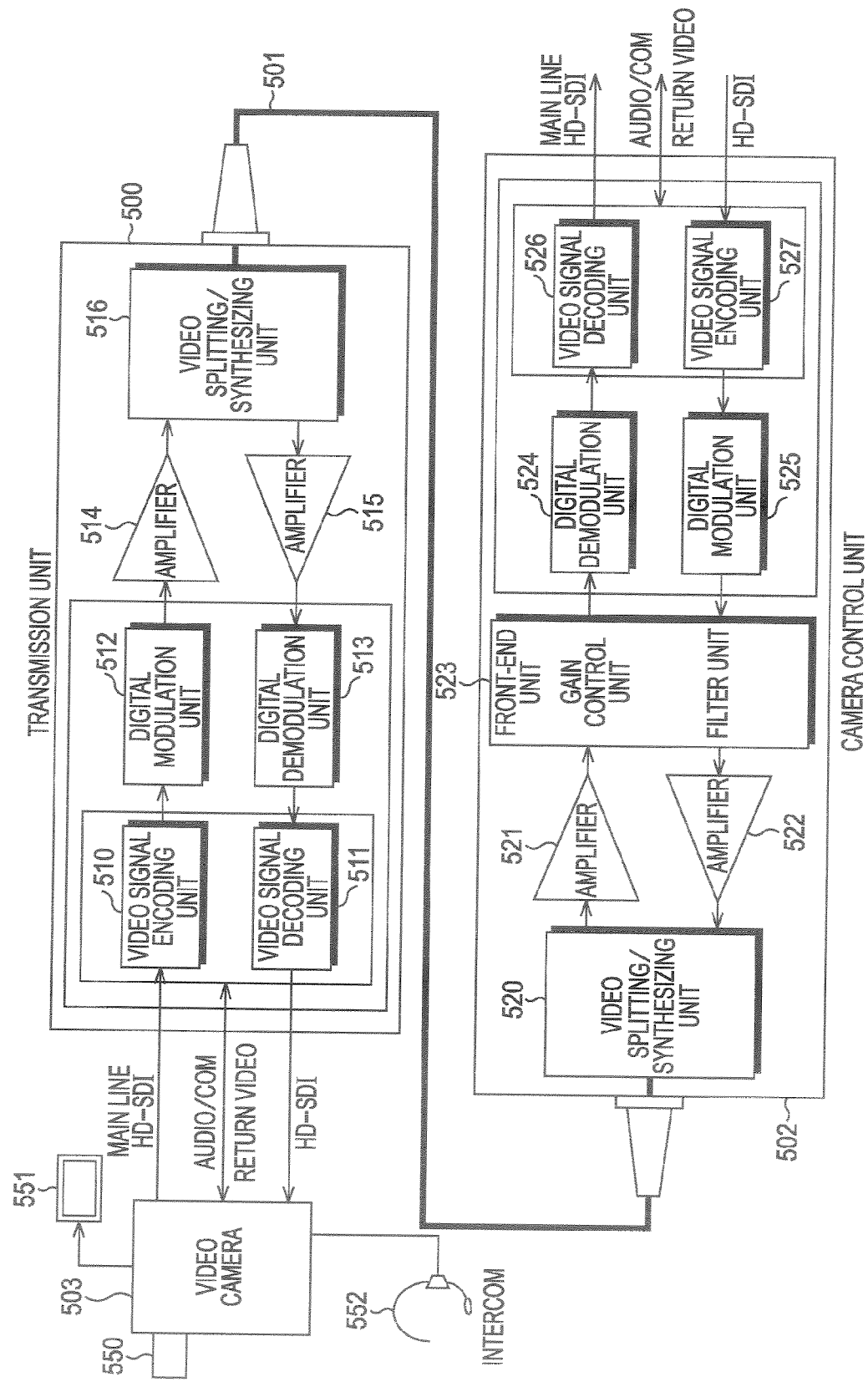
FIG. 37 is a block diagram illustrating the configuration of an example of a digital triax system to which the present invention has been applied.

FIG. 37 illustrates a configuration of an example of a digital triax system applicable to the image encoding and image decoding method according to the present invention A transmission unit 500 and camera control unit 502 are connected via a triax cable (triaxial cable) 501. Digital video signals and digital audio signals (hereafter referred to as "main line signals") from the transmission unit 500 to the camera control unit 502 which are actually broadcast, or used as contents, and intercom audio signals and return digital video signals from the camera control unit 502 to the video camera unit 503, are transmitted over the triax cable 501.

The transmission unit 500 is built into an unshown video camera device, for example. Of course, other arrangements may be made, such as the transmission unit 500 being connected to the video camera device as an external device of the video camera device. The camera control unit 502 may be a device commonly called a CCU (Camera Control Unit), for example.

Digital audio signals have little bearing on the essence of the present invention, so description thereof will be omitted for the sake of simplicity in description.

The video camera unit 503 is configured within an unshown video camera device for example, and performs photoreception with an unshown image-taking device such as a CCD (Charge Coupled Device), of light from a subject that has been taken in via an optical system 550 including a lens, focusing mechanism, zooming mechanism iris adjusting mechanism, and so forth. The image-taking device converts the received light into electrical signals by photoelectric conversion, and further performs predetermined signals processing, so as to output as baseband digital video signals. These digital video signals are mapped to an HD-SDI (Definition Serial Data Interface) format for example, and output.

Also connected to the video camera unit 503 are a display unit 551 used as a monitor, and an intercom 552 used for exchanging audio externally.

The transmission unit 500 has a video signal encoding unit 510 and video signal decoding unit 511, digital modulation unit 512 and digital demodulation unit 513, amplifiers 514 and 515, and a video splitting/synthesizing unit 516.

Baseband digital video signals mapped to the HD-SD format for example, are supplied from the video camera unit 503 to the transmission unit 500. The digital video signals are compressed and encoded at the video signal encoding unit 510 so as to become a code stream, which is supplied to the digital modulation unit 512. The digital modulation unit 512 modulates the supplied code stream into signals of a format suitable for transmission over the triax cable 501, and outputs. The signals output from the digital modulation unit 512 are supplied to the video splitting/synthesizing unit 516 via an amplifier 514. The video splitting/synthesizing unit 516 sends the supplied signals to the triax cable 501. These signals are received at the camera control unit 502 via the triax cable 501.

The signals output from the camera control unit 502 are received at the transmission unit 500 via the triax cable 501. The received signals are supplied to the video splitting/synthesizing unit 516, and the portion of digital video signals and the portion of other signals are separated. Of the received signals, the portion of the digital video signals is supplied via an amplifier 515 to the digital demodulation unit 513, the signals modulated into signals of a format suitable of transmission over the triax cable 501 are demodulated at the camera control unit 502 side, and the code stream is restored.

The code stream is supplied to the video signal decoding unit 511, the compression encoding is decoded, and the baseband digital video signals are obtained. The decoded digital video signals are mapped to the HD-SDI format and output, and supplied to the video camera unit 503 as return digital video signals. The return digital video signals are supplied to the display unit 551 connected to the video camera unit 503, and used for monitoring by the camera operator.

The cameral control unit 502 has a video splitting/synthesizing unit 520, amplifiers 521 and 522, a front-end unit 523, a digital demodulation unit 524 and digital modulation unit 525, and a video signal decoding unit 526 and video signal encoding unit 527.

Signals output from the transmission unit 500 are received at the camera control unit 502 via the triax cable 501. The received signals are supplied to the video splitting/synthesizing unit 520. The video splitting/synthesizing unit 520 supplies the signals supplied thereto to the digital demodulation unit 524 via the amplifier 521 and front end unit 523. Note that the front end unit 523 has a gain control unit for adjusting gain of input signals, a filter unit for performing predetermined filtering on input signals, and so forth.

The digital demodulation unit 524 demodulates the signals modulated into signals of a format suitable of transmission over the triax cable 501 at the transmission unit 500 side, and restores the code stream. The code stream is supplied to the video signal decoding unit 526 where compression encoding is decoded, so as to obtain the baseband digital video signals. The decoded digital video signals are mapped to the HD-SDI format and output, and externally output as main line signals.

The return digital video signals and digital audio signals are supplied externally to the camera control unit 502. The digital audio signals are supplied to the intercom 552 of the camera operator for example, to be used for transmitting external audio instructions to the camera operator.

The return digital video signals are supplied to the video signal encoding unit 527 and compression encoded, and supplied to the digital modulation unit 525. The digital modulation unit 525 modulates the supplied code stream into signals of a format suitable for transmission over the triax cable 501, and outputs. The signals output from the digital modulation unit 525 are supplied to the video splitting/synthesizing unit 520 via the front end unit 523 and amplifier 522. The video splitting/synthesizing unit 520 multiplexes these signals with other signals, and sends out to the triax cable 501. The signals are received at the video camera unit 503 via the triax cable 501

With this seventh embodiment of the present invention, the image encoding device and the image decoding device described with the above embodiments are respectively applied to the video signal encoding unit 510 and video signal encoding unit 527, and the video signal decoding unit 511 and video signal decoding unit 526.

Particularly, the second embodiment of the present invention arranged so that the processing of the various elements at the image encoding device and image decoding device can be performed in parallel can greatly suppress delay at the time of outputting pictures taken at the video camera unit 503 from the camera control unit 502, and delay of return digital video signals externally supplied and transmitted from the camera control unit 502 to the video camera unit 503, and is suitably applied to the seventh embodiment of the present invention.

Also, in the case of the system shown in FIG. 37, the signal processing capabilities and memory capacity can be set as appropriate at each of the transmission unit 500 and camera control unit 502, so the position at which the coefficient data rearranging processing is performed may be at either the transmission unit 500 side or camera control unit 502 side, and the position for performing entropy encoding may, in the same way, be either before or after the rearranging processing.

That is to say, at the transmission unit 500 side, the video signal encoding unit 510 performs the wavelet transformation and entropy encoding according to the method of the present invention, on the digital video signals supplied thereto, and outputs a code stream. As described above upon a number of lines corresponding to the number of taps of the filter used for wavelet transformation and according to the number of division levels of wavelet transformation being input, the video signal encoding unit 510 starts wavelet transformation. Further, as described above with reference to FIG. 5, FIG. 6, FIG. 11, and so forth, upon coefficient data necessary for the components being accumulated at the image encoding device and image decoding device, processing is sequentially performed by the components. Upon processing ending to the bottom line of one frame or one field, processing of the next one frame or one field is started.

This also holds true for transmitting return digital video signals from the camera control unit 502 side to the transmission unit 500 side. That is to say, at the camera control unit 502 side, the wavelet transformation and entropy encoding according to the present invention is performed on the externally supplied return digital video signals by the video signal encoding unit 527, and a code stream is output.

Now, there are many cases wherein it is permissible for the return digital video signals to be of a lower image quality than the digital video signals of the main line signals. In this case, the bit rate at the time of encoding at the video signal encoding unit 527 can be lowered. For example, the video signal encoding unit 527 performs control with the rate control unit 14 such that the bit rate of entropy encoding processing at the entropy encoding unit 15 is lower. Also, an arrangement can be conceived, wherein, for example, at the camera control unit 502 side, transformation processing is performed to a higher division level with the wavelet transformation unit 10 at the video signal encoding unit 527, and at the transmission unit 500 side, the wavelet inverse transformation at the wavelet inverse transformation unit 23 at the video signals encoding unit 511 side is stopped at a lower division level. Processing at the video signal encoding unit 527 of the camera control unit 502 is not restricted to this example, and various other types of processing can be conceived, such as keeping the division level for wavelet transformation low so as to alleviate the load of transformation processing.

Figure 38:
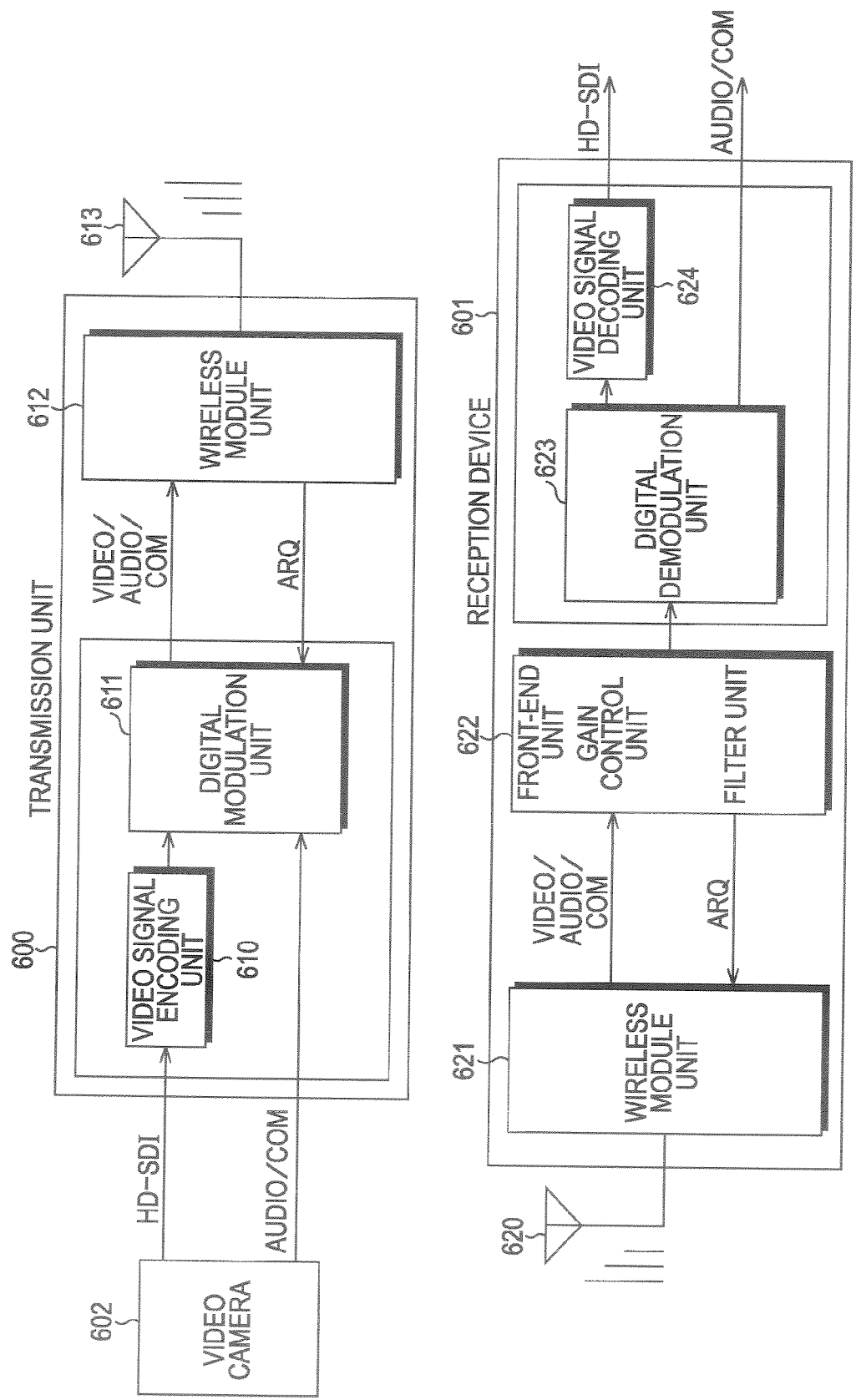
FIG. 38 is a block diagram illustrating the configuration of an example of a wireless transmission system to which the present invention has been applied.

Next, an eighth embodiment of the present invention will be described. With this eighth embodiment of the present invention, transmission of encoded data encoded at the image encoding device according to the present invention to the image decoding device side is performed using wireless communication FIG. 38 illustrates the configuration of an example of a wireless transmission system according to the eighth embodiment of the present invention, Note that in the example in FIG. 38, video signals are transmitted unidirectionally from the video camera or transmission unit 600 side (hereafter abbreviated as "transmission unit 600") to the reception device 601 side. Bidirectional communication between the transmission unit 600 and reception device 601 can be performed for audio signals and other signals.

The transmission unit 600 is built into an unshown video camera device having a video camera unit 602, for example. Of course, other arrangements may be made, such as the transmission unit 600 being connected to the video camera device as an external device of the video camera device having the video camera unit 602.

The video camera unit 602 has a predetermined optical system, an image-taking device such as a CCD, and a signal processing unit for outputting signals output from the image-taking device as digital video signals, for example. These digital video signals are mapped to an HD-SDI format for example, and output from the video camera unit 602, for example. Of course, the digital video signals output from the video camera unit 602 are not restricted to this example and may be of other formats as well.

The transmission unit 600 has a video signal encoding unit 610, digital modulation unit 611, and a wireless module unit 612. At the transmission unit 600, the baseband digital video signals are mapped to the HD-SDI format for example, and output from the video camera unit 602. The digital video signals are subjected to compression encoding by wavelet transformation and entropy encoding according to the compression encoding method of the present invention at the video signal encoding unit 610, so as to become a code stream which is supplied to the digital modulation unit 611. The digital modulation unit 611 performs digital modulation of the supplied code stream into signals of a format suitable for wireless communication, and outputs.

Also, digital audio signals and other signals, such as predetermined commands and data for example, are also supplied to the digital modulation unit 611. For example, the video camera unit 602 has a microphone whereby collected sound is converted into audio signals, and further the audio signals are subjected to A/D conversion and output as digital audio signals. Further, the video cameral unit 602 is capable of outputting certain commands and data. The commands and data may be generated within the video camera unit 602, or an operation unit may be provided to the video camera unit 602 with the commands and data being generated in response to user operations made at the operating unit. Also, an arrangement may be made wherein an input device, for inputting commands and data, is connected to the video camera unit 602.

The digital modulation unit 611 performs digital modulation of these digital audio signals and other signals, and outputs. The digital modulated signals output from the digital modulation unit 611 are supplied to the wireless module unit 612 and wirelessly transmitted from an antenna 613 as airwaves.

Upon receiving an ARQ (Auto Repeat Request) from the reception device 601 side, the wireless module unit 612 makes notification of this ARQ to the digital modulation unit 611, so as to request a data resend.

The airwaves transmitted from the antenna 613 are received at an antenna 620 of the reception device 601 side, and supplied to a wireless module unit 621. The wireless module unit 621 supplies digital modulated signals based on the received airwaves to the front end unit 622. The front end unit 622 performs predetermined signal processing such as gain control to the supplied digital modulated signals, for example, and supplies to the digital demodulation unit 623. The digital demodulation unit 623 demodulates the supplied digital modulated signals, and restores the code stream.

The code stream restored at the digital demodulation unit 623 is supplied to the video signal decoding unit 624, the compressed encoding is decoded with the decoding method according to the present invention, and the baseband digital video signals are obtained. The decoded digital video signals are mapped to the HD-SDI format for example, and output.

The digital demodulation unit 623 is also supplied with the digital audio signals and other signals subjected to digital modulation at the transmission unit 600 side and transmitted. The digital demodulation unit 623 demodulates the signals wherein these digital audio signals and other signals have been subjected to digital modulation, and restores and outputs the digital audio signals and other signals.

Also, the front end unit 622 performs error detection according to a predetermined method regarding the received signals supplied from the wireless module unit 621, and in the event that an error is detected such as an erroneous frame having been received for example, outputs an ARQ. The ARQ is supplied to the wireless module unit 621, and transmitted from the antenna 620.

With such a configuration, the transmission unit 600 is built into a relatively small-sized video camera device having a video camera unit 602 for example, a monitor device is connected to the reception device 601, and the digital video signals output from the video signal decoding unit 624 are supplied to the monitor device. As long as the reception device 601 is within the airwave range of the airwaves transmitted form the wireless module unit 612 from the video camera device having the built-in transmission unit 600, the pictures taken with the video camera device can be watched on the monitor device with little delay, e.g., with a delay within one field or one frame.

Note that in the example shown in FIG. 38, communication between the transmission unit 600 and the reception device 601 is performed using wireless communication, so as to transmit video signals via wireless communication, but this arrangement is not restricted to this example. For example, the transmission unit 600 and the reception device 601 may be connected via a network such as the Internet. In this case, the wireless module unit 612 at the transmission unit 600 side and the wireless module unit 621 at the reception device side 601 side are each communication interfaces capable of communication using IP (Internet Protocol).

Various applications can be conceived for the system according to this eighth embodiment. For example, the system according to this eighth embodiment can be applied to a videoconferencing system. An example of an arrangement would be to connect a simple video camera device capable of USB (Universal Serial Bus) connection to a computer device such as a personal computer, with the computer device side implementing the video signal encoding unit 610 and video signal decoding unit 624. The video signal encoding unit 610 and video signal decoding unit 624 implemented at the computer device may be a hardware configuration, or may be realized by software running on the computer device.

For example, each of the members participating in the videoconference would be provided with a computer device and a video camera device to be connected to the computer device, with the computer device being connected to a server device for providing the videoconference system service, by either cable or wireless network. Video signals output from the video camera device are supplied to the computer device via USB cable, and the encoding processing according to the present invention is performed at the video signal encoding unit 610 within the computer device. The computer device transmits the code steam wherein the videos signals have been encoded, to the server device or the like, via the network.

The server device transmits the received code stream to the computer device of each of the participating members, via the network. This code stream is received at the computer device of each of the participating members, and is subjected to the decoding processing according to the present invention at the video signal decoding unit 624 within the computer device. The image data output from the video signal decoding unit 624 is displayed on the display unit of the computer device as a picture.

That is to say, video pictures taken by the video camera devices of the other participating members are displayed on the display units of the computer devices of each of the participating members. Accordingly, with the eighth embodiment of the present invention, the delay time from encoding video signals taken with a video camera device to decoding thereof at the computer device of other participating members is short, so the unnatural sensation of the pictures of other participating members being displayed on the display units of the computer devices of the participating members being delayed, can be reduced.

Further, an arrangement can be conceived wherein the video signal encoding unit 610 is installed at the video camera device side. For example, the transmission unit 600 is built into a video camera device. Such a configuration does away with the need for the video camera device to be connected to another device such as a computer device or the like.

Figure 39:
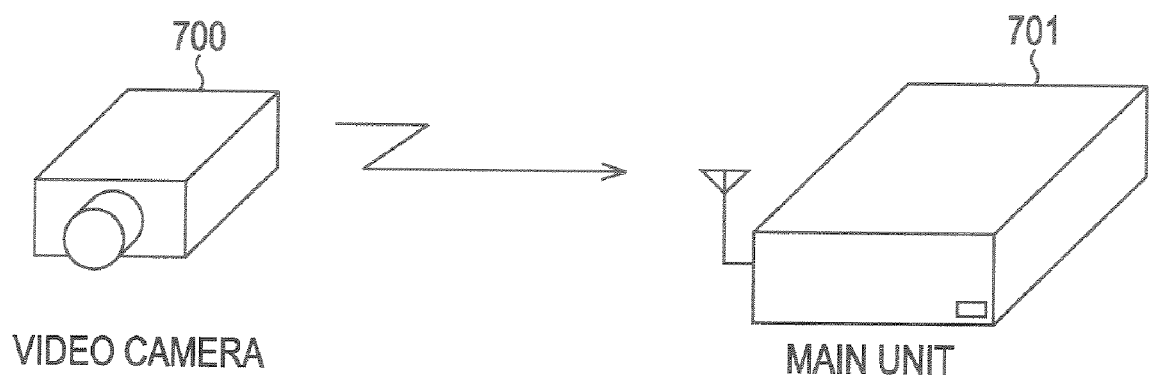
FIG. 39 is a diagram illustrating the configuration of an example of a home gaming console to which the present invention has been applied.

Such a system made up of the video camera device with the transmission unit 600 built in, and the reception device 601, can be applied to various applications other than the above-described videoconferencing system. For example, as schematically shown in FIG. 39, this system can be applied to a home gaming console. In FIG. 39, the transmission unit 600 according to the eighth embodiment of the present invention is built into a video camera device 700.

In the main unit 701 of the home gaming console, a bus for example connects a CPU, RAM, ROM, a disk drive device compatible with CD-ROMs (Compact Disc Read Only Memory) and DVD-ROMs (Digital Versatile Disc-ROM) a graphics control unit for converting display control signals generated by the CPU into vide signals and outputting, an audio playback unit for playing audio signals, and so forth, i.e., having a configuration generally like that of a computer device. The main unit 701 of the home gaming console is controlled overall by the CPU, following programs stored in the ROM beforehand, or programs recorded in a CD-ROM or DVD-ROM mounted to the disk drive device. The P is used as work memory for the CPU. The main unit 701 of the home gaming console has built in the reception device 601. Digital video signals output from the reception device 601, and other signals, are supplied to the CU via the bus, for example.

Let us say that with such a system, e.g., the main nit 701 of the home gaming console, game software is running which can take images in the form of digital video signals supplied externally, as images within the game. For example, this game software is capable of using images in the form of digital video signals supplied externally as images within the game, and also recognize the movements of persons (players) within the image, and perform operations corresponding to the recognized motions.

The video camera device 700 encodes the shot digital video signals with the encoding method according to the present invention at the video signal encoding unit 610 within the built-in transmission unit 600, modulates the code stream at the digital modulation unit 611 and supplies to the wireless module unit 612 so s to be transmitted from the antenna 613. The transmitted airwaves are received at the antenna 620 of the reception device 601 built into the main unit 701 of the home gaming console, the received signals being supplied to the digital demodulation unit 623 via the wireless module unit 621 and the front end unit 622. The received signals are demodulated at the digital demodulation unit 623 into a code stream, and supplied to the video signal decoding unit 624. The video signal decoding unit 624 decodes the supplied code stream with the decoding method according to the present invention, and outputs the baseband digital video signals.

The baseband digital video signals output from the video signals decoding unit 624 are sent over the bus in the main unit 701 of the home gaming console, and temporarily stored in the RAM, for example. Upon the digital video signals stored in the RAM being read out following a predetermined program, the CPU can detect movement of persons within the image provided by the digital video signals, and use the image within the game.

Due to the delay time, from the images being shot with the video camera device 700 and the obtained digital video signals being encoded to the code stream being decoded at the main unit 701 of the home gaming console and the images being obtained thereat, being short, responsivity of the game software running on the main unit 701 of the home gaming console as to the movement of the player improves, thereby improving operability of the game.

Note that such a video camera device 700 used with a home gaming console often has a simple configuration due to restrictions on price, size and so forth, and assumptions must be made that a CPU with high processing capabilities and large-capacity memory such as a computer device may not be implementable.

That is to say, generally, the video camera device 700 is a peripheral device of the main unit 701 of the home gaming console, which is necessary only for playing games using the video camera device 700, and is not a device necessary to play games on the main unit 701 of the home gaming console. In such a case, the video camera device 700 is often sold separately from the main unit 701 of the home gaming console (a so-called option sold separately). In this case, installing a high-capability CPU and memory with a large storage capacity in the video camera device 700 so as to be sold at a high price generally may lead to reduced numbers of units sold. In this case, this may reduce the number sold of the games using the video camera device 700, which may lead to lower revenue. Also, with home games in particular, ownership rate often strongly affects the number of units sold, so a low ownership rate of the video camera device 700 may lead to an even lower number of units sold.

On the other hand, selling a great number of the video camera device 700 at low prices to improve the ownership rate can improve the number of home games sold using the video camera device 700 and improve the popularity thereof, and this can be further anticipated to lead to further purchase incentives for the main unit 701 of the home gaming console. From this perspective as well, the video camera device 700 is often preferably of a simple configuration.

In this case, an arrangement may be conceived wherein wavelet transformation is performed at the video signal encoding unit 610 of the transmission unit 600 built into the video camera device 70 at a low division level. This reduces the need for memory capacity to be used with the coefficient rearranging buffer unit.

Also, an arrangement can be conceived wherein the configuration of the image encoding device exemplarily illustrated in FIG. 12 that has been described with the third embodiment is applied to the video signal encoding unit 610. Further, applying the configuration of the image encoding device exemplarily illustrated in FIG. 15 that has been described with the fourth embodiment to the video signal encoding unit 610 does away with the need to perform rearranging processing of the wavelet transformation coefficient data at the video signal encoding unit 610 side, so the load at the video camera device 700 side can be further reduced, which is desirable. In this case, there is the need to use the image decoding device exemplarily illustrated in FIG. 16 that has been described with the fourth embodiment, as the video signal decoding unit 624 in the reception device 601 built in at side of the main unit 701 of the home gaming console.

Note that the video camera device 700 and the main unit 701 of the home gaming console have been described above as being connected by wireless communication, but this arrangement is not restricted to this example. That is to say, the video camera device 700 and the main unit 701 of the home gaming console may be connected by cable, via interfaces such as USB, IEEE 1394, or the like.

As described above another great advantage of the present invention is that it can be applied to various forms, and can easily be applied to a wide variety of usages (i.e., highly versatile).

The series of above-described processing can be realized by hardware or can be realized by software. In the case of realizing the series of processing by software, a program making up the software is installed in a computer which has dedicated hardware built in, or installed in a general-purpose computer, or an information processing device of an information processing system made up of multiple devices, capable of executing various functions by various types of programs being installed therein, from a program recording medium.

Figure 40:
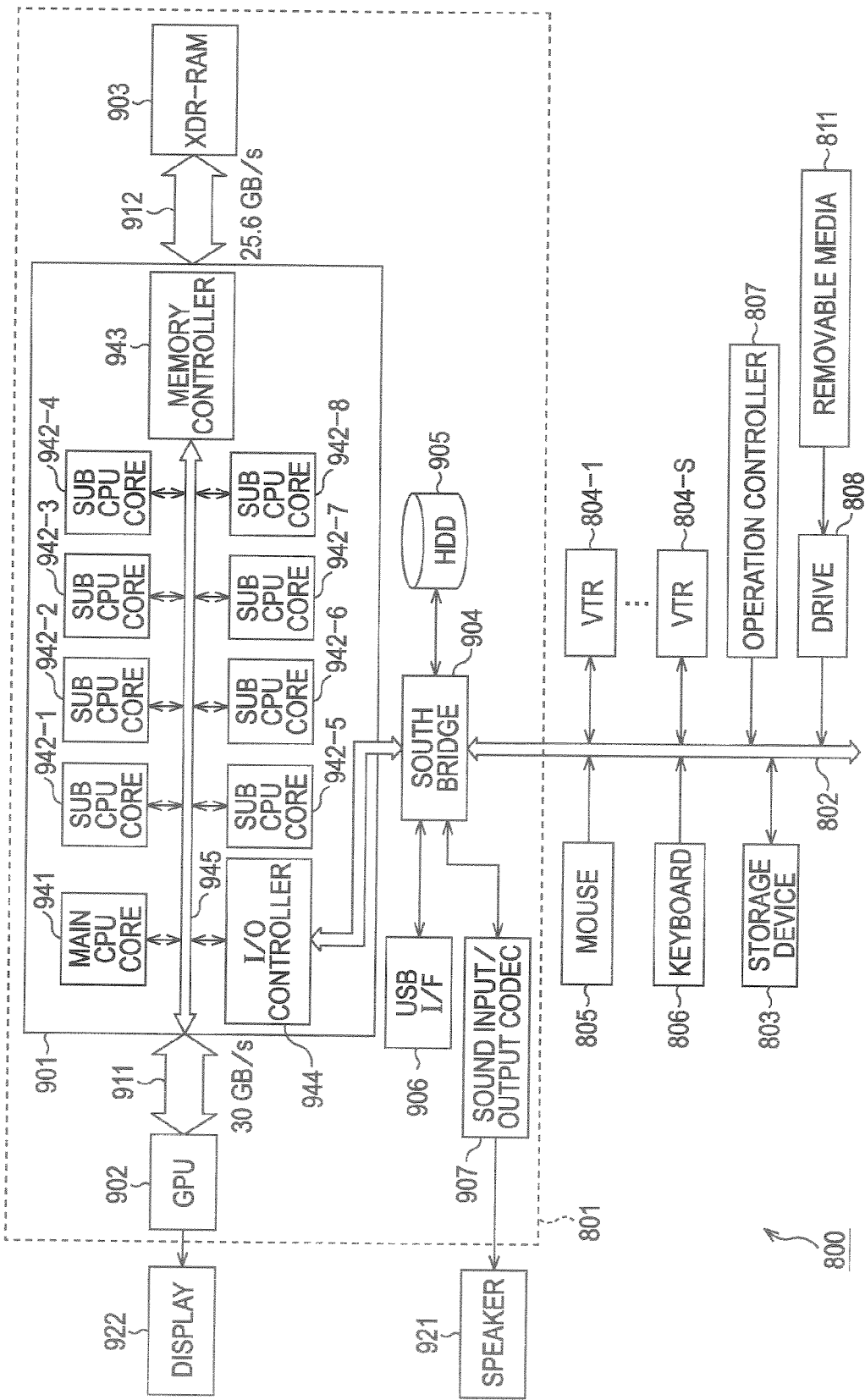
FIG. 40 is a diagram illustrating a configuration example of an information processing system to which the present invention has been applied.

FIG. 40 is a block diagram illustrating an example of the configuration of an information processing system for executing the above-described series of processing with a program.

As shown in FIG. 40, the information processing system 800 is a system configured of an information processing device 801, a storage device 803 connected with the information processing device 801 by a PCI bus 802, VTR 804-1 through VTR 804-S which are multiple video tape recorders (VRT), and a mouse 808, keyboard 806, and operation controller 807 for a user to perform operation input of these, and is a system which performs image encoding processing and image decoding processing and the like as described above, by an installed program.

The information processing device 801 of the information processing system 800, for example, can encode moving image contents stored in the large-capacity storage device 803 configured of RAID (Redundant Arrays of Independent Disks) and storing the obtained encoded data in the storage device 803, decoding the encoded data stored in the storage device 803 and stored in the obtained decoded image data (moving image contents) in the storage device 803, record the encoded data or decoded image data on video tape by way of the VTR 804-1 through VTR 804-S, and so forth. Also, the information processing device 801 is arranged to capture moving image contents recorded in video tapes mounted in the VTR 804-1 through VTR 804-S into the storage device 803. At this time, an arrangement may be made wherein the information processing device 801 encodes the moving image contents.

The information processing unit 801 has a microprocessor 901, GPU (Graphics Processing Unit) 902, XDR (Extreme Data Rate)-RAM 903, south bridge 904, HDD 905, USB interface (USB I/F) 906, and sound input/output codec 907.

The GPU 902 is connected to the microprocessor 901 via a dedicated bus 911. The XDR-RAM 903 is connected to the microprocessor 901 via a dedicated bus 912. The south bridge 904 is connected to an I/O controller 944 of the microprocessor 901 via a dedicated bus. Also connected to the south bridge 904 are the HDD 905, USB interface 906, and sound input/output codec 907. A speaker 921 is connected to the sound input/output codec 907. Also, a display 922 is connected to the GPU 902.

Also connected to the south bridge 904 are the mouse 805 keyboard 806, VTR 804-1 through 804-S, storage device 803, and operating controller 807, via the PCI bus 802.

The mouse 805 and keyboard 806 receive operating input from the user, and supply the microprocessor 901 signals indicating the contents of the operation input from the user, via the PCI bus 802 and the south bridge 904. The storage device 803 and VTR 804-1 through VTR 804-S can record and play predetermined data.

A drive 808 is further connected to the PCI bus 802 as necessary, to which a removable medium 811 such as a magnetic disk, optical disk, magneto-optical disk, or semiconductor memory, etc., is mounted as appropriate, with a computer program read out therefrom being installed in the HDD 905 as necessary.

The microprocessor 901 is a multi-core configuration wherein a general-purpose main CPU core 941 for executing basic programs such as an OS (Operating System) or the like sub-CPU core 942-1 through sub-CPU core 942-8 which are multiple (eight in this case) RISC (Reduced Instruction Set Computer) type signal processing processors connected to the main CPU core 941 via an internal bus 945, a memory controller 943 for performing memory control of the XDR-RAM 903 having capacity of 256 [MByte] for example, and an I/O (In/Out) controller 944 for managing input and output of data with the south bridge 904 integrated on a single chip, realizing an operation frequency of 4 [GHz] for example.

At the time of startup, the microprocessor 901 reads out necessary application programs stored in the HDD 905 based on the control program stored in the HDD 905 and renders to the XDR-RAM 903, and subsequently executes control processing necessary based on the application programs and operator operations.

Also by executing software, the microprocessor 901 can realize the image encoding processing and image decoding processing of the above-described embodiments, supplying code streams obtained as the result of encoding to the HDD 905 for storage via the south bridge 904, perform data transmission of playing pictures of moving image contents obtained as a result of decoding to the GPU 902 for display on the display 922, and so forth, for example.

While how to use the CPU cores of the microprocessor 901 is optional, an arrangement may be made wherein, for example, the main CPU core 941 performs processing relating to control of image encoding processing and image decoding processing, and the eight sub-CPU core 942-1 through sub-CPU core 942-8 perform various types of processing such as wavelet transformation, coefficient rearranging, entropy encoding, entropy decoding, wavelet inverse transformation, quantization, inverse quantization, and so forth simultaneously and in parallel as described with reference to FIG. 11, for example. At this time, an arrangement wherein the main CPU core 941 assigns processing to each of the eight sub-CPU core 942-1 through sub-CPU core 942-8 in increments of line blocks (precincts), thereby executing the image encoding processing and image decoding processing simultaneously in parallel, in increments of line blocks, is implemented in the same way as with the case described with reference to FIG. 11. That is to say, the efficiency of image encoding processing and image decoding processing can be improved, the delay time of the overall processing reduced, and further, the load, processing time, and memory capacity necessary for processing, can be reduced. Of course, each processing can be performed with other methods, as well.

For example an arrangement may be made wherein a part of the eight sub-CPU core 942-1 through sub-CPU core 942-8 of the microprocessor 901 perform encoding processing, and the rest performs decoding processing, simultaneously, in parallel.

Also, for example, in the event that an independent encoder or decoder, or codec processing device is connected to the PCI bus 802, the eight sub-CPU core 942-1 through sub-CPU core 942-8 of the microprocessor 901 may control the processing executed by these devices, via the south bridge 904 and PCI bus 802. Further, in the event that multiple such devices are connected, or in the event that these devices include multiple decoders or encoders, the eight sub-CPU core 942-1 through sub-CPU core 942-8 of the microprocessor 901 may effect control so that the multiple decoders or encoders share the processing.

At this time, the main CPU core 941 manages the actions of the eight sub-CPU core 942-1 through sub-CPU core 942-8, assigning processing to each CPU core, retrieving processing results, and so forth. Further, the main CPU core 941 also performs processing other than that which these sub-CPU cores perform. For example, the main CPU core 941 accepts commands supplied from the mouse 805, keyboard 806, or operating controller 807, via the south bridge 904, and executes various types of processing corresponding to the commands.

The GPU 902 performs final rendering processing regarding pasting textures and so for playing the playing picture of moving image contents to be displayed on the display 922, and also governs functions for performing coordinate transformation calculations when displaying multiple playing pictures of the moving image contents and still images of still image contents on the display 922 at once, processing for enlarging/reducing playing pictures of the moving image contents and still images of still image contents, and so forth, whereby the load on the microprocessor 901 can be alleviated.

The GPU 902, under the control of the micro processor 901, subjects the supplied picture data of the moving image contents and image data of still image contents to predetermined signal processing, sends the picture data and image data obtained as a result thereof to the display 922, and displays image signals on the display 922.

Now, the playing pictures of multiple moving image contents decoded simultaneously in parallel by the eight sub-CPU core 942-1 through sub-CPU core 942-8 of the microprocessor 901 is subjected to data transmission to the GPU 902 via the bus 911, the transmission speed thereof being up to 30 [Gbyte/sec] for example, so that even complex picture images with special effects can be displayed smoothly at high speeds.

Also, the microprocessor 901 subjects the audio data, of the picture data and audio data of the moving image contents, to audio mixing processing, and sends the edited audio data obtained as a result thereof to the speaker 921 via the south bridge 904 and sound input/output code 907, so as to output audio based on the audio signals from the speaker 921.

In the case of realizing the above-described series of processing by software, a program making up the software is installed from a network or recording medium.

This recording medium includes not only the removable media 811 shown in FIG. 40 such as magnetic disks (including flexible disks) optical disks (including CD-ROM and DVD) magneto-optical disks (including MD), semiconductor memory, etc., distributed separately from the device main unit so as to distribute the program to the user, but also the HDD 905, storage device 803, where programs are stored, etc., to be distributed to the user in a state of being assembled into the device main unit. Of course, storage media may be semiconductor memory such as ROM or flash memory or the like, as well.

In the above, description has been made that the microprocessor 901 is configured of eight sub-CPU cores, but the invention is not restricted to this, and the number of sub-CPU cores is optional. Also, as for the microprocessor 901, an arrangement may be made wherein a CPU is used which is configured of a single-core (one core) instead of being configured of a main CPU core and sub-CPU cores. Also, multiple CPUs may be used instead of the microprocessor 901, multiple information processing devices may be used (i.e., a program for executing the processing of the present invention is executed at multiple devices operation in conjunction).

While the steps describing the program stored in the program recording medium in the present Description may of course be performed in the time-sequence described, but is not restricted to this time-sequence, and may be executed in parallel, or individually.

Further, system as used in the present Description refers to the entirety of equipment configured of multiple devices (devices).

Note that in the above configurations described as being a single device may be divided so as to be configured of multiple devices. Conversely, in the above, configurations described as being multiple devices may be consolidated so as to be configured of a single device. Also, the configurations of the devices may have added thereto configurations other than those described above. Further, a part of the configuration of one device may be included in the configuration of another device, as long as the configuration and operations of the overall system is substantially the same.

INDUSTRIAL APPLICABILITY

The present invention described above can be advantageously applied to various devices or systems, as long as for images being compression coded and transmitted, and the compressed code being decoded and output at the transmission destination. The present invention is particularly advantageous with devices or systems wherein short delay from compression encoding to decoding and output of images is demanded.

For example, the present invention is advantageously applied to remote medical diagnosis and treatment using manipulators, while viewing images taken with a video camera, for example. Also, the present invention is advantageously applied to compression encoding and transmission of digital video signals, and decoding of digital video signals subjected to compression encoding, in systems such as used in broadcasting stations and the like.

Further, this invention can be applied to systems for distributing video of live coverage, educational systems wherein students and teachers can communicate interactively, and so forth.

Moreover, this invention can be applied to transmitting image data taken with mobile terminals having image-taking functions, such as cellular phones with camera functions, to videoconferencing systems, to surveillance systems for recording images taken with a monitoring camera with a recorder, and so forth.

The invention claimed is:

1. An encoding device for encoding image data, comprising:
    a filter that performs a filtering processing as to said image data, for a line block of a plurality of line blocks, the line block including image data of a number of a plurality of lines for generating coefficient data of one line of a sub-band of at least a lowest band component, wherein, when iterating the processing for each line block, not all of the plurality of line blocks include the same number of the plurality of lines, and that generates a plurality of sub-bands made up of coefficient data broken down by frequency band;
    a memory that stores coefficient data generated by said filter, for the line block;
    a coefficient rearranging unit configured to rearrange said coefficient data stored by said memory, in an order in which a synthesizing processing, for generating image data by synthesizing the coefficient data of a plurality of sub-bands which have been divided into frequency bands, is to be executed, the order being from lowband components to highband components within the line block; and
    an encoder that encodes the coefficient data rearranged by said coefficient rearranging unit.

2. The encoding device according to claim 1, wherein said coefficient rearranging unit is configured to rearrange said coefficient data in the order from lowband components to highband components, for each of the plurality of line blocks.

3. The encoding device according to claim 1, further comprising:
    a processing unit configured to control said filter, said memory, said coefficient rearranging unit, and said encoder to operate in parallel for each line block.

4. The encoding device according to claim 1, wherein said filter, said memory, said coefficient rearranging unit and said encoder perform each process in parallel.

5. The encoding device according to claim 2, wherein said filter performs said filtering processing in both a vertical direction and a horizontal direction of a screen corresponding to said image data.

6. The encoding device according to claim 2, wherein at least one of a number of taps and a number of resolution levels of said filtering processing performed by said filter is determined in accordance with a target delay time.

7. The encoding device according to claim 2, wherein said filter performs a wavelet filtering processing, wherein coefficient data of a lowband component sub-band obtained by said filtering processing is further subjected to said filtering processing.

8. The encoding device according to claim 7, wherein said filter performs said wavelet filtering processing using a lifting technique.

9. The encoding device according to claim 7, wherein at a time of said filter performing filtering processing of a resolution level=X+1 using a lifting technique, the filtering processing of the resolution level=X+1 is performed as to coefficient data calculated as a lowband component sub-band with filtering processing of a resolution level=X.

10. The encoding device according to claim 7, wherein said memory holds coefficient data of a lowband component sub-band generated in a process of said wavelet filtering processing performed by said filter, and holds coefficient data of a highband component sub-band generated in the process of said wavelet filtering processing performed by said filter.

11. The encoding device according to claim 10, wherein said memory holds coefficient data of sub-bands of band components other than a lowest band, until coefficient data for a lowest band component sub-band is generated by said filter.

12. The encoding device according to claim 1, wherein, as soon as said coefficient data is rearranged by said coefficient rearranging unit, said encoder sequentially performs an entropy encoding of rearranged coefficient data in the order.

13. The encoding device according to claim 1, wherein said encoder is configured to perform a batch encoding on a plurality of lines of coefficient data within a same sub-band.

14. The encoding device according to claim 2, wherein said encoder is configured to perform an encoding on lines of all sub-bands making up a line block with regard to a coefficient data stream arrayed in a one-dimensional direction, in the order from lowband to highband.

15. The encoding device according to claim 1, further comprising:
    a processing unit that adds a predetermined header to encoded data generated by said encoder, and that packetizes the header and a data body; and
    a sending unit that sends out said packet generated by said processing unit; wherein the processing unit is configured to control said filter, said memory, said coefficient rearranging unit, said encoder, said processing unit, and said sending unit to operate in parallel for each line block.

16. The encoding device according to claim 1, further comprising:
    a processing unit that adds a predetermined header to encoded data generated by said encoder, and that packetizes the header and a data body; and
    a sending unit that sends out said packet generated by said processing unit, wherein said filter, said memory, said coefficient rearranging unit, said encoder, said processing unit, and said sending unit operate in parallel for each line block.

17. The encoding device according to claim 16, wherein said header includes identification information for identifying said line block in a screen, a data length of the data body, and encoding information.

18. The encoding device according to claim 17, wherein said encoder quantizes said coefficient data generated by said filter, and performs a source coding on quantization result coefficients obtained by said coefficient data being quantized by said encoder, wherein said encoding information includes information of a quantization step size of a quantization performed by said encoder.

19. An encoding method for encoding image data, comprising:
performing a filtering processing as to said image data, for a line block of a plurality of line blocks, the line block including image data of a number of a plurality of lines for generating coefficient data of one line of a sub-band of at least a lowest band component, wherein, when iterating the processing for each line block, not all of the plurality of line blocks include the same number of the plurality of lines, and generating a plurality of sub-bands made up of coefficient data broken down by frequency band;
storing coefficient data generated in said performing, for the line block;
rearranging said coefficient data stored in said storing, in an order in which a synthesizing processing, for generating image data by synthesizing the coefficient data of a plurality of sub-bands which have been divided into frequency bands, is to be executed, the order being from lowband components to highband components within the line block; and
encoding the coefficient data rearranged in said rearranging.

20. A decoding device for decoding encoded data wherein image data has been encoded, comprising:
a decoder that decodes said encoded data, and that generates coefficient data included in a plurality of sub-bands;
a memory that stores coefficient data generated by said decoder, for each line block including image data of a number of a plurality of lines for generating coefficient data of one line of a sub-band of at least a lowest band component, wherein, when iterating the processing for each line block, not all line blocks include the same number of the plurality of lines;
a processing unit configured to determine whether one line block has accumulated in the memory;
a coefficient rearranging unit configured to rearrange said coefficient data stored by said memory, for each line block, in an order for synthesizing the coefficient data of a plurality of sub-bands which have been divided into frequency bands; and
a filter that performs a filtering processing as to said coefficient data rearranged by said coefficient rearranging unit, and that synthesizes the coefficient data of a plurality of sub-bands broken down by frequency band to generate said image data, if said processing unit determines that the one line block has accumulated in the memory.

21. The decoding device according to claim 20, wherein said coefficient rearranging unit is configured to rearrange said coefficient data in an order from lowband components to highband components, for each line block.

22. The decoding device according to claim 20, wherein the processing unit is further configured to control said decoder, said memory, said coefficient rearranging unit, and said filter to operate in parallel for each line block.

23. The decoding device according to claim 20, wherein said decoder, said memory, said coefficient rearranging unit, and said filter perform each process in parallel.

24. The decoding device according to claim 20, wherein said filter performs said filtering processing using a lifting technique.

25. The decoding device according to claim 20, wherein said decoder decodes encoded data wherein lines of all sub-bands making up said line block have been encoded and arrayed in a one-dimensional direction.

26. A decoding method for decoding encoded data wherein image data has been encoded, comprising:
decoding said encoded data, and generating coefficient data included in a plurality of sub-bands;
storing coefficient data generated by said decoding, for each line block including image data of a number of a plurality of lines for generating coefficient data of one line of a sub-band of at least a lowest band component, wherein, when iterating the processing for each line block, not all line blocks include the same number of the plurality of lines;
determining whether one line block has accumulated in a memory;
rearranging said coefficient data stored in said storing, for each line block, in an order for synthesizing the coefficient data of a plurality of sub-bands which have been divided into frequency bands; and
performing a filtering processing as to said coefficient data rearranged in said rearranging, and synthesizing the coefficient data of a plurality of sub-bands broken down by frequency band to generate said image data, if said determining determines that the one line block has accumulated in the memory.

27. A transmission system, comprising:
an encoding device for encoding image data; and
a decoding device for decoding said encoded image data, said transmission system being for transmitting said encoded image data between said encoding device and said decoding device, wherein
said encoding device includes
a first filter that performs a filtering processing as to said image data, for a line block of a plurality of line blocks, the line block including image data of a number of a plurality of lines for generating coefficient data of one line of a sub-band of at least a lowest band component, wherein, when iterating the processing for each line block, not all of the plurality of line blocks include the same number of the plurality of lines, and that generates a plurality of sub-bands made up of coefficient data broken down by frequency band,
a first memory that stores coefficient data generated by said first filter, for the line block,
a first coefficient rearranging unit configured to rearrange said coefficient data stored by said first memory, for each line block, in an order in which a synthesizing processing, for generating image data by synthesizing the coefficient data of a plurality of sub-bands which have been divided into frequency bands, is to be executed, the order being from lowband components to highband components within the line block,
an encoder that encodes the coefficient data rearranged by said first coefficient rearranging unit, and
a transmission unit that transmits the encoded data generated by said encoder; and
said decoding device includes a reception unit that receives the encoded data transmitted from said transmission unit,
a decoder that decodes the encoded data received by said reception unit, and that generates coefficient data included in a plurality of sub-bands;
a second memory that stores coefficient data generated by said decoder, for each line block including image data of a number of a plurality of lines for generating coefficient data of one line of a sub-band of at least a lowest band component;
a second coefficient rearranging unit configured to rearrange said coefficient data stored by said second storing means memory, for each line block, in the order for synthesizing the coefficient data of a plurality of sub-bands which have been divided into frequency bands; and
a second filter that performs a filtering processing as to said coefficient data rearranged by said second coefficient rearranging unit, and that synthesizes the coefficient data of a plurality of sub-bands broken down by frequency band to generate said image data.

\* \* \* \* \*